US009841989B2

(12) United States Patent
Goda et al.

(10) Patent No.: US 9,841,989 B2
(45) Date of Patent: Dec. 12, 2017

(54) PARALLEL DATA PROCESSING SYSTEM, COMPUTER, AND PARALLEL DATA PROCESSING METHOD

(75) Inventors: Kazuo Goda, Tokyo (JP); Hiroyuki Yamada, Tokyo (JP); Masaru Kitsuregawa, Tokyo (JP); Nobuo Kawamura, Tokyo (JP); Shinji Fujiwara, Tokyo (JP); Kazuhiko Mogi, Tokyo (JP)

(73) Assignees: Hitachi, Ltd., Tokyo (JP); The University of Tokyo, Tokyo (JP)

( * ) Notice: Subject to any disclaimer, the term of this patent is extended or adjusted under 35 U.S.C. 154(b) by 281 days.

(21) Appl. No.: 14/404,550

(22) PCT Filed: May 31, 2012

(86) PCT No.: PCT/JP2012/064149
§ 371 (c)(1),
(2), (4) Date: Nov. 28, 2014

(87) PCT Pub. No.: WO2013/179451
PCT Pub. Date: Dec. 5, 2013

(65) Prior Publication Data
US 2015/0113535 A1   Apr. 23, 2015

(51) Int. Cl.
*G06F 9/44*  (2006.01)
*G06F 9/46*  (2006.01)
(Continued)

(52) U.S. Cl.
CPC ............ *G06F 9/466* (2013.01); *G06F 9/4843* (2013.01); *G06F 9/54* (2013.01); *G06F 17/30445* (2013.01); *G06F 17/30477* (2013.01)

(58) Field of Classification Search
CPC .... G06F 9/466; G06F 9/4843; G06F 9/45533; G06F 9/52; G06F 9/54; G06F 9/544; G06F 17/30445; G06F 17/30477
See application file for complete search history.

(56) References Cited

U.S. PATENT DOCUMENTS

| 7,756,919 B1 | 7/2010 | Dean et al. | |
| 9,170,848 B1 * | 10/2015 | Goldman | G06F 9/5066 |
| 2007/0198979 A1 * | 8/2007 | Dice | G06F 9/466 |
| | | | 718/100 |

(Continued)

FOREIGN PATENT DOCUMENTS

| JP | 2010-092222 A | 4/2010 |
| JP | 2011-170774 A | 9/2011 |
| WO | 2012/049794 A1 | 4/2012 |

OTHER PUBLICATIONS

Extended European Search Report received in corresponding European Application No. 12878202.6 dated Jan. 28, 2016.
(Continued)

*Primary Examiner* — Lewis A Bullock, Jr.
*Assistant Examiner* — Tina Huynh
(74) *Attorney, Agent, or Firm* — Mattingly & Malur, PC

(57) ABSTRACT

A parallel data processing system includes a parallel data processing execution unit for reading a data from a data set including a first data set that includes a plurality of first data and a second data set that includes a plurality of second data and executing processing. The parallel data processing execution unit (A) reads the first data from the first data set, and acquires a first value from the first data based on first format information acquired from an application, (B) generates one or more threads for respectively reading one or more second data corresponding to the first value from the second data set based on first reference information acquired from the application, (C) executes (A) and (B) on one or (Continued)

more first data in the first data set, and (D) executes a plurality of the threads in parallel.

10 Claims, 37 Drawing Sheets

(51) Int. Cl.
   *G06F 9/54* (2006.01)
   *G06F 9/48* (2006.01)
   *G06F 17/30* (2006.01)

(56) References Cited

U.S. PATENT DOCUMENTS

| | | | | |
|---|---|---|---|---|
| 2013/0047155 A1* | 2/2013 | Caspole | .................. | G06F 9/445 718/1 |
| 2013/0066877 A1* | 3/2013 | Raanan | .................. | G06F 9/445 707/741 |

OTHER PUBLICATIONS

White, T., "Hadoop: The Definitive Guide, Second Edition—Excerpts", Chapter 7: MapReduce Types and Formats, Oct. 1, 2010, pp. 198-215 and pp. 521-528, Retrieved from the Internet: URL: http://hadoopbook.com/.

O'Malley, O., "[jira] Commented: (HADOOP-811) Patch to Support Multi-Threaded MapRunnable", Hadoop-Common-Dev—Mailing List Archives, Dec. 12, 2006, Retrieved from the Internet: URL: http://mail-archives.apache.org/mod_mbox/hadoop-common-dev/200612.mbox/%3C20786243.1165908562346.JavaMail.jira@brutus%3E.

Ueda et al., "QueueLinker: A Distributed Framework for Pipelined Applications", Dai 2 Kai Forum on Data Engineering and Information Management—DEIM 2010—Ronbunshu, [online], May 25, 2010, Internet ,URL:http://db-event.jpn.org/deim2010/proceedings/files/E1-3.pdf>.

* cited by examiner

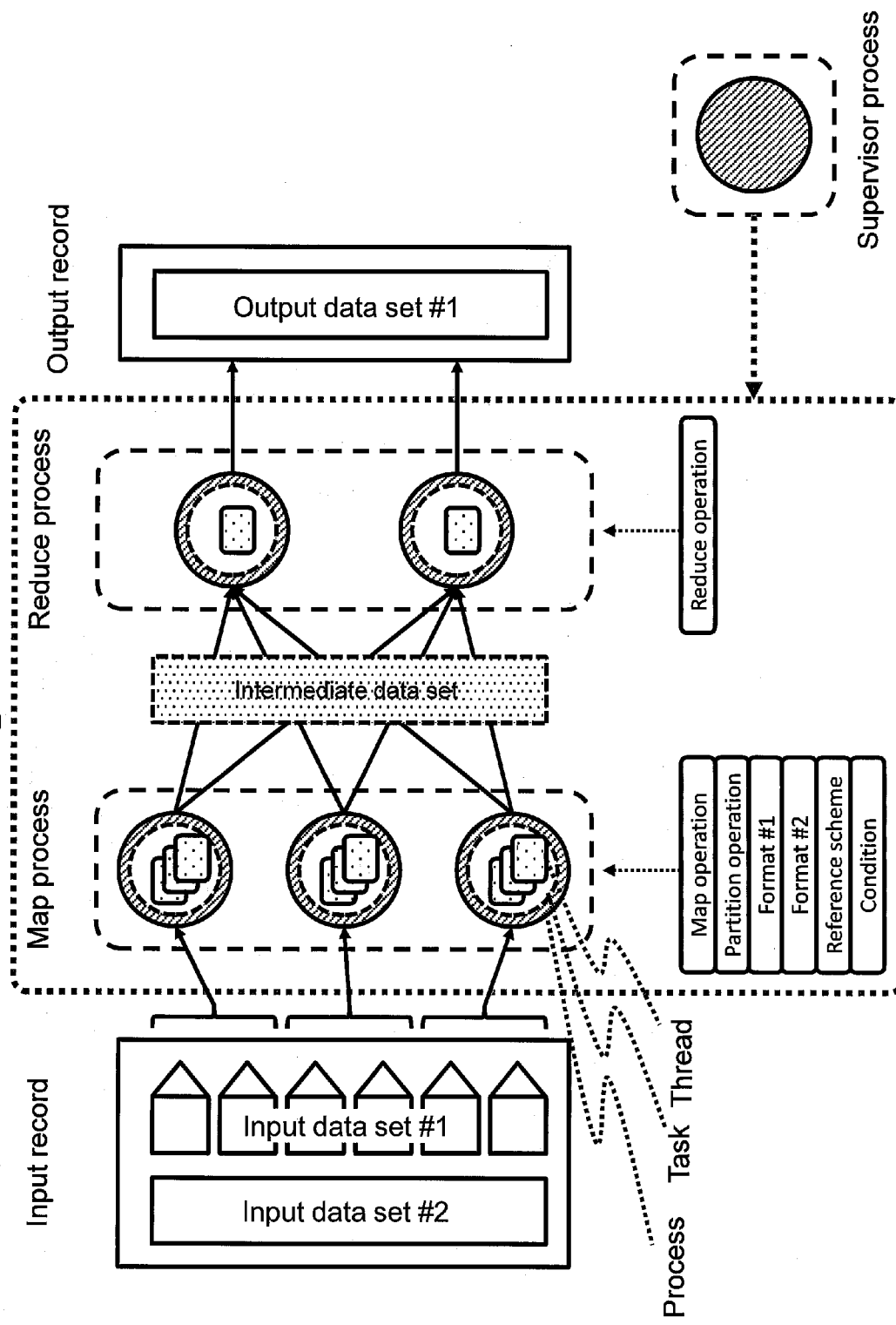

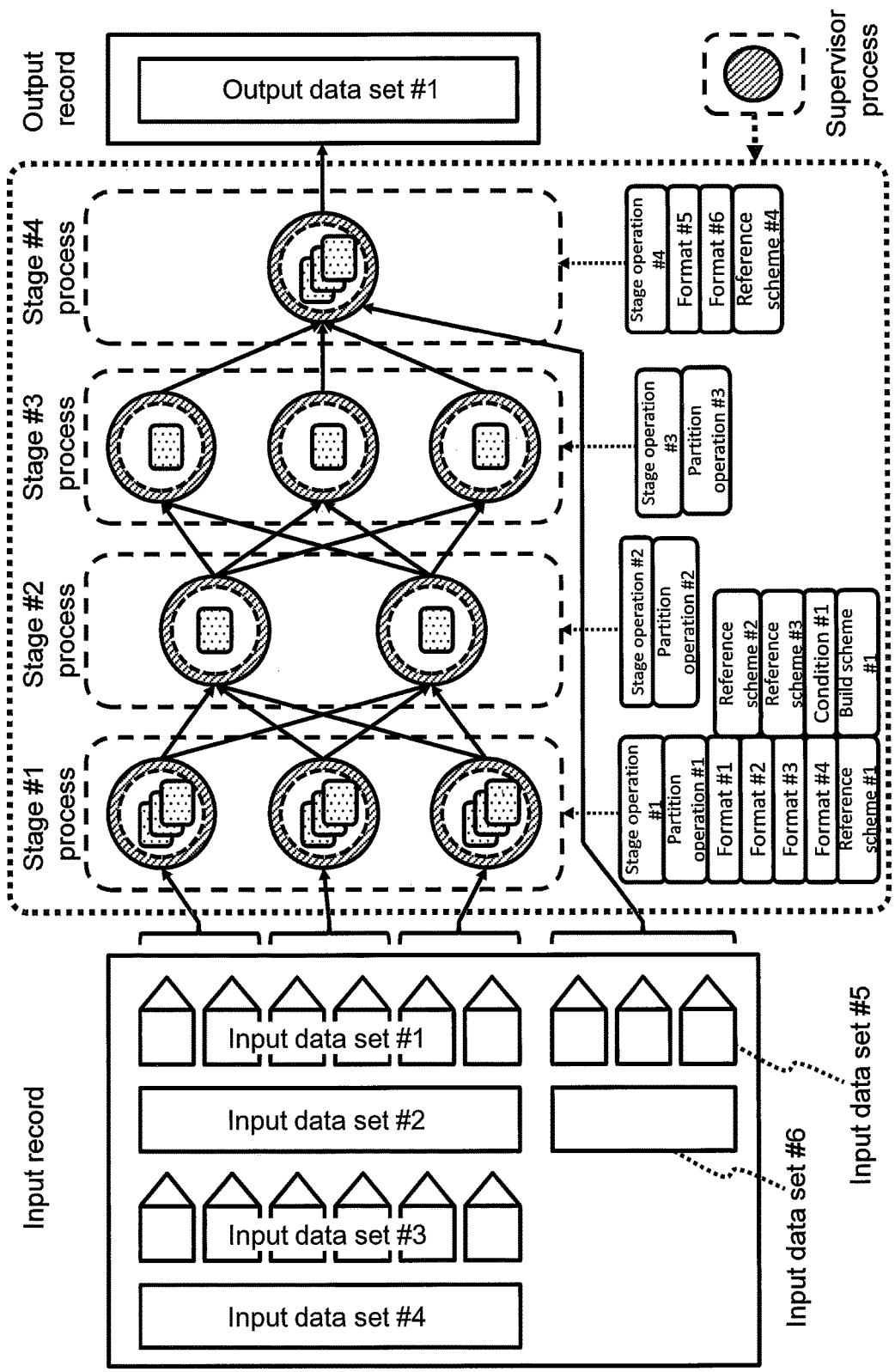

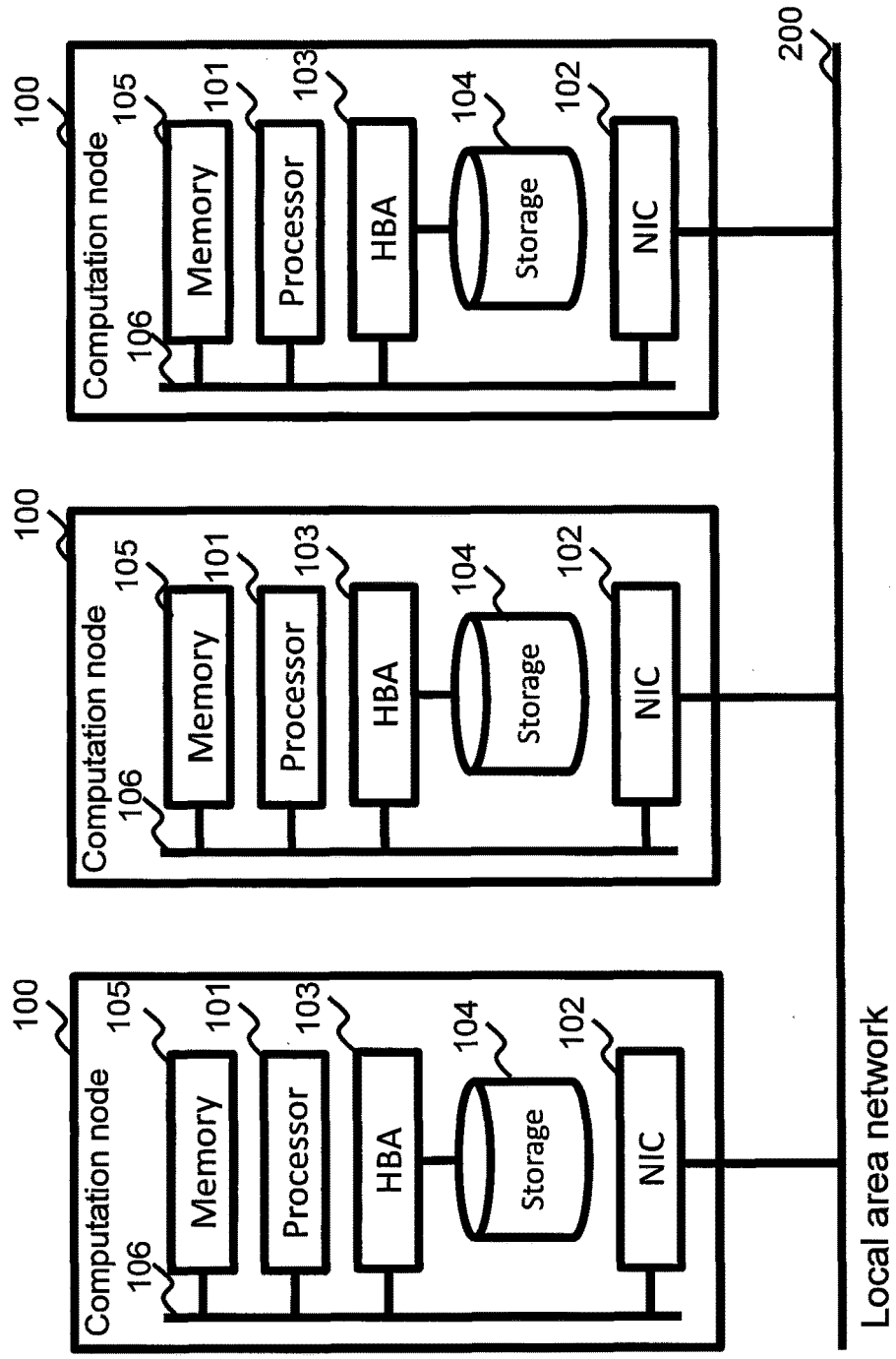

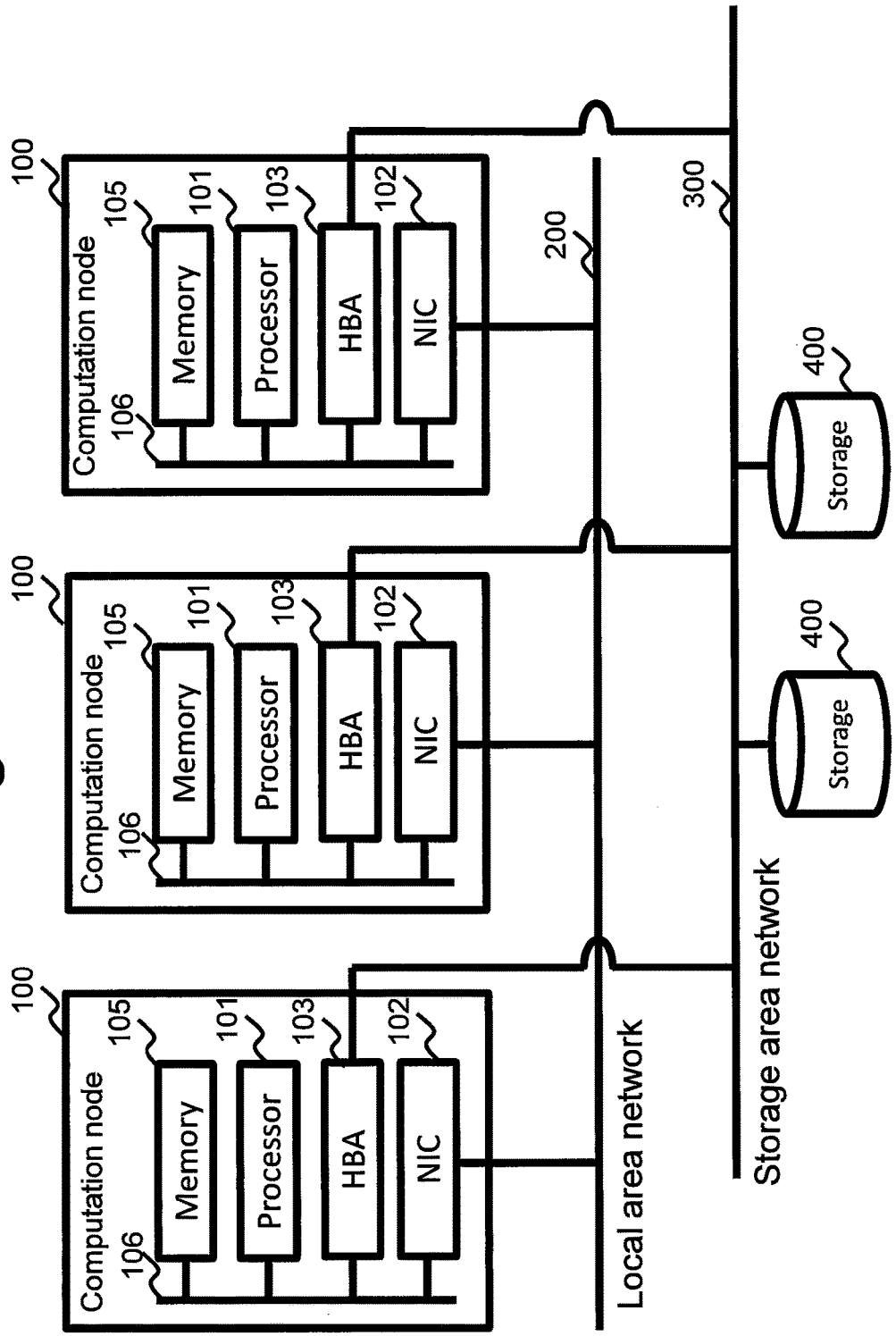

Fig. 5B

Format #1

```
// Intput: Record1
// Output: IndexKey1, Fields1

SetRecordTypeBinary(Record1);
Fields1 <- InterpreteAs(Record1, Text, Long, Int, Int);
IndexKey1 <- Fields1[0];
```

Format #2

```
// Input: Record2
// Output: Fields2 (optional)

SetRecordTypeText(Record2);

/* optional below */
SetColumnDelimitar(Record2, ',');
SetColumnNameAndType(Record2, 0, 'Date & Time', DateTime);
SetColumnNameAndType(Record2, 1, 'User', Text);
SetColumnNameAndType(Record2, 2, 'Product', Text);
SetColumnNameAndType(Record2, 3, 'Comment', Text);
Fields2 <- Interprete(Record2);
```

Reference scheme #1

```
// Input: Fields1
// Output: Record2

SetRefernceTypePhysical(Reference);
Reference.Offset <- Fields1[1];
Reference.Length <- Fields1[2];
Reference.Nodeid <- Fields1[3];
FetchRecordWithReference(Record2, Reference)
```

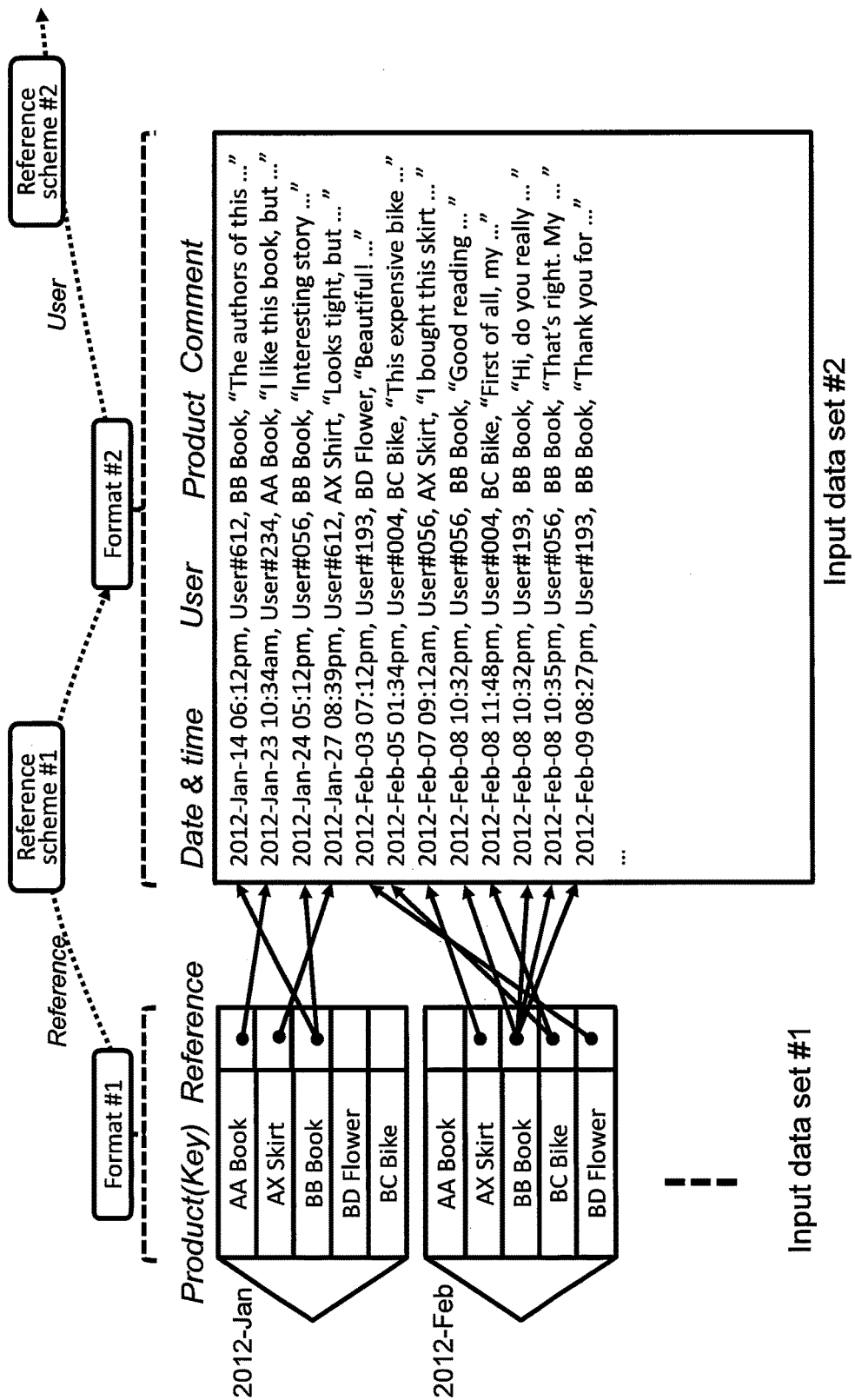

Fig. 5F

Format #3

```
// Intput: Record3
// Output: IndexKey3, Fields3

SetRecordTypeBinary(Record3);
Fields1 <- InterpreteAs(Record3, Text, Long, Int, Int);
IndexKey <- Fields3[0];
```

Format #4

```
// Input: Record4
// Output: Fields4 (optional)

SetRecordTypeText(Record);

/* Optional below */
SetColumnDelimitar(Record4, ',');
SetColumnNameAndType(Record4, 0, 'User', Text);
SetColumnNameAndType(Record4, 1, 'Gender', Text);
SetColumnNameAndType(Record4, 2, 'Zip', Text);
SetColumnNameAndType(Record4, 3, 'Address', Text);
Fields4 <- Interprete(Record4);
```

Fig. 5G

Reference scheme #2

```
// Input: Fields2
// Output: Record2

SetRefernceTypeLogical(Reference);
SetType(Reference.Key, Long);
Reference.Key <- Text2Long(Fields1[1]);
FetchRecordWithReference(Record2, Reference)
```

Reference scheme #3

```
// Input: Fields2
// Output: Record3

SetRefernceTypePhysical(Reference);
Reference.Offset <- Fields1[1];
Reference.Length <- Fields1[2];
Reference.Nodeid <- Fields1[3];
FetchRecordWithReference(Record2, Reference)
```

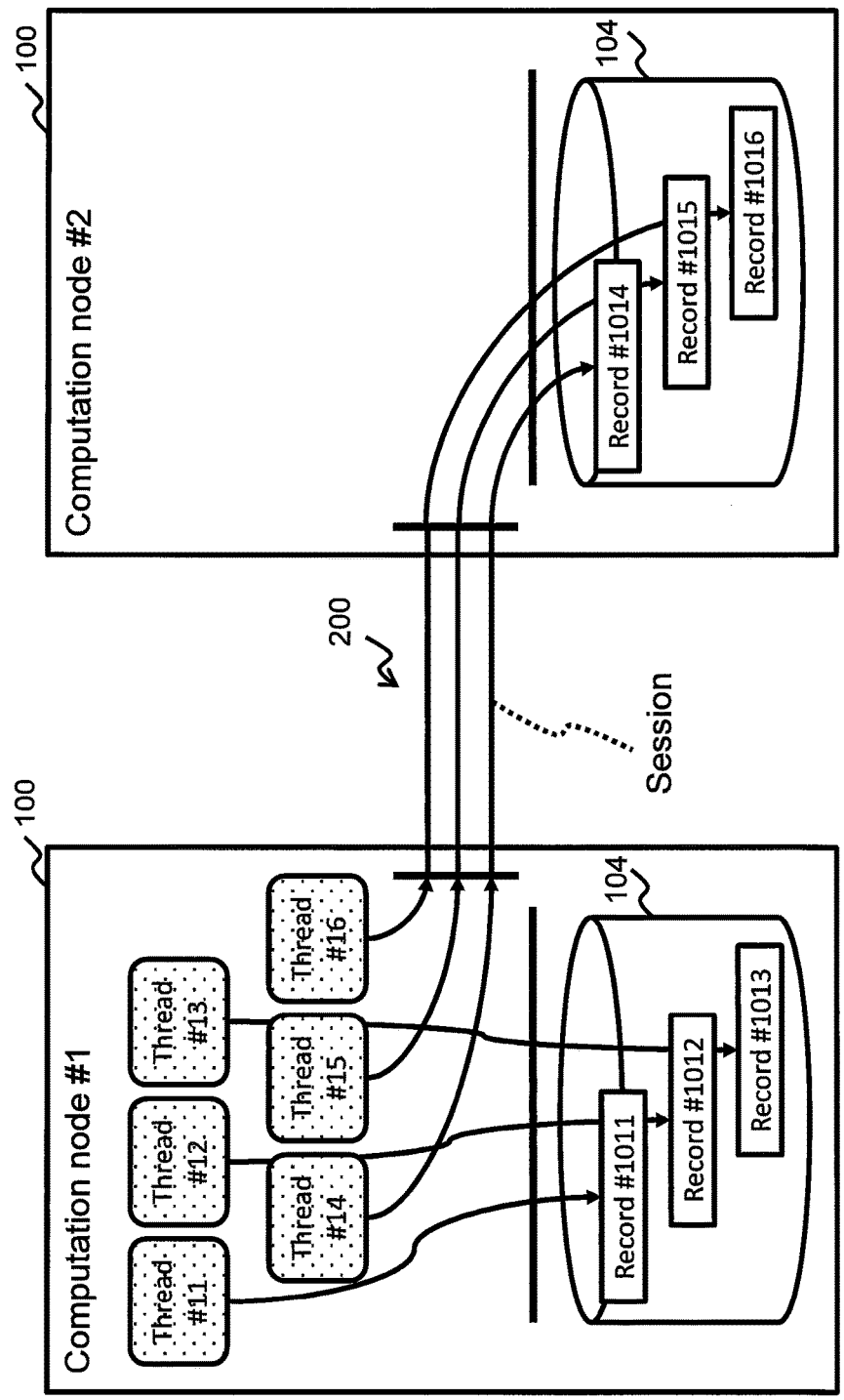

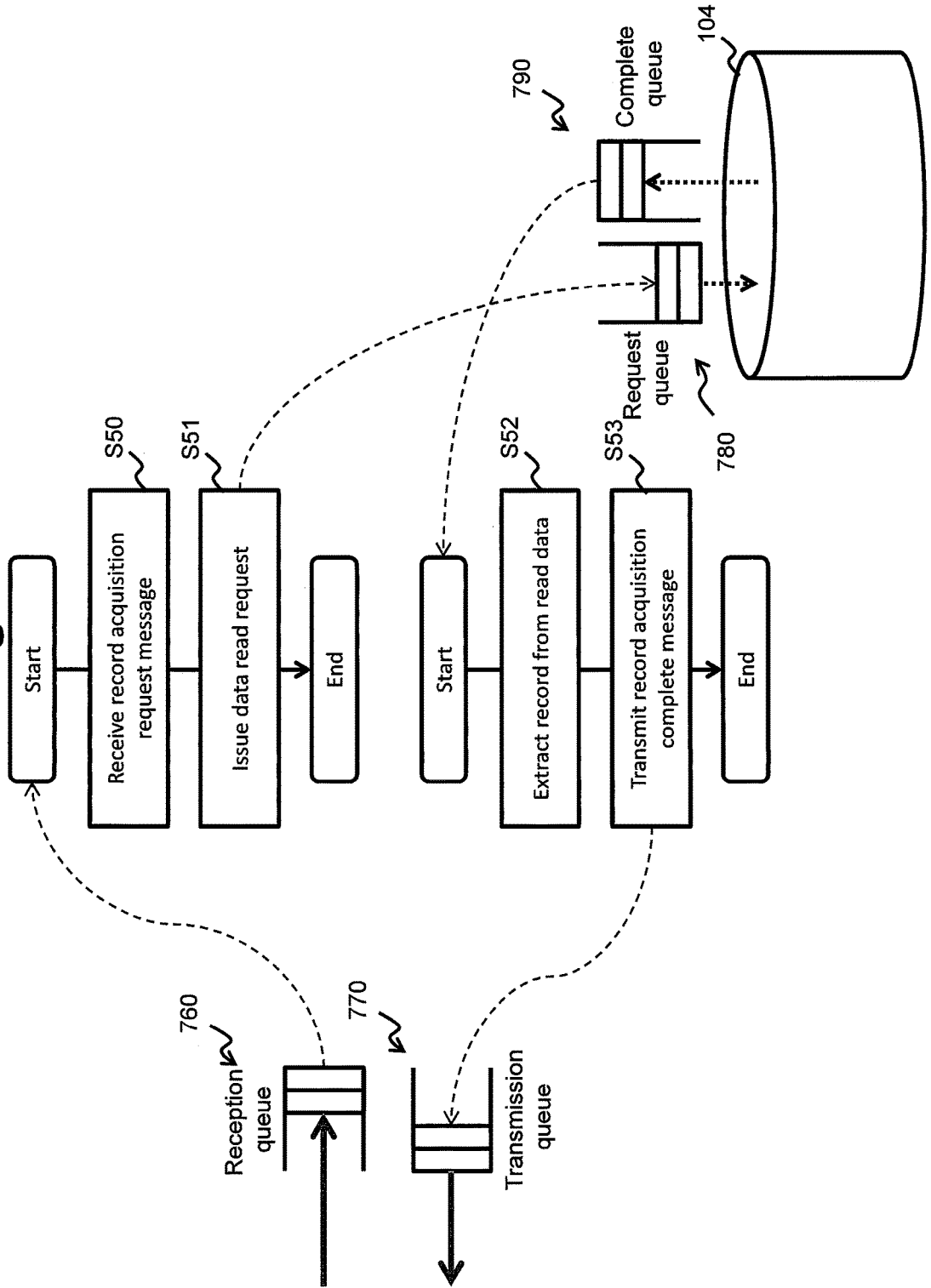

Fig. 7C

Data read request management table 700

| Thread ID | Request issue time | Device ID | Offset address | Read length | Buffer address | ... |
|---|---|---|---|---|---|---|
| | | | | | | |
| | | | | | | |
| | | | | | | |

701  702  703  704  705  706  707

Columns 703–707 grouped under: Data read request

Remote record acquisition request management table 710

| Thread ID | Request issue time | Computation node ID | Record reference | Buffer address | ... |
|---|---|---|---|---|---|
| | | | | | |
| | | | | | |
| | | | | | |

711  712  713  714  715  716

Columns 713–716 grouped under: Record acquisition request

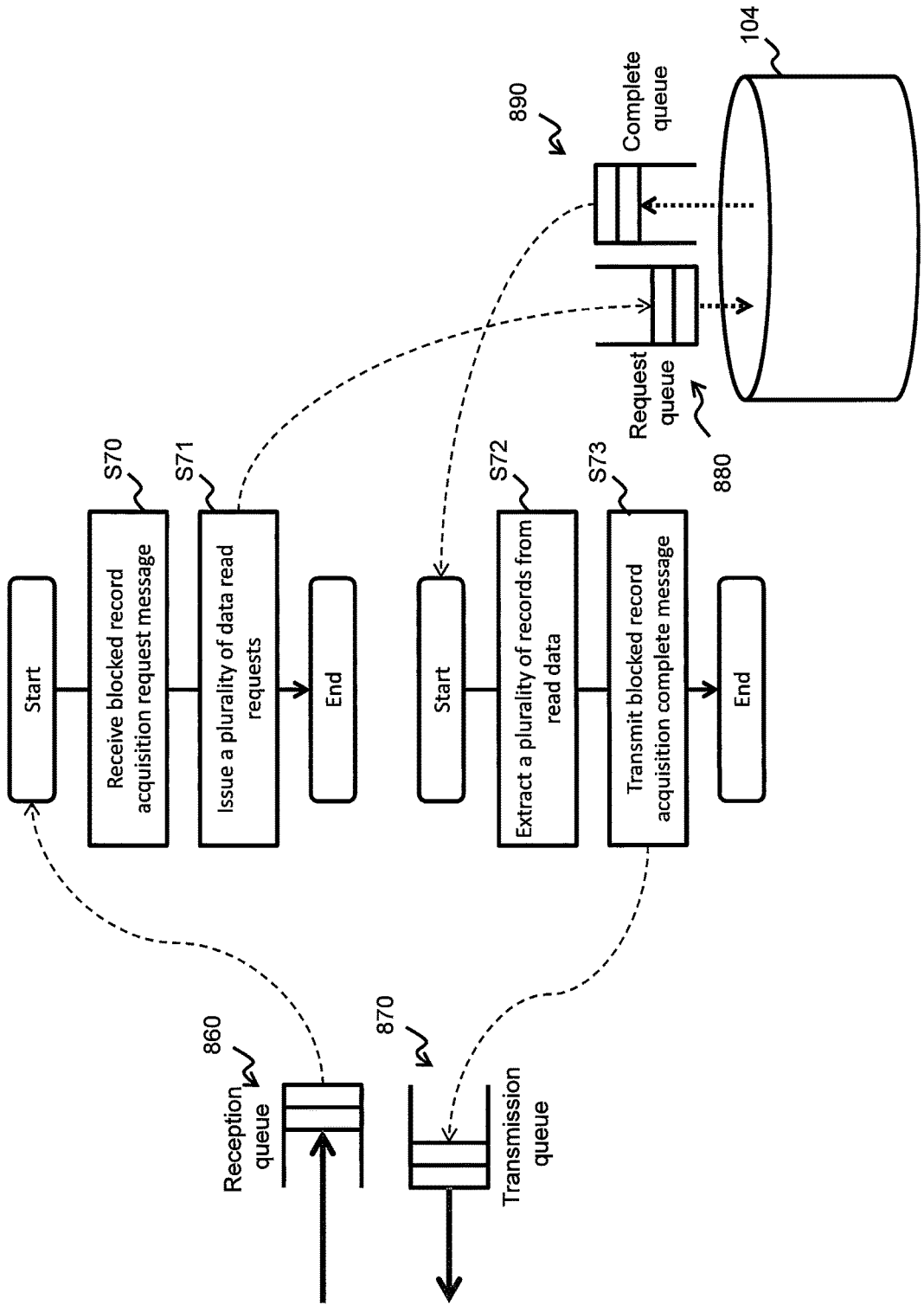

Fig. 7F

Blocked remote record acquisition request management table ~ 830

| Request issue time (832) | Number of requests (833) | Record acquisition request [0] (834) | | | | Record acquisition request [1] (834) | ... |
|---|---|---|---|---|---|---|---|
| | | Thread ID (831) | Computation node ID (835) | Record reference (836) | Buffer address (837) | Complete flag (838) | |
| | | | | | | | |
| | | | | | | | |
| | | | | | | | |
| | | | | | | | |

Fig. 8A

Resource constraint management table at node level (supervisor process) 900

| Computation node ID 901 | Resource constraint 902 903 904 | | |
|---|---|---|---|
| | Number of threads | Main storage allocation | ... |
| Node #1 | | | |
| Node #2 | | | |
| Node #3 | | | |

Resource constraint management table at node level (Node #1) 910

| Computation node ID 911 | Resource constraint 912 914 915 | | | Resource use 913 916 917 | |
|---|---|---|---|---|---|
| | Number of threads | Main storage allocation | ... | Number of threads | Main storage allocation | ... |
| Node #1 | | | | | | |

Fig. 8B

Resource constraint management table at job level (supervisor process) 920

| Job ID 921 | Computation node ID 922 | Resource constraint 925 | | ... |
|---|---|---|---|---|
| | | Number of threads 923 | Main storage allocation 924 | |
| Job #1 | Node #1 | | | |
| | Node #2 | | | |
| | Node #3 | | | |
| Job #2 | Node #1 | | | |
| | Node #2 | | | |
| | Node #3 | | | |

Resource constraint management table at job level (Node #1) 930

| Job ID 931 | Computation node ID 932 | Resource constraint 935 | | Resource use 937 | | ... 938 |
|---|---|---|---|---|---|---|
| | | Number of threads 933 | Main storage allocation 936 | Number of threads 934 | Main storage allocation | |
| Job #1 | Node #1 | | | | | |
| Job #2 | Node #1 | | | | | |

Fig. 8C

Resource constraint management table at process level (supervisor process) ~940

| Process ID ~941 | Job ID ~942 | Computation node ID ~943 | Resource constraint ~944 | | ... |
| | | | Number of threads ~945 | Main storage allocation ~946 | |
|---|---|---|---|---|---|
| Process #111 | Job #1 | Node #1 | | | |
| Process #112 | | | | | |
| Process #121 | | Node #2 | | | |
| Process #122 | | | | | |
| Process #131 | | Node #3 | | | |
| Process #132 | | | | | |
| Process #211 | Job #2 | Node #1 | | | |
| Process #212 | | | | | |
| Process #221 | | Node #2 | | | |
| Process #222 | | | | | |
| Process #231 | | Node #3 | | | |
| Process #232 | | | | | |

Fig. 8D

Resource constraint management table at process level (node #1)

| Process ID | Job ID | Computation node ID | Resource constraint | | ... | Resource use | | ... |
|---|---|---|---|---|---|---|---|---|
| | | | Number of threads | Main storage allocation | | Number of threads | Main storage allocation | |
| Process #111 | Job #1 | Node #1 | | | | | | |
| Process #112 | | Node #1 | | | | | | |
| Process #211 | Job #2 | | | | | | | |
| Process #212 | | | | | | | | |

Fig. 8E

Resource constraint management table at task level (supervisor process) 960

| Task ID 961 | Process ID 962 | Job ID 963 | Computation node ID 964 | Resource constraint 965 | | ... 967 |
|---|---|---|---|---|---|---|
| | | | | Number of threads 966 | Main storage allocation | |
| Task #1111 | Process #111 | Job #1 | Node #1 | | | |
| Task #1112 | | | | | | |
| Task #1121 | Process #112 | | | | | |
| Task #1122 | | | | | | |
| Task #1211 | Process #121 | | Node #2 | | | |
| Task #1212 | | | | | | |
| Task #1221 | Process #122 | | | | | |
| Task #1222 | | | | | | |
| ... | ... | ... | ... | | | |
| Task #2111 | Process #211 | Job #2 | Node #1 | | | |
| Task #2112 | | | | | | |
| Task #2121 | Process #212 | | | | | |
| Task #2122 | | | | | | |
| ... | ... | | ... | | | |

Fig. 8F

Resource constraint management table at task level (node #1)

| Task ID | Process ID | Job ID | Computation node ID | Resource constraint | | | Resource use | | |
|---|---|---|---|---|---|---|---|---|---|
| | | | | Number of threads | Main storage allocation | ... | Number of threads | Main storage allocation | ... |
| Task #1111 | Process #111 | Job #1 | Node #1 | | | | | | |
| Task #1112 | | | | | | | | | |
| Task #1121 | Process #112 | | | | | | | | |
| Task #1122 | | | | | | | | | |
| Task #2111 | Process #211 | Job #2 | Node #1 | | | | | | |
| Task #2112 | | | | | | | | | |
| Task #2121 | Process #212 | | | | | | | | |
| Task #2122 | | | | | | | | | |
| ... | ... | ... | | | | | | | |

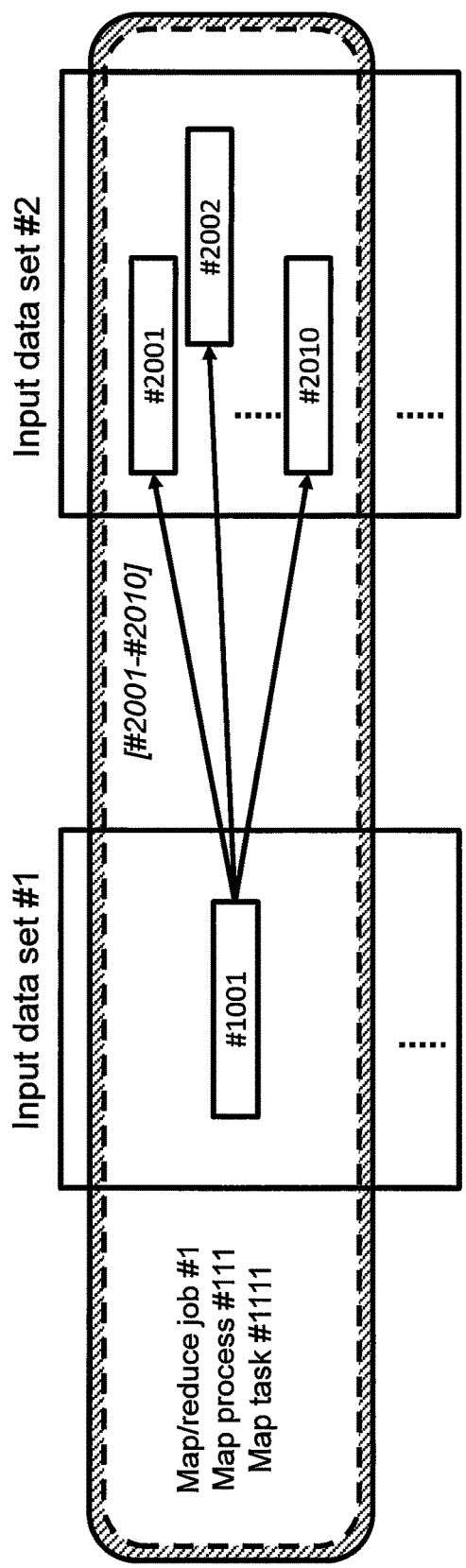

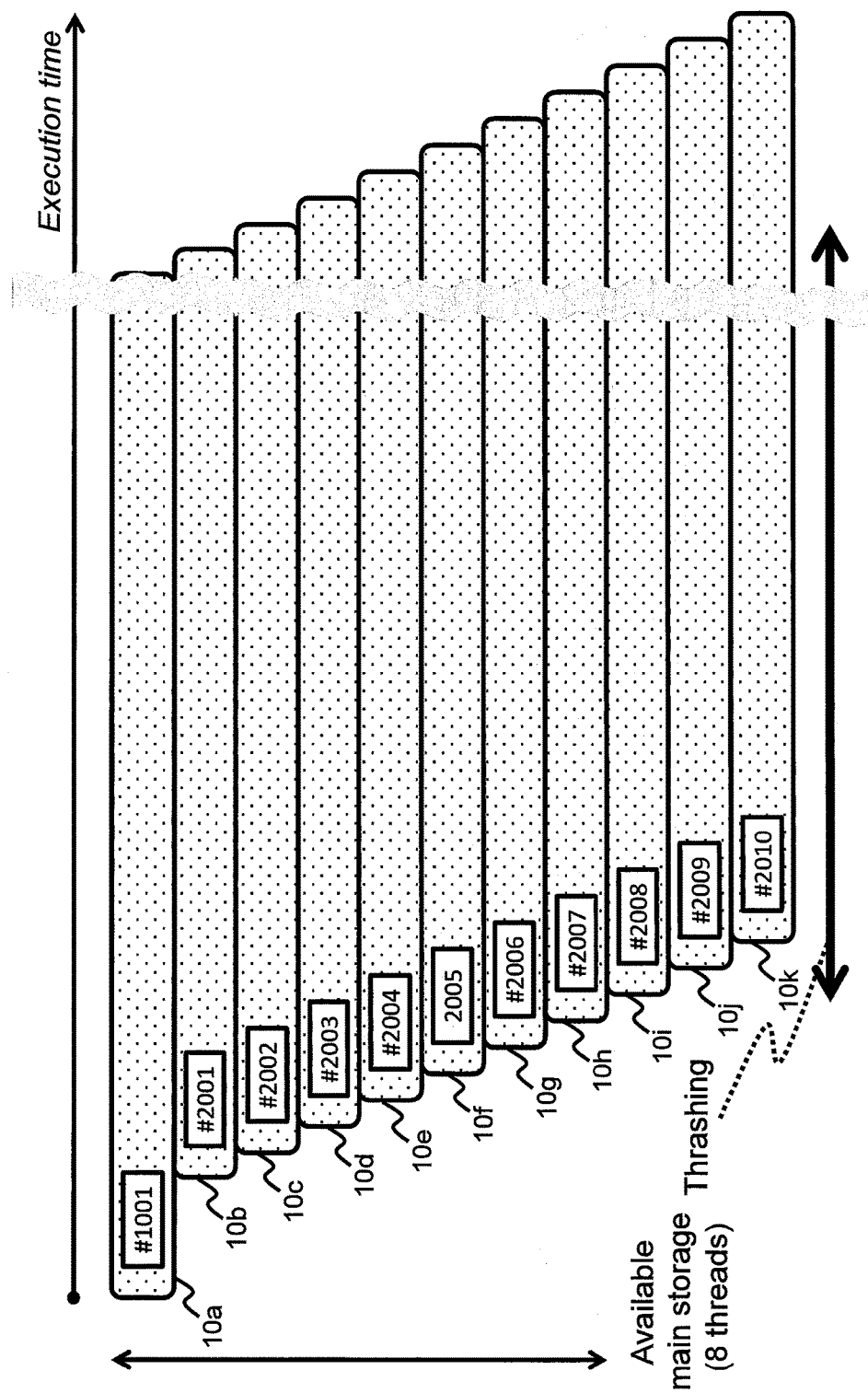

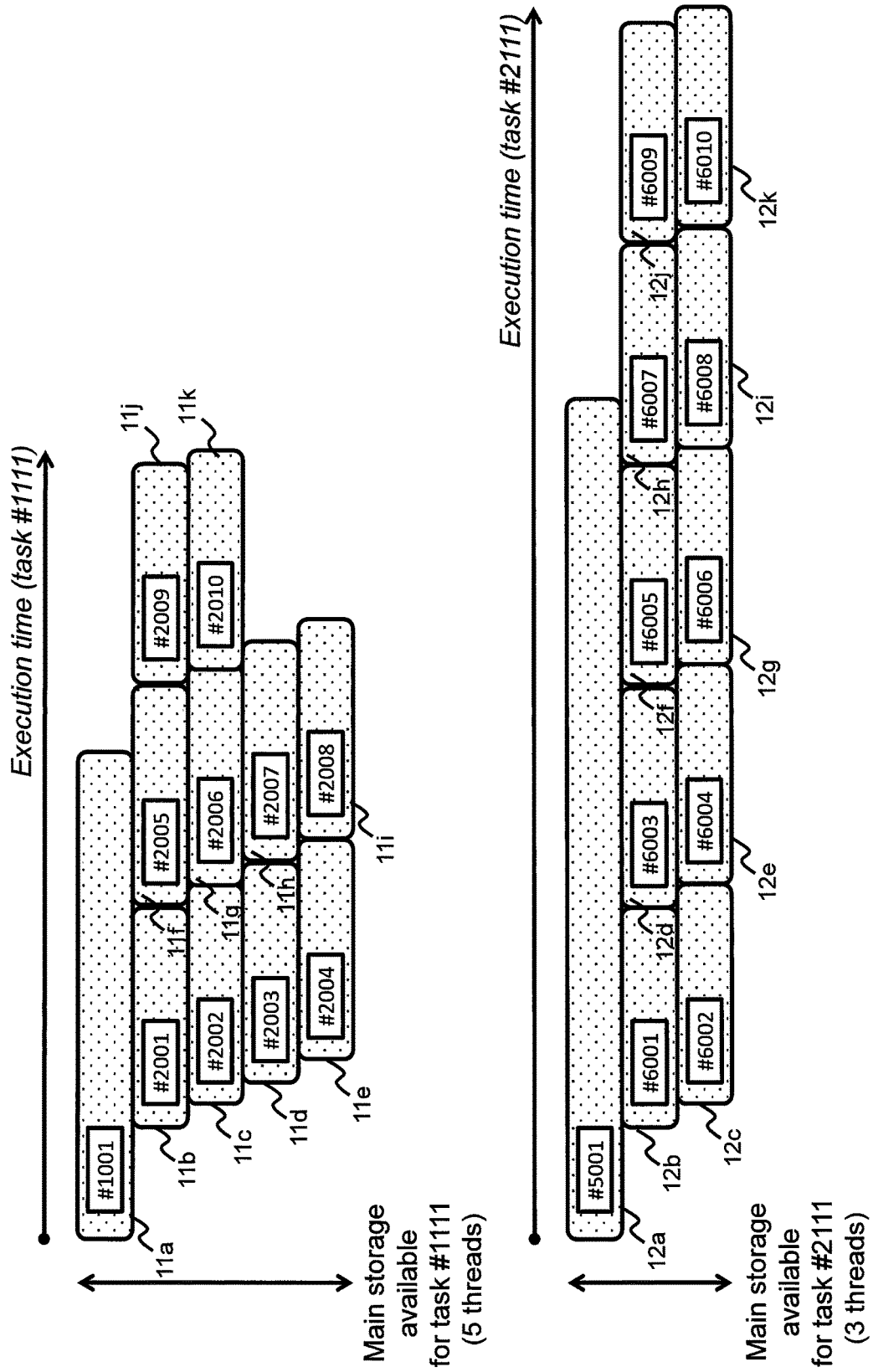

PARALLEL DATA PROCESSING SYSTEM, COMPUTER, AND PARALLEL DATA PROCESSING METHOD

TECHNICAL FIELD

This invention relates to a parallel data processing technique.

BACKGROUND ART

Strategic use of a large amount of data related to business and the like has become extremely important in activities of companies and the like. A parallel data processing system such as Hadoop has been used as an information system for utilizing a large amount of data. PTL 1discloses an example of the parallel data processing system.

CITATION LIST

Patent Literature

[PTL 1] U.S. Pat. No. 7,756,919

SUMMARY OF INVENTION

Technical Problem

In the parallel data processing system such as Hadoop, basically, processing is performed by reading the entire data set (file stored in a file system, for example) stored in a storage and the like. For example, even when selectivity is involved for data as a target of processing by an application (job) (specifically, when the target of the processing is a part of the records in a data set stored in a storage and the like), the entire data set needs to be read. Thus, the data processing is not necessarily executed efficiently, whereby the data processing might take a long time. Moreover, a larger data set requires longer time for reading the entire data set, whereby the data processing might take a long time.

All things considered, an objective of the present invention is to shorten the time required for the data processing.

Solution to Problem

A parallel data processing system on one computation node (computer, for example) in a computer system in which a plurality of computers execute parallel data processing includes a parallel data processing execution unit for reading a data from a data set including a first data set that includes a plurality of first data and a second data set that includes a plurality of second data and executing processing. The parallel data processing system may be a system module in Examples 1 and 2 described later, for example. The first data in the first data set may correspond to the second data in the second data set. For example the first data set may serve as an index for the second data set. Here, the first data may include a value of an index key for the second data and a reference to one or more second data corresponding to the value of the index key.

The parallel data processing execution unit
(A) reads the first data from the first data set, and acquires a first value from the first data based on first format information acquired from an application,
(B) generates one or more threads for respectively reading one or more second data corresponding to the first value from the second data set based on first reference information acquired from the application,
(C) executes (A) and (B) on one or more first data in the first data set, and
(D) executes a plurality of the threads in parallel.

The parallel data processing system may further include a reception unit that receives an instruction of processing from the application. Generally, the instruction from the application defines a procedure. However, the parallel data processing execution unit may execute (A) to (D) upon receiving the instruction from the application, so as to execute the processing in an order different from one specified in the procedure, even though the instruction from the application defines the procedure.

Advantageous Effects of Invention

According to the present invention, a computation node can execute parallel data reading for data processing. Thus, it is expected that a throughput in the data reading is improved, whereby a shorter data processing time is achieved.

BRIEF DESCRIPTION OF DRAWINGS

FIG. 1A shows a job execution model according to Embodiment 1.

FIG. 1B shows a job execution model according to Embodiment 2.

FIG. 3 A shows a first configuration example of a computation system according to an example.

FIG. 3 B shows a second configuration example of the computation system according to the example.

FIG. 5B shows an example of a format and a reference according to Embodiment 1.

FIG. 5D is a first diagram for explaining input data and processing on the input data, according to Embodiment 2.

FIG. 5F shows an example of a format according to Embodiment 2.

FIG. 5G shows an example of a reference scheme according to Embodiment 2.

FIG. 6A is an example of a schematic diagram for explaining a session at a time of data acquisition.

FIG. 7B shows a flow of record acquisition processing in a computation node that manages a record, according to Embodiment 1.

FIG. 7C shows configurations of a data read request management table and a remote record acquisition request management table, according to Embodiment 1.

FIG. 7E shows a flow of record acquisition processing in the computation node that manages a record, according to a modification of Embodiment 1.

FIG. 7F shows a configuration of a blocked remote record acquisition request management table according to a modification of Embodiment 1.

FIG. 8A shows configurations of resource constraint management tables at a node level, according to Embodiment 1.

FIG. 8B shows configurations of resource constraint management tables at a job level, according to Embodiment 1.

FIG. 8C shows a configuration of a resource constraint management table at a process level in an administer supervisor process, according to Embodiment 1.

FIG. 8D shows a configuration of a resource constraint management table at a process level in a supervisor process of each node, according to Embodiment 1.

FIG. 8E shows a configuration of a resource constraint management table at a task level in the administer supervisor process, according to Embodiment 1.

FIG. 8F shows a configuration of a resource constraint management table at a task level in the supervisor process of each node, according to Embodiment 1.

FIG. 9A shows a first example of a task according to Embodiment 1.

FIG. 9B shows an example of how threads are generated in the task shown in the first example, according to Embodiment 1.

FIG. 9E shows an example of how threads are generated in the task shown in the second example, according to Embodiment 1.

DESCRIPTION OF EMBODIMENTS

Figure 2A:
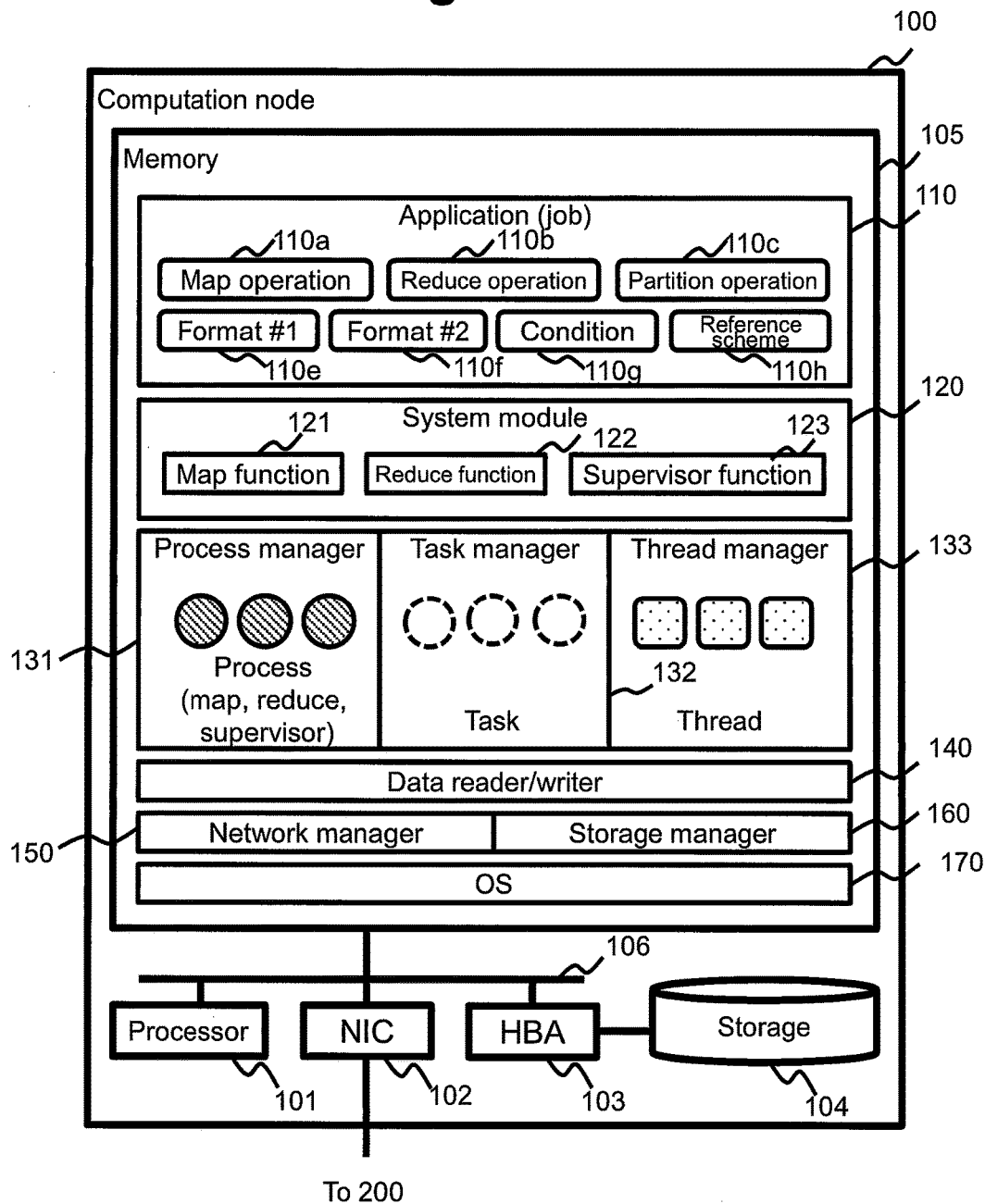
FIG. 2A shows a configuration of a computation node according to Embodiment 1.

Several embodiments and modifications are described below by referring to the drawings. The present invention is not limited by the description given below.

First of all, a job execution model according to Embodiment 1 is described.

FIG. 1A shows the job execution model according to Embodiment 1. In FIG. 1A, a single solid line circle represents a single process (map process or reduce process, for example). A single broken line circle in each process represents a single task. A single rounded rectangle in the task represents a single thread.

In the job execution model, a job is executed by a plurality of computation nodes connected with each other by a network. For example, a supervisor process (hereinafter, referred to as administer supervisor process) in a computation node that administers the plurality of computation nodes as a whole distributes codes of an application to all the computation nodes involved in the execution of the job. Thus, the administer supervisor process allocates processes such as a map process and a reduce process to supervisor processes of the respective computation nodes. The supervisor process of each computation node generates a process based on an instruction from the administer supervisor process. The process thus generated generates a task based on an instruction from the administer supervisor process. Each computation node executes the process and the task thus generated to execute the map operation and the like in the application, and thus executes the job. The administer supervisor process may be any one of a plurality of supervisor processes of a plurality of computation nodes (that is, any one of the supervisor processes may also serve as the administer supervisor process). Alternatively, the administer supervisor process may be a dedicated process functioning as a dedicated administer supervisor process prepared separately from the plurality of supervisor processes. How the processes are allocated is not limited to the way described above. The administer supervisor process may issue an instruction to the supervisor process of each computation node. How the process and the task are generated is not limited to the way described above. The administer supervisor process may directly generate the process and the task.

A parallel data processing system executes the map process in accordance with the job execution model. Specifically, the parallel data processing system reads records in an input data set #1 (that is, a first data set) and an input data set #2 (that is, a second data set) stored in a storage, to execute the map operation, and writes a result record of the map operation in an intermediate data set stored in the storage. Furthermore, the parallel data processing system executes a reduce process and thus executes a reduce operation with the result record, written in the intermediate data set, as an input, and writes a result record of the reduce operation in an output data set #1. Each of the input data set, the intermediate data set, and an output data set is a set of a plurality of records, and may be structured in accordance with a certain data structure or may not be structured. For example, the input data set #2 may be a set of one or more files.

The input data set #1 may have records corresponding to the records of the input data set #2. For example, the input data set #1 may serve as an index for the input data set #2. Each record of the input data set #1 may include a value of a predetermined index key for a record in the input data set #2 and a reference indicating one or more records in the input data set #2 corresponding to the value of the index key. Here, the reference may include a storage position at which the record of the input data set #2 can be identified on a storage device. The reference may also include a unique index key by which the record can be identified on a data structure provided for storing the input data set #2. The input data set #1 may include records corresponding to all the records in the input data set #2, or may only include records corresponding to a part of the records in the input data set #2. The input data set #1 may not serve as the index for the input data set #2. For example, the input data sets #1 and #2 may be in a combinable relationship, where the input data set #1 is merely a set of records whereas the input data set #2 is a set of records structured by a data structure with a certain search key. Thus, a record in the input data set #2 having a value of the search key corresponding to a value of a certain item of a certain record in the input data set #1 may be read.

The input data set #1 and the input data set #2 may belong to the same data structure. For example, the input data set #1 may be a set of internal nodes forming a B-tree, and the input data set #2 may be a set of leaf nodes forming the same B-tree. Alternatively, the input data set #1 may be a set of nodes at a certain level forming the B-tree, and the input data set #2 may be a set of nodes at the next level (referred to by the input data set #1) forming the same B-tree. There may be three or more input data sets, and thus, for example, another input data set corresponding to the records in the input data set #2 may further be provided.

In the map process, data processing is executed by processors of the respective computation nodes in accordance with the map operation, a partition operation, a format #1, a format #2, a reference scheme, a condition, and the like. The map operation, the partition operation, the format #1, the format #2, the reference scheme, the condition, and the like are program codes in the application stored in the computation node. The map operation is a program code defining processing applied to the read record, and, for example, generates a result record including a pair of a key and a value from the read record. The partition operation is a program code executed, after the map operation is executed, for determining the reduce process to which the execution result of the map operation is handed over. For example, the partition operation may include a hash operation for a key in the result record of the map operation. The format #1 is a program code defining a format for interpreting a record in the input data set #1. The format #2 is a program code defining a format for interpreting a record in the input data set #2. The reference scheme is a program code defining a scheme for acquiring a record in the input data set #2 in accordance with a reference in a record in the input data set #1. The condition is a program code defining a requirement, to be a target of the map operation, for a record among the records stored in the input data set #1 and/or the input data set #2. The condition may be entirely or partially executed, when the record is read from the input data set #1 and/or the input data set #2, or when the read record is input to the map operation. The program code may be a command generated through compiling and the like and executable by the processor, may be a command that can be converted into a command executable by the processor through an execution processing system, may be a declaration capable of generating a command executable by the processor through an execution processing system, or a combination of these. Furthermore, other information may further be provided. The commands and the declaration may be a byte string interpretable by the processor, the compiler, the execution processing system, or the like, or may be written in a source coat and the like.

Specifically, the processor of the computation node executes a task in the map process. In the task, the processor reads a record from the input data set #1, interprets the record by using the format #1, determines whether the record satisfies the requirement based on the condition, and acquires a reference to the input data set #2 from the record that has satisfied the requirement. Here, the input data set #1 may be divided into a plurality of chunks in advance. For example, the input data set #1 may be formed of a plurality of files. The administer supervisor process may respectively allocate different tasks to the files. Each task may read a record from the file to which the task is allocated. Alternatively, the input data set #1 may be dividable, as if the input data set #1 is formed of a plurality of chunks, at the time of execution. For example, the input data set #1 may be formed of a single file, and include information indicating a plurality of non-overlapping areas in the file. The administer supervisor process regards the areas as the chunks described above, and allocates different tasks to the areas. Each task reads the record from the area to which the task is allocated. The information indicating the areas may be provided in advance, or may be determined by the administer supervisor process, at the time of execution. Furthermore, means may be provided that prevents, when an area overlaps another area, the task allocated to one of the areas from reading the overlapping portion, at the time of reading. A selective access may be performed by using the requirement defined in the condition when the record is read from the input data set #1, if the input data set #1 is formed with a data structure (for example, sorted, formed of the B-tree and the like) enabling the selective access to the record satisfying the requirement defined in the condition.

Then, the processor generates a thread for reading a record from the input data set #2 based on the reference in the record in the input data set #1. When the record in the input data set #1 includes a plurality of references, the processor generates a plurality of the threads. For example, the thread may be generated for each of the references in the record in the input data set #1. The processor executes the threads in parallel. Furthermore, in the executed thread, the processor reads a record in the input data set #2 by reference based on the reference scheme. The processor interprets the read record by using the format #2, and determines whether the record satisfies the requirement based on the condition. The processor executes the map operation on the record satisfying the requirement, and then executes the partition operation to determine the reduce process to which the execution result of the map operation is transmitted. The processor outputs the execution result of the map operation in such a manner that the reduce process thus determined can receive the execution result. Specifically, the execution result is stored in the intermediate data set.

In the reduce process, the processor of each computation node executes data processing in accordance with the reduce operation and the like. The reduce operation is a program code in the application stored in the computation node. The reduce operation is a program code defining processing to be applied to a record in the intermediate data set. For example, the reduce operation generates a result record by aggregating the result records (including a pair of a key and a value) generated by the map operation in accordance with the key.

Specifically, the processor acquires the execution result record of the map operation from the intermediate data set, executes the reduce operation with the record as an input, and then stores the execution result record of the reduce operation in an output data set #1.

The map operation, the partition operation, the format #1, the format #2, the reference scheme, the condition, and the reduce operation may not be entirely defined by the application but may be partially defined. The undefined ones may be handled in a predetermined way. For example, when the reduce operation is undefined (that is, when the reduce process is undefined), the output of the map process may be regarded as the output of the job.

The data processing may further be executed by the processor of each computation node further in accordance with a comparison operation in the map process and/or the reduce process, or further in accordance with the aggregate operation in the map process. The comparison operation and the aggregate operation are program codes in the application stored in the computation node. The comparison operation is for defining orders of records to sort result record/input records, when the result record of the partition operation is written to the intermediate data set in the map process or the input record for the reduce operation is read from the intermediate data set in the reduce process. For example, the comparison operation compares the values of the keys of the result records (including a pair of a key and a value) generated by the map operation. The comparison operation may not be defined by the application, or may be defined for the map process or the reduce process. The same comparison operation may be defined for both processes, or different comparison operations may be respectively defined for both processes. The aggregate operation is for temporarily aggregating the result records when the result record of the partition operation is written to the intermediate data set in the map process. For example, the aggregate operation generates a result record by aggregating the result records (including a pair of a key and a value) generated by the map operation in accordance with the key. The aggregate operation may not be defined by the application. The comparison operation and the aggregate operation may be defined for the map process. In this case, for example, the aggregate operation may be executed on the result records sorted in accordance with the comparison operation.

In the map process, the records from a plurality of different data sets may be input in parallel or sequentially. For example, in the example described above, the input to the map operation is a record, read from the input data set #2 that the input data set #1 referred to. Furthermore, an input to the map operation may be a record separately read from an input data set #2-2 that an input data set #1 referred to. Here, the format #1, the format #2, the reference scheme, and the condition may be commonly used or a different set of these may prepared.

In FIG. 1A the job execution model is shown that includes the map process and the reduce process described in the document, Jeffrey Dean, Sanjay Ghemawat: MapReduce: Simplified Data Processing on Large Clusters. Proceedings of OSDI 2004, pp. 137-15 (2004 ). However, another job execution model may be employed. For example, in FIG. 1A, an example where the input data sets are provided in two stages is shown. Alternatively, the input data sets may be provided in equal to or more than two sets. In FIG. 1A, the job execution model including two stages of processes that are the map process and the reduce process is shown. Alternatively, the job execution model may include equal to or more than three stages of processes. In FIG. 1A, only the map process at the top reads a record from an input data set stored in the storage. Alternatively, for example, a process at another stage may read the record from the input data set in the storage. In FIG. 1A, the result record of the map process is written to the intermediate data set, and the reduce process reads the result record from the intermediate data set. Thus, the record is handed over from the map process to the reduce process. Alternatively, when the map process is executed, the result record may be transmitted through a network instead of being stored in the intermediate data set, and when the reduce process is executed, the result record of the map operation may be received through the network. The map process and the reduce process may be executed in parallel. When the reduce process is executed, the result record of the reduce operation may be output to a console or a printer or transmitted to another computer and the like through a network, without being written to the output data set. The map process may transmit the result record thereof to the reduce process through the network, and the reduce process may receive the result record through the network. Examples of the job execution model thus expanded are disclosed in the document, Michael Isard, Mihai Budiu, Yuan Yu, Andrew Birrell, Dennis Fetterly: Dryad: distributed data-parallel programs from sequential building blocks. Proceedings of EuroSys 2007, pp. 59-72 (2007) and the document, Vinayak R. Borkar, Michael J. Carey, Raman Grover, Nicola Onose, Rares Vernica: Hyracks: A flexible and extensible foundation for data-intensive computing. Proceedings of ICDE 2011, pp. 1151-1162(2011).

Next, a job execution model according to Embodiment 2 will be described.

FIG. 1B shows a job execution model according to Embodiment 2. FIG. 1B is illustrated in the same way as FIG. 1A. The job execution model according to Embodiment 2 is an expanded version of the job execution model according to Embodiment 1. The portions described in Embodiment 1 will not be described again, but are applied to Embodiment 2.

In this job execution model, a job is executed by a plurality of computation nodes connected with each other by a network. In a job exemplarily shown in FIG. 1B, a stage #1 process is executed so that records are read from the input data set #1, the input data set #2, an input data set #3, and an input data set #4 to be inputs for executing a stage operation #1, and execution result records thereof are transmitted to a stage #2 process. The stage #2 process is executed so that the execution result records are received to be inputs for executing a stage operation #2, and execution result records of the stage operation #2 are transmitted to a stage #3 process. Furthermore, the stage #3 process is executed so that the execution result records are received to be inputs for executing a stage operation #3, and execution result records of the stage operation #3 are transmitted to a stage #4 process. Furthermore, the stage #4 process is executed so that the execution records are received, records are read from an input data set #5 and an input data set #6, a stage #4 operation is executed with the results and the records as inputs, and the execution result thereof is stored in the output data set #1. Among processes of different stages, the data may be handed over through the intermediate data set or may be transmitted and received through the network, as in Embodiment 1. The processes in different stages may be executed in parallel.

The input data set #1 may serve as an index for the input data set #2. For example, each record of the input data set #1 may include a value of a predetermined index key for a record in the input data set #2 and a reference indicating one or more records in the input data set #2 corresponding to the value of the index key. Similarly, the input data set #3 may serve as an index for the input data set #4. Each record of the input data set #3 may include a value of a predetermined index key for a record in the input data set #4 and a reference indicating one or more records in the input data set #4 corresponding to the value of the index key. A predetermined item of a record in the input data set #2 may include a reference indicating one or more records in the input data set #3. Thus, one or more records in the input data set #3 can be associated with a certain record in the input data set #2. As in Embodiment 1, the reference may include a storage position at which a record in a referenced input data set can be identifiable on the storage device, or a unique index key that enables the record to be identifiable in a data structure forming the referenced input database. A referencing input data set may include records corresponding to all the records in the referenced input data set, or may include records corresponding to only a part of the records in the referenced input data set.

The input data set #may serve as an index for the input data set #6. Each record of the input data set #5 may include a value of a predetermined index key for a record in the input data set #6 and a reference indicating one or more records in the input data set #6 corresponding to the value of the index key.

In the stage #1 process, the processor in each computation node executes processing in accordance with the stage operation #1, a partition operation #1, the format #1, the format #2, a format #3, a format #4, the reference scheme #1, a reference scheme #2, a reference scheme #3, a condition #1, and a build scheme #1. The stage operation #1, the partition operation #1, the format #1, the format #2, the format #3, the format #4, the reference scheme #1, the reference scheme #2, the reference scheme #3, the condition #1, and the build scheme #1 are program codes in the application stored in the computation node. The stage operation #1 is a program code defining processing applied to a read record, and may be the map operation, the reduce operation, or other operations. The partition operation #1 is a program code executed for determining a process in the subsequent stage to which the operation result is handed over. For example, the partition operation may include a hash function for the input and the like. The format #1, the format #2, the format #3, and the format #4 are program codes respectively defining formats for interpreting the records in the input data set #1, the input data set #2, the input data set #3, and the input data set #4. The reference scheme #1, the reference scheme #2, and the reference scheme #3 are program codes respectively defining schemes for acquiring records from the input data set #2, the input data set #3, and the input data set #4, in accordance with references in the input data set #1, the input data set #2, and the input data set #3. The condition #1 is a procedure for defining a condition for a record to be a target of the stage operation #1. The condition #1 may be entirely or partly executed when the record is read from any one of the input data set #1, the input data set #2, the input data set #3, and the input data set #4, or when the read record is input to the map operation. The build scheme #1 is a program code defining a scheme for generating a record to be input to the stage operation #1 from a record read from the input data set #1, the input data set #2, the input data set #3, and the input data set #4.

Specifically, the processor of the computation node executes a task in the stage #1 process. In the task, the processor reads a record from the input data set #1, interprets the record by using the format #1, determines whether the record satisfies the requirement based on the condition #1, and acquires a reference to the input data set #2 from the record satisfying the requirement.

Then, the processor generates a thread for reading a record from the input data set #2 based on the reference in the record in the input data set #1. When the record in the input data set #1 includes a plurality of references, the processor generates a plurality of threads. For example, the thread may be generated for each of the references in the record in the input data set #1. The threads are executed in parallel by the processor. In the executed thread, the processor reads a record from the input data set #2 by reference, based on the reference scheme #1. The processor interprets the read record by using the format #2, and determines whether the record satisfies the requirement based on the condition #1. Then, the processor acquires a reference to the input data set #3 from the record satisfying the requirement. Here, the processor uses the reference to generate a thread for executing the processing by referring to the input data set #3. When there is a plurality of references, the processor generates a plurality of the threads. The threads are executed by the processor in parallel.

Then, the processor generates a thread for reading a record from the input data set #3 based on the reference in the record in the input data set #2. When the record in the input data set #2 includes a plurality of references, the processor generates a plurality of threads. For example, the thread may be generated for each of the references in the record in the input data set #2. The threads are executed in parallel by the processor. In the executed thread, the processor reads a record from the input data set #3 by reference, based on the reference scheme #2. The processor interprets the read record by using the format #3, and determines whether the record satisfies the requirement based on the condition #1. Then, the processor acquires a reference to the input data set #4 from the record satisfying the requirement.

Then, the processor generates a thread for reading a record from the input data set #4 based on the reference in the record in the input data set #3. When the record in the input data set #3 includes a plurality of references, the processor generates a plurality of threads. For example, the thread may be generated for each of the references in the record from the input data set #3. The threads are executed in parallel by the processor. In the executed thread, the processor reads a record from the input data set #4 by reference, based on the reference scheme #3. The processor interprets the read record by using the format #4, and determines whether the record satisfies the requirement based on the condition #1. The processor generates a record to be input to the stage operation #1 based on the build scheme #1 from the record satisfying the requirement, and executes the stage operation #1 with the record as an input. Then, the processor executes the partition operation #1 on an execution result record of one or more stage operations #1 to determine the subsequent stage #2 process to which the execution result record is transmitted. The processor outputs the execution result record in such a manner as to be receivable by the determined subsequent stage process. Specifically, the execution result is stored in the intermediate data set or transmitted to the subsequent stage process through a network.

In the stage #2 process, the processor of each computation node executes processing in accordance with the stage operation #2 and a partition operation #2. The stage operation #2 and the partition operation #2 are program codes in the application stored in the computation node. For example, the stage operation #2 is a program code defining processing applied to a record acquired from the intermediate data set or transmitted through the network, and may be the map operation, the reduce operation, or other operations for example. The partition operation #2 is a program code executed for determining the subsequent stage #3 process to which the execution result is handed over. For example, the partition operation #2 may include a hash function for the input and the like.

Specifically, the processor of the computation node executes a task in the stage #2 process. In the task, the processor acquires the record handed over from the stage #1 process, executes the stage operation #2, and then executes the partition operation #2 to determine the subsequent stage #3 process to which the execution result record of the stage operation #2 is transmitted. The processor outputs the execution result record of the stage operation #2 in such a manner as to be receivable by the determined subsequent stage process. Specifically, the execution result is stored in the intermediate data set or transmitted to the subsequent stage process through a network.

In the stage #3 process, the processor of each computation node executes processing in accordance with the stage operation #3 and a partition operation #3. The stage operation #3 and the partition operation #3 are program codes in the application stored in the computation node. For example, the stage operation #3 is a program code defining processing applied to a record acquired from the intermediate data set or transmitted through the network, and may be the map operation, the reduce operation, or other operations for example. The partition operation #3 is a program code executed for determining the subsequent stage #4 process to which the execution result is handed over. For example, the partition operation #3 may include a hash function for the input.

Specifically, the processor of the computation node executes a task in the stage #3 process. In the task, the processor acquires the record handed over from the stage #2 process, executes the stage operation #3, and then executes the partition operation #3 to determine the subsequent stage #4 process to which the execution result record of the stage operation #3 is transmitted. The processor outputs the execution result record of the stage operation #3 in such a manner as to be receivable by the determined subsequent stage process. Specifically, the execution result is stored in the intermediate data set or transmitted to the subsequent stage process through a network.

In the stage #4 process, the processor of each computation node executes processing in accordance with the stage operation #4, a format #5, a format #6, a reference scheme #4 and the like. The stage operation #3, the partition operation #3, the format #5, the format #6, and the reference scheme #4 are program codes in the application stored in the computation node. For example, the stage operation #4 is a program code that defines processing applied to a record acquired from the intermediate data set or transmitted through the network, and may be the map operation, the reduce operation, or other operations for example. The format #5 and the format #6, are program codes respectively defining formats for interpreting records in the input data set #5 and the input data set #6. The reference scheme #4 is a program code defining a scheme for acquiring a record in the input data set #6, in accordance with a reference in a record in the input data set #5.

Specifically, the processor of the computation node executes a task in the stage #4 process. In the task, the processor reads a record from the input data set #5, interprets the record by using the format #5, and acquires a reference to the input data set #6, from the record.

Then, the processor generates a thread for reading a record from the input data set #6, based on the reference in the record in the input data set #5. When the record in the input data set #5 includes a plurality of references, the processor generates a plurality of threads. For example, the thread may be generated for each of the references in the record in the input data set #5. The threads are executed in parallel by the processor. In the executed thread, the processor reads the record from the input data set #6, by reference, based on the reference scheme #4. The processor interprets the read record by using the format #6. The processor acquires a record as an execution result of the stage operation #3. The processor executes stage operation #4 with the records as inputs, and stores the execution result record in the output data set #1.

As in Embodiment 1, the stage operation #1, the partition operation #1, the format #1, the format #2, the format #3, the format #4, the reference scheme #1, the reference scheme #2, the reference scheme #3, the condition #1, the build scheme #1, the stage operation #2, the partition operation #2, the stage operation #3, the partition operation #3, the stage operation #4, the format #5, the format #6, and the reference scheme #4 may not be entirely defined by the application but may be partially defined. The undefined ones may be handled in a predetermined way.

As in Embodiment 1, in the process at each stage, data processing may further be executed by the processor of each computation node further in accordance with the comparison operation and the aggregate operation.

In the process at each stage, the records from a plurality of different data sets may be input in parallel or sequentially.

The job execution models according to Examples 1 and 2 are described. The job execution model is not limited to these.

For example, the common points in the job execution models according to Examples 1 and 2 are as follows.

Generally, in the parallel data processing system such as Hadoop, a data set in a storage space is not structured. In contrast, in Embodiment 1 and Embodiment 2, in a storage (for example, a file system), a first data set (for example, the input data set #1) including a plurality of first records is associated with a second data set (for example, the input data set #2) including a plurality of second records. Specifically, for example, the first data set serves as an index for identifying a second record, in the second data set, required for data processing. Specifically, the second data set may not be structured while the first data set is structured. With the first data set structured, even when the second data set associated thereto is not structured, the second record, in the second data set, required for data processing can be identified and accessed. As another example, the first data set and the second data set may be in such a relationship that the records thereof are combinable. Specifically, the second data set may be structured, while the first data set is not structured. With the second data set structured, a second record corresponding to a record in the first data set associated to the second data set can be selectively extracted.

Here, according to Embodiment 1 and Embodiment 2, the application prepares information such as information (for example, the format #1) related to a format for the first data set, information (for example, the format #2) related to a format for the second data set, and information (for example, reference scheme) related to a scheme for referencing the second record based on the first record. The information is a program code for example. Another program (such as a system module described later) independent from each application may include the information. Still, there is an advantage in a configuration where the application can individually prepare the information. For example, a data base management system (DBMS; Database Management System) manages a data set (table) in a storage space, based on a relational model. Catalogue information for the format, the reference scheme, and the like is managed independently from the application. In this case, for example, a column type of a record is selected from types (for example, integer, a character string, or the like) prepared in the DBMS in advance. However, for some applications, the column might be preferably interpreted with a type other than those prepared in the DBMS in advance. Thus, a configuration where the application can independently prepare information such as the format and the reference scheme could be advantageous in terms of flexibility of the data processing system. In the DBMS, generally, all the records in a data set (table) are required to strictly conform to the provided catalogue information. However, when a column needs to be added to a record recorded at or after predetermined date and time in a certain data set, in principle, a column needs to be added to all the records in the data set (table). Thus, a column (for example, an empty column) needs to be added to a record, before the predetermined date and time, not requiring the column. Generally, such an operation requires processing of rebuilding or reorganizing the data set (table). Thus, a considerable time is required for processing the data set (table) with a huge scale. If the application can prepare the information such as the format and the reference scheme, the application can prepare different information such as the format and the reference scheme separately for the record before the predetermined data and for the record after the predetermined date and time. Thus, an advantage may be recognized in which data processing can be flexibly adapted to changes in the record format by changing the application without changing the data set itself.

In Embodiment 1 and Embodiment 2, the program (for example, the system module) other than the application reads the first record from the first data set based on job information of data processing defined by the application, interprets the record based on the job information, generates and executes a thread based on the record, further reads a second record from the second data set in each thread, and can execute an operation defined in the job information on the read record. The computation node can execute data parallel reading for the data processing in accordance with the job information defined by the application. Thus, it is expected that a throughput in the data reading is improved, whereby a shorter data processing time is achieved.

Examples 1 and 2 are described below in detail. The Embodiment 2 is an expanded version of Embodiment 1. The portions described in Embodiment 1 will not be described again, but are applied to Embodiment 2.

FIG. 2A shows a configuration of a computation node according to Embodiment 1. FIG. 2A shows a configuration of a computation node that executes data processing in accordance with the job execution model shown in FIG. 1A.

A computation node 100 may be a computer such as a personal computer, a workstation, a server, or a main frame. The computation node 100 may be an auxiliary operational apparatus (for example, image processing device (GPU; Graphical Processing Unit) card) including an image processing device (GPU) mounted and used in the computer. Furthermore, the computation node 100 may be a virtual computer implemented by virtual software, virtual hardware, or the like in the computer or the auxiliary operational apparatus.

The computation node 100 includes a communication interface and a storage device, as well as an operational device connected thereto. The communication interface includes an NIC (Network interface card) 102 and an HBA (host bus adapter) 103 for example. The storage device includes a storage 104 and a memory 105 for example. The operational device is a processor (CPU; Central Processing Unit) 101 for example. The control device may include, in addition to the processor, a hardware circuit that executes dedicated processing (encoding or decoding for example). The processor 101, the NIC 102, the HBA 103, and the memory 105 are connected with each other through an internal bus 106. The storage 104 is coupled to the HBA 103.

The processor 101 executes a computer program. The NIC 102 implements connection between a network 200 and the computation node 100. For example, TCP/IP (Transmission Control Protocol/Internet Protocol) may be employed as a protocol for communications through the network 200. An input and output to and from the storage 104 is made through the HBA 103.

The storage 104 includes at least one non-volatile storage medium. The non-volatile storage medium is, for example, a magnetic disk or a flash memory. The storage 104 may include a plurality of non-volatile storage media, and may further include a RAID (Redundant ARRAY of Independent Disks) controller forming a storage space from the plurality of non-volatile storage media.

The memory 105 is, for example, a volatile storage medium (for example, DRAM (Dynamic Random Access Memory)), and stores a program executed by the CPU 101, data used by the program, and the like.

The memory 105 stores an application program (hereinafter, referred to as application) 110 a system module 120, a process manager 131, a task manager 132, a thread manager 133, a data reader/writer 140, a network manager 150, a storage manager 160, and an OS (Operating System) 170. The system module 120, the process manager 131, the task manager 132, the thread manager 133, the data reader/writer 140, the network manager 150, and the storage manager 160 (hereinafter, the program modules are collectively referred to as module group) may be a library module executed while being statically or dynamically linked to the application 110. In this case, an instruction from the application 110 or an instruction between the program modules in the module group is issued through a call interface disclosed by the module group. The module group may be a program operating independently from the application 110. In this case, the instruction from the application 110 may be issued through means such as inter-process communications, a shared memory, or the like.

The application 110 is a program defining a job in which an input data set stored in the storage 104 is read, predetermined processing is executed, and writing to the output data set is performed. The computation node executes the job by executing the application 110. The application 110 includes, as information pieces defining the job (job information), a map operation 110a, a reduce operation 110b, a partition operation 110c, a format 110e (format #1), a format 110f (format #2), and a condition 110g, for example.

The map operation 110a is a program code defining processing applied to a read record, and for example, generates a result record including a pair of a key and a value from the read record. The partition operation 110c is a program code executed, after the map operation is executed, for determining the reduce process to which the execution result of the map operation is handed over. For example, the partition operation may include a hash operation for the key in the result record of the map operation. The format 110e (format #1) is a program code defining a format for interpreting a record in the input data set #1. The format 110f (format #2) is a program code for defining a format for interpreting a record in the input data set #2. The reference scheme 110h is a program code defining a scheme for acquiring a record in the input data set #2 in accordance with a reference in the record in the input data set #1. The condition 110g is a program code defining a requirement for a record to be a target of the map operation, among records stored in the input data set #1 and/or the input data set #2. The application 110 may not define all the program codes described above. The undefined ones may be handled in a predetermined manner. For example, when the reduce operation is not provided, the reduce process is not executed, and the execution result record of the map operation in the map process is directly stored in the output data set. Furthermore, the application 110 may define a comparison operation (not shown) and an aggregate operation (not shown).

The system module 120 is a program module that is independent from the application 110 but operates in conjunction with the application 110, and executes a job in accordance with job information defined by the application 110, upon receiving an instruction to execute the job from the application 110. The system module 120 includes an interface unit (not shown) that receives an instruction for the job execution from the application 110 and an execution section including a map function 121, a reduce function 122, and a supervisor function 123. The map function 121 is a program code (function) executed in the map process. The reduce function 122 is a program code (function) executed in the reduce process. The supervisor function 123 is a program code executed in the supervisor process (including administer supervisor process). The system module 120 receives from the application 110 an instruction for the job execution by the interface section, and generates a process required for executing the job by the execution section. The system module 120 executes each function in the process to further generate and execute a task and a thread.

The system module 120 is described in detail. The CPU 101 of each computation node causes the system module 120 to generate the supervisor process and execute the supervisor function 123 in the supervisor process. For example, the generation of the supervisor process described above may be automatically performed in advance in response to the starting of the computation node or may be performed as required after the execution of the job is started. Any one of the supervisor processes of a plurality of computation nodes 100 that execute the job performs processing of administering the plurality of computation nodes 100. The supervisor process that administers the plurality of computation nodes 100 is referred to as administer supervisor process. Any one of the supervisor processes of a plurality of computation node 100 may always be the administer supervisor process. Alternatively, the supervisor process of the computation node 100 selected from the plurality of computation nodes 100 may be the administer supervisor process. The administer supervisor process may be provided to a computer other than the computation node 100.

The administer supervisor process distributes codes of the application 110 to all the computation node 100 involved in the job execution, and allocates the processes to the supervisor processes. The supervisor process of each node generates the process based on an instruction from the administer supervisor process. The administer supervisor process performs processing of checking states of the supervisor processes of all the computation nodes involved in the job execution. Each supervisor process performs processing of checking an execution state of the process involved in the job execution in the own computation node.

The process manager 131 manages a memory resource required for executing a process based on an instruction from the system module, that is, manages generation, deletion, an execution state, and the like of the process. The task manager 132 manages a memory resource required for executing a task based on an instruction from the system module, that is, manages generation, deletion, an execution state, and the like of the task. The thread manager 133 manages a memory resource required for executing a thread based on an instruction from the system module, that is, manages generation, deletion, an execution state, and the like of the thread.

The data reader/writer 140 performs reading/writing from/to the storage, based on an instruction from the system module 120. The data reader/writer 140 may be a file system for example. For example, when data needs to be read or written from or to the storage 104 of the own computation node 100 to perform reading or writing of instructed data, the data reader/writer 140 causes the storage manager 160 to execute the data reading or writing from or to the storage 104. When data needs to be read or written from or to the storage 104 of another computation node 100 connected through the network 200, the data reader/writer 140 causes the network manager 150 to execute the data reading or writing from or to the storage 104 of the other computation node 100 connected through the network 200. Here, the data reader/writer 140 may use a memory resource of the memory 105 to temporarily cache the data to be read or written.

The network manager 150 controls data communications with an apparatus (for example, another computation node 100 and the like) connected through the network. The storage manager 160 controls input and output to and from the storage 104 of the own computation node 100. The OS 170 manages devices such as the NIC 102, the HBA 103, and the storage 104, and also manages the computation node 110 as a whole.

In this specification, examples and modifications of the invention may be described with the name of the program or a part of the program (for example, application, system module, process, task, or thread) being the subject. In this case, the program or a part of the program performs predetermined processing by being executed by the operational device (for example the processor 101) provided to the computation node 100, by using the storage device (for example, the memory 105 and the storage 104) and/or the communication interface (for example, the NIC 102 and the HBA 103 ) as appropriate. Thus, the subject for describing the examples and the modification of the invention may be interpreted as the operational device, the processor 101, or the computation node 100. The program or a part of the program may be executed by hardware. In this case, the subject for describing the examples and the modification of the invention may be interpreted as the hardware instead of or in addition to the processor 101. A computer program such as the system module 120, the process manager 131, the task manager 132, the thread manager 133, the data reader/writer 140, the network manager 150, and the storage manager 160 may be installed in the computation node 100 from a program source. For example, the program source may be a storage medium readable by the computation node 100 or may be a computer communicably coupled to the computation node 100.

The computation node 100 may include at least one of components including the CPU 101, the NIC 102, and the HBA 103, in a plurality for the sake of performance and availability. The computation node 100 may include an input device (for example, a keyboard and a pointing device) (not shown) and a display device (for example, a liquid crystal display) (not shown). The input device and the display device may be integrally formed.

Figure 2B:
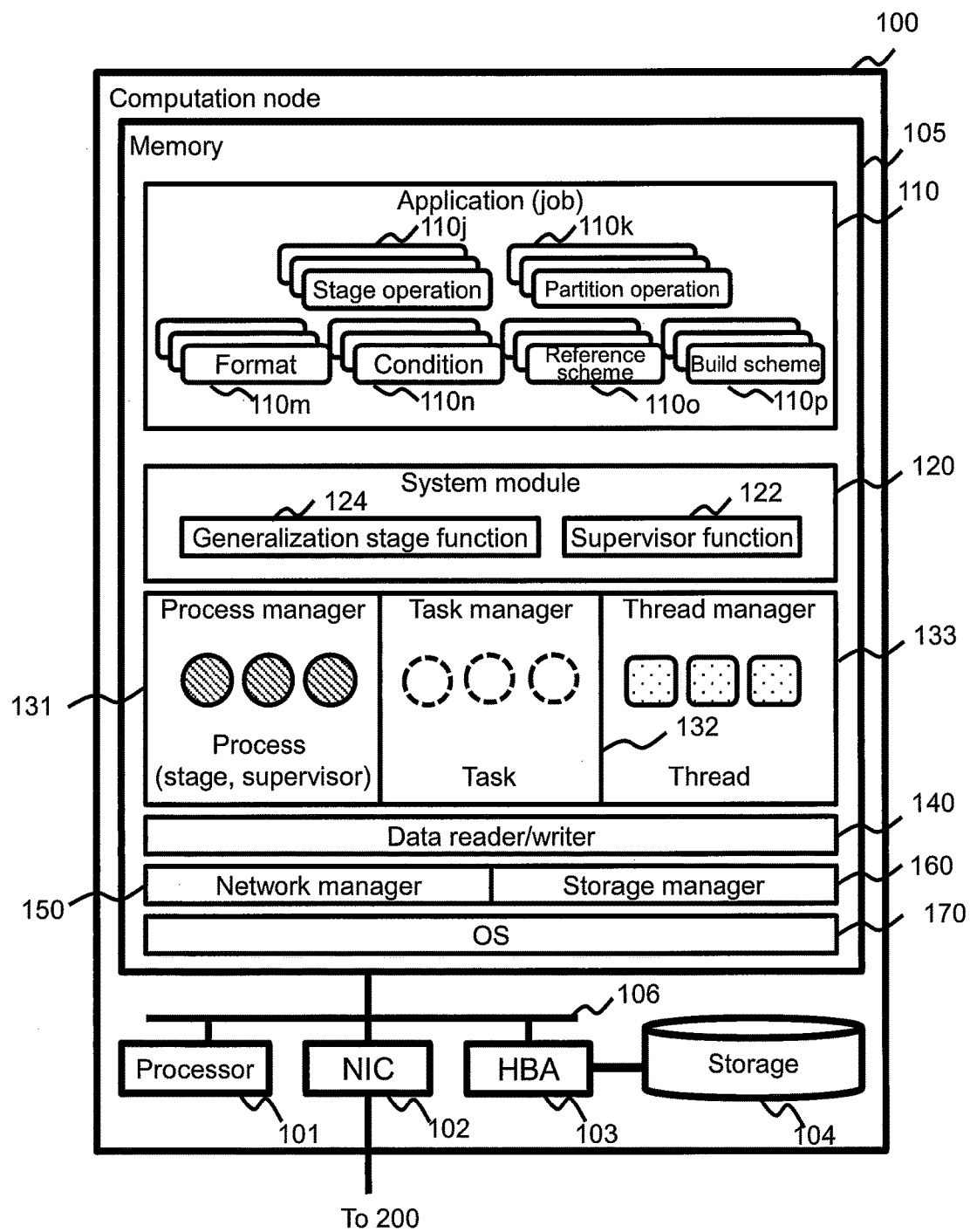
FIG. 2B shows a configuration of a computation node according to Embodiment 2.

FIG. 2B shows a configuration of a computation node according to Embodiment 2. FIG. 2B shows a configuration of a computation node that performs data processing based on the job execution model shown in FIG. 1B.

The application 110 includes, as job information pieces, one or more stage operations 110*j*, one or more partition operations 110*k*, one or more formats 110*m*, one or more conditions 110n, one or more reference schemes 110o, and one or more build schemes 110p.

The stage operation 110j is a program code defining processing applied to a record input in a process at each stage in the job execution model, and may be the map operation, the reduce operation, or other operations. In a case of the job execution model in FIG. 1B, four stage operations of stage operations #1 to #4 are included. The partition operation 110k is a program code executed when determining a process in the subsequent stage to which the execution result record is handed over. For example, the partition operation may include a hash operation for an input. The format 110m is a program code defining a format for interpreting a record in each input data set. The application 110 that executes the job execution model shown in FIG. 1B stores the formats 110m respectively corresponding to the input data sets #1 to #6. The condition 110n is a program code defining a requirement for a record to be a target of the stage operation. The reference scheme 110o is a program code defining a scheme for acquiring a record from a referenced input data set in accordance with a reference in a record in a certain input data set. The build scheme 110p is information indicating a scheme for generating an execution result record. The application 110 may not define all the program codes described above. The undefined ones may be handled in a predetermined way. The application 110 may further define a comparison operation (not shown) and an aggregate operation (not shown).

The system module 120 includes a generalization stage function 124 and a supervisor function 122. The generalization stage function 124 is a program code (function) executed in each process shown in FIG. 1B.

FIG. 3 A shows a first configuration example of a computer system according to an example. FIG. 3 B shows a second configuration example of a computer system according to the example.

As shown in FIG. 3 A, the computer system may include a plurality of computation nodes 100 connected with each other by the network 200 (for example, a local area network based on Ethernet (registered trademark)) through the NICs 102. As shown in FIG. 3 B, the computer system may include a plurality of computation nodes 100 connected with each other by the network 200 through the NICs 102, and further connected with one or more storages 400 by a network 300 (for example, a storage area network based on Fibre Channel) through the HBAs 103. The storage 400 may be coupled to the network 200 instead of the network 300 and perform input and output with a communication protocol (NFS or CIFS) for shared memory access.

The storage 400 includes at least one non-volatile storage medium. The non-volatile storage medium is, for example, a magnetic disk or a flash memory. The storage 104 may include a plurality of non-volatile storage media, and may further include a RAID (Redundant ARRAY of Independent Disks) controller forming a storage space from the plurality of non-volatile storage media. The storage resource of the storage 400 may partly or entirely be used in the same way as the storage 104 in the computation node 100.

Figure 4A:
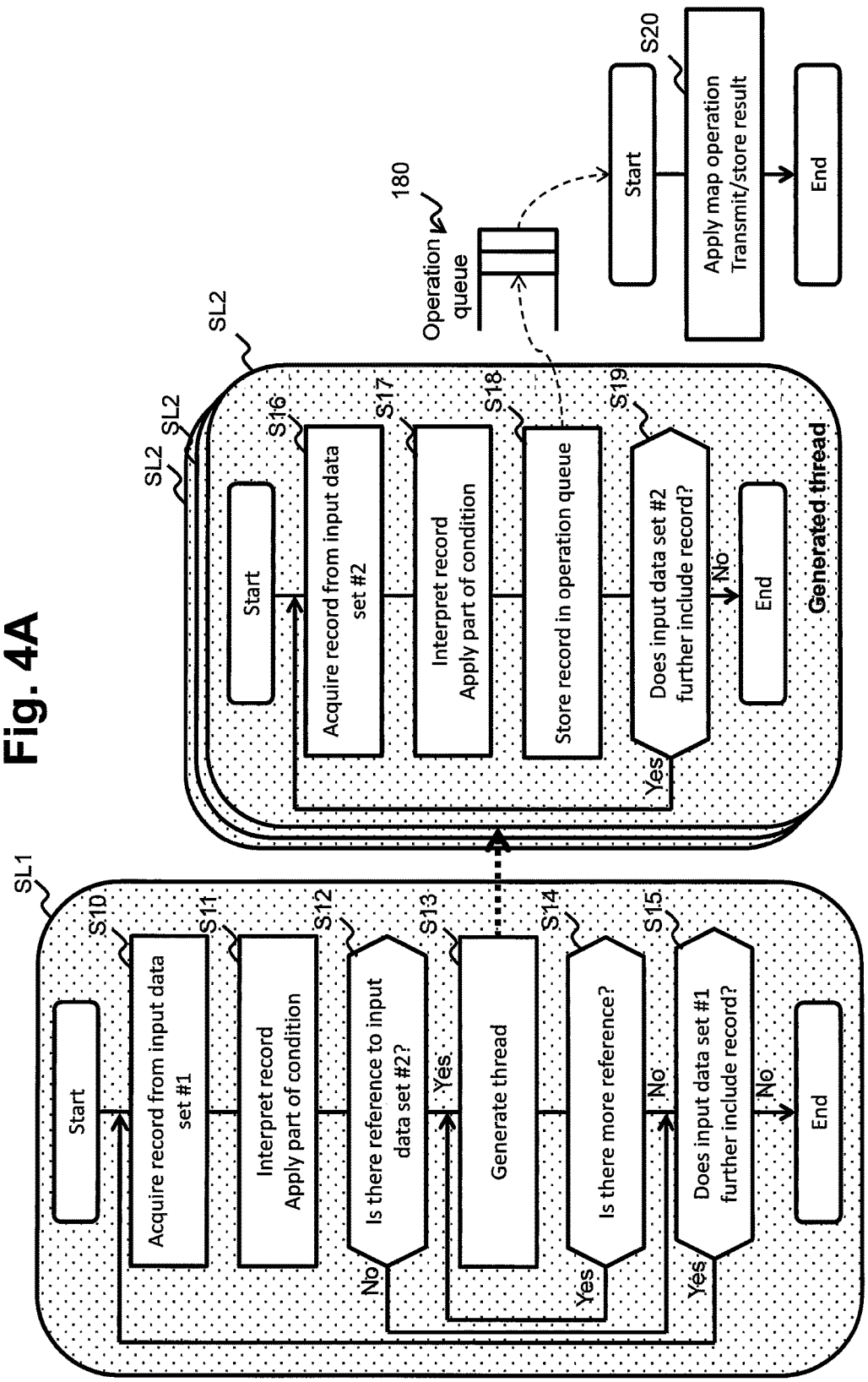
FIG. 4A shows a flow of map task execution processing according to Embodiment 1.

FIG. 4A shows a flow of map task execution processing according to Embodiment 1.

The map task execution processing represents processing executed in a map task executed in the map process in the job execution model shown in FIG. 1A.

Processing in steps S10 to S15 is executed when the processor 101 of the computation node 100 executes a single thread SL1 for reading a record in the input data set #1 and executes the processing. The processing is implemented by the processor 101 mainly executing the map function 121.

In step S10, the processor 101 acquires a single record from the input data set #1. Here, the input data set #1 may be stored in the storage 104 of the own computation node 100 or may be stored in the storage 104 of another computation node 100. Record acquisition processing for acquiring the record from the input data set #1 will be described later.

In S11, the processor 101 interprets a content of each item in the acquired record based on the format 110e (format #1), and applies, on the acquired record, the condition for the record in the input data set #1, in the condition 110g. Thus, the processor 101 determines whether the record satisfies the condition, and proceeds to S12 if required, and, although not elaborated in the figure, proceeds to S15 if not required. In S11, a part of the condition 110g may be applied. When the condition 110g is not defined, the processing may directly proceed to S12.

In S12, the processor 101 determines whether the acquired record includes a reference to the input data set #2. When the result of the determination is affirmative, S13 is executed, and when the result of the determination is negative, S15 is executed.

In S13, the processor 101 generates, for a single reference to the input data set #2 in the acquired record, a thread SL2 for acquiring a record from the input data set #2 and executing the processing.

In S14, the processor 101 determines whether the acquired record further includes an unprocessed reference to the input data set #2. When the result of the determination is true, S13 is executed, and when the result of the determination is false, S15 is executed. Thus, if the acquired record includes a plurality of references to the input data set #2, the threads SL2 are generated in a number corresponding to the number of references, in S13. When there is not an enough resource for generating the thread, the generation of the thread SL2 may be temporarily suspended. Here, a single thread SL2 may be generated for each reference or for a plurality (predetermined number, for example) of references.

In S15,the processor 101 determines whether the input data set #1 further includes a record. When the result of the determination is true, S10 is executed, and when the result of the determination is false, the processing is terminated and the thread SL1 that has executed the processing is stopped.

The thread SL2 generated by the thread SL1 in S13 is executed by the CPU 101. Processing in steps S16 to S19 is executed when the processor 101 executes the thread SL2. In this example, the processor 101 can execute a plurality of threads (the thread SL1, the thread SL2, and the like) in parallel. The computation node 100 may include a plurality of the processors 101, and the thread SL2 generated in a certain processor 101 may be executed by another processor 101. The number of threads that can be executed in parallel is limited by the resource of the computation node 100 and the like.

In S16, the processor 101 uses the reference method 110h and the reference acquired in the thread SL1 to acquire a single record from the input data set #2.

In S17, the processor 101 interprets a content of each item in the acquired record based on the format 110f (format #2), and applies, on the acquired record, the condition for the record of the input data set #2, in the condition 110g. Thus, the processor 101 determines whether the record is required, and proceeds to S18 if required, and, although not elaborated in the figure, proceeds to S19 if not required. In S17, a part of the condition 110g may be applied. When the condition 110g is not defined, the processing may directly proceed to S18.

In S18, the processor 101 stores the acquired record in an operation queue 180 of the main storage 105.

In S19, the processor 101 determines whether there is another record in a range indicated by the reference of the input data set #2. When the result of the determination is true, S16 is executed, and when the result of the determination is false, the processing is terminated, and the thread SL2 that has executed the processing is terminated.

In S20, the processor 101 acquires a single record from the operation queue 180, and executes predetermined processing on the record by applying the map operation 110a to the record, and outputs the execution result. Here, the processor 101 may execute S20 in a thread other than SL2. S20 may be executed in one or a plurality of threads. A plurality of records may be collectively acquired from the operation queue 180, and the map operation 110a may be applied thereto. Instead of executing S18 in the thread SL 2, the processor 101 may execute S20 after executing S17 in the thread SL2 to apply the map operation to the result record obtained in S17. Here, the execution result may be output in such a manner that, for example, the execution result is stored in the main storage 105, or the execution result is handed over to the reduce process that executes the subsequent processing.

In FIG. 4A, the thread SL1 for reading the record from the input data set #1 and performing the processing and the thread SL2 for reading the record from the input data set #2 and performing the processing are separately provided. Alternatively, the thread SL1 may perform the processing corresponding to S16 to S19 or S20 without generating the thread SL2. A predetermined number of threads SL1 may be generated, and the record may be read from the input data set #1 on the basis of the thread SL 1 and the processing may be executed. Furthermore, when it is determined that there is more record in S15, the SL1 may be newly generated to perform the processing corresponding to S10 to S15.

Figure 4B:
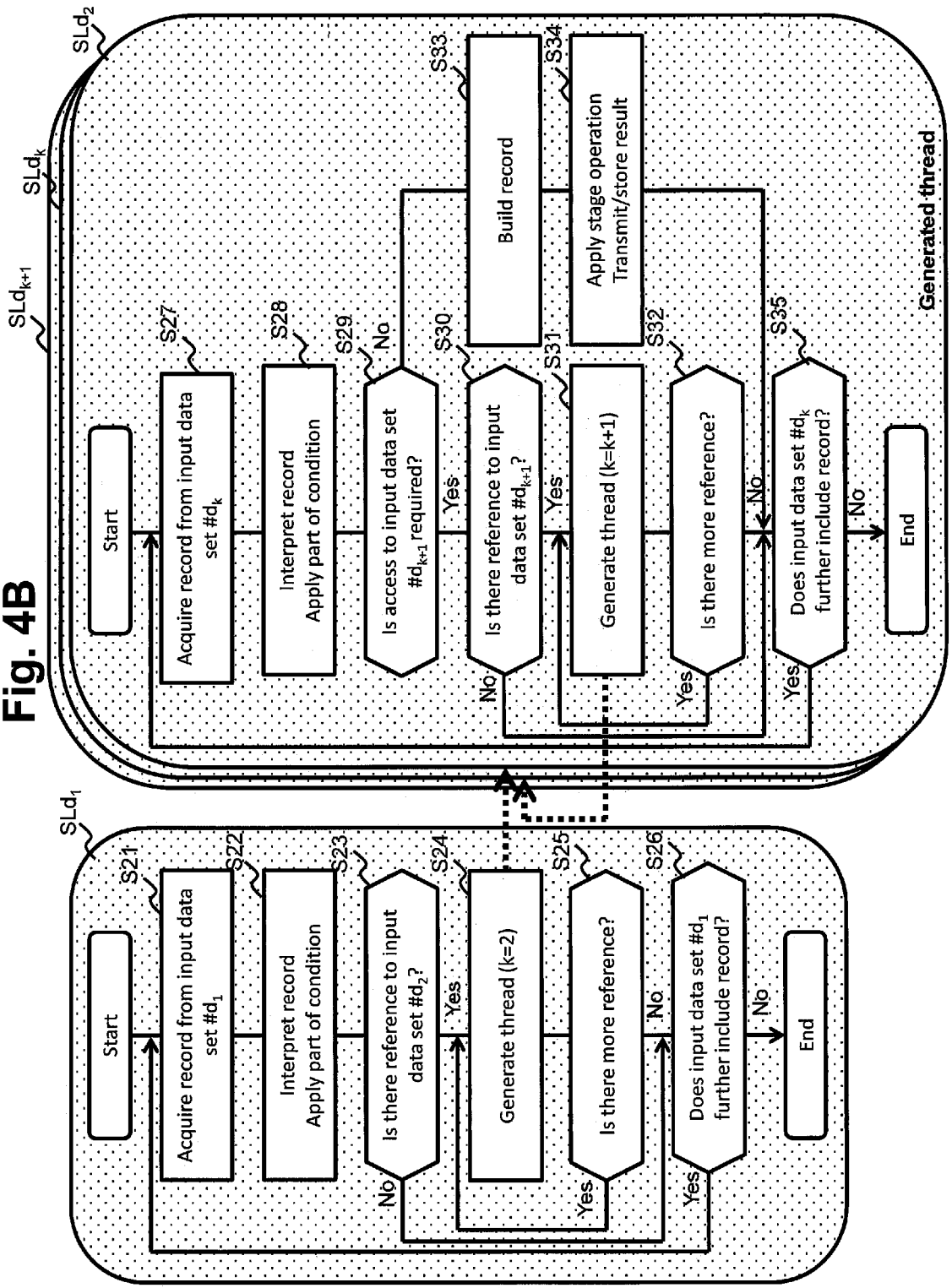
FIG. 4B shows a flow of task execution processing according to Embodiment 2.

FIG. 4B shows a flow of task execution processing according to Embodiment 2.

The task execution processing represents processing executed in a task executed in a stage process in the job execution model shown in FIG. 1B.

The processor 101 of the computation node 100 executes processing in steps S21 to S26 by executing a single thread SLd 1 for reading a record in the input data set #$d_1$ and executing the processing. Here, in the task execution processing for executing the stage #1 process in FIG. 1B, the input data set #$d_1$ is the input data set #1, and an input data set #$d_2$ is the input data set #2. In the task execution processing for executing a stage #4 process in FIG. 1B, an input data set #$d_1$ is the input data set #5, and the input data set #$d_2$ is the input data set #6.

In step S21, the processor 101 acquires a single record from the input data set #$d_1$. Here, the input data set #$d_1$ may be stored in the storage 104 of the own computation node 100 or may be stored in the storage 104 of another computation node 100. Record acquisition processing for acquiring the record from the input data set #$d_1$ will be described later.

In S22, the processor 101 interprets a content of each item in the acquired record based on the format 110m corresponding to a record in the input data set #$d_1$, and applies, on the acquired record, the condition for the record of the input data set #$d_1$, in the condition 110n. Thus, the processor 101 determines whether the record satisfies the condition, and proceeds to S23 if required, and, although not elaborated in the figure, proceeds to S26 if not required. In S22, a part of the condition 110n may be applied. When the condition 110n is not defined, the processing may directly proceed to S23.

In S23, the processor 101 determines whether the acquired record includes a reference to the input data set #$d_2$. When the result of the determination is true, S24 is executed, and when the result of the determination is false, S26 is executed.

In S24, the processor 101 generates, for a single reference to the input data set #$d_2$ in the acquired record, a thread SLd$_2$ for acquiring a record from the input data set #$d_2$ and executing the processing.

In S25, the processor 101 determines whether the acquired record further includes a reference to the input data set #$d_2$. When the result of the determination is true, S24 is executed, and when the result of the determination is false, S26 is executed. Thus, if the acquired record includes a plurality of references to the input data set #$d_2$, the threads SLd$_2$ are generated in a number corresponding to the number of references, in S24. When there is not an enough resource for generating the thread, the generation of the thread SLd$_2$ may be temporarily suspended. Here, a single thread SLd$_2$ may be generated for each reference or for a plurality (predetermined number, for example) of references.

In S26, the processor 101 determines whether the input data set #$d_1$ further includes a record. When the result of the determination is true, S21 is executed, and when the result of the determination is false, the processing is terminated and the thread SLd$_1$ that has executed the processing is terminated.

A thread SLd$_k$ generated from a thread SLd$_{k-1}$ in S24 and S31 described later is executed by the processor 101. Here, k represents a natural number not smaller than 2. For example, when k=2, SLd$_{k-1}$, SLd$_k$, and SLd$_{k+1}$ respectively represent SLd$_1$, SLd$_2$, and SLd$_3$. Processing in steps S27 to S35 is executed when the processor 101 executes the thread SLd$_k$. In this example, the processor 101 can execute a plurality of threads (the thread SLd$_1$, the thread SLd$_k$, and the like) in parallel. The computation node 100 may include a plurality of the processors 101, and a thread generated in a certain processor 101 may be executed by another processor 101. The number of threads that can be executed in parallel is limited by the resource of the computation node 100 and the like.

In S27, the processor 101 acquires a record in the input data set #SLd$_k$ based on a reference in a record in the input data set #SLd$_{k-1}$ and on a reference scheme 110o for referring to the input data set #SLd$_k$ by using the reference.

In S28, the processor 101 interprets a content of each item in the acquired record based on the format 110f (format #$d_k$)), and applies, on the acquired record, the condition for the record in the input data set #$d_k$, in the condition 110n. Thus, the processor 101 determines whether the record is required, and proceeds to S29 if required, and, although not elaborated in the figure, proceeds to S35 if not required. In S28, a part of the condition 110n may be applied. When the condition 110n is not defined, the processing may directly proceed to S29.

In S29, the processor 101 determines whether an access to the input data set #$d_{k+1}$ is further required. When the result of the determination is true, S30 is executed, and when the result of the determination is false, the processing proceeds to S33. For example, in the stage #1 process in FIG. 1B, the following processing is required. Specifically, a record is acquired from an input record #1, a record is acquired from an input record #2 in accordance with a reference in the record, a record is acquired from an input record #3 in accordance with a reference in the record, and a record is acquired from an input record #4 in accordance with a reference in the record. Thus, in S29 executed in the thread $SLd_k$ ($SLd_2$) executed with k=2, the access to the input data set #3 is further required, whereby the result of the determination is true. In S29 executed in the thread $SLd_k$ ($SLd_3$) generated with k=3, the access to the input data set #4 is further required, whereby the result of the determination is true. In S29 executed in the thread $SLd_k$ ($SLd_4$) generated with k=4, the access to another input data set is not required, whereby the result of the determination is false.

In S30, the processor 101 determines whether the acquired record includes a reference to the input data set $\#d_{k+1}$. When the result of the determination is true, S31 executed, and when the result of the determination is false, S35 is executed.

In S31, the processor 101 generates the thread $SLd_{k+1}$ for acquiring a record from the input data set $\#d_{k+1}$ and executing the processing, for a single reference to the input data set $\#d_{k+1}$ in the acquired record.

In S32, the processor 101 determines whether the acquired record further includes a reference to the input data set $\#d_{k+1}$. When the result of the determination is true, S31 executed, and when the result of the determination is false, S35 is executed. Thus, if the acquired record includes a plurality of references to the input data set $\#d_{k+1}$, the threads $SLd_{k+1}$ are generated in a number corresponding to the number of references, in S31. When there is not an enough resource for generating the thread, the generation of the thread $SLd_{k+1}$ may be temporarily suspended. Here, a single thread $SLd_{k+1}$ may be generated for each reference or for a plurality (predetermined number, for example) of references.

In S33, the processor s101 builds (generates) a record of a predetermined format, based on the acquired record and the build scheme 110p.

In S34, the processor 101 executes predetermined processing to the built record by applying a stage operation 110j, and outputs the execution result. Here, instead of executing S33 and then executing S34 in $SLd_k$, the processor 101 may temporarily store the built record in the operation queue of the main storage 105 and acquire a single record from the operation queue. The processor 101 may execute predetermined processing on the record by then executing S34 to apply the stage operation 110j, and output the execution result. Here, the processor 101 may execute S34 in a thread other than $SLd_k$. S34 may be executed in one or a plurality of threads. A plurality of records may be collectively acquired from the operation queue, and the stage operation 110j may be applied to the records.

In S35, the CPU 101 determines whether there is another record in a range indicated by the reference in the input data set $\#d_k$. When the result of the determination is true, S27 is executed, and when the result of the determination is false, the processing is terminated, and the thread $SLd_k$ that has executed the processing is stopped.

In FIG. 4B, the thread $SLd_{k-1}$ for reading the record from the input data set $\#d_{k-1}$ and processing the record and the thread $SLd_k$ for reading the record from the input data set $\#d_k$ and processing the record are separately provided. Alternatively, the thread $SLd_{k-1}$ may perform the processing corresponding to S27 to S35 without generating the thread $SLd_k$. A predetermined number of threads $SLd_1$ may be generated, and the record may be read from the input data set #1 and the processing may be executed in the threads $SLd_1$. Furthermore, when it is determined that there is more record in S26 or S35, the $SLd_1$ or the $SLd_k$ may be newly generated to perform the processing corresponding to S21 to S26 or the processing corresponding to S27 to S35.

Figure 5A:
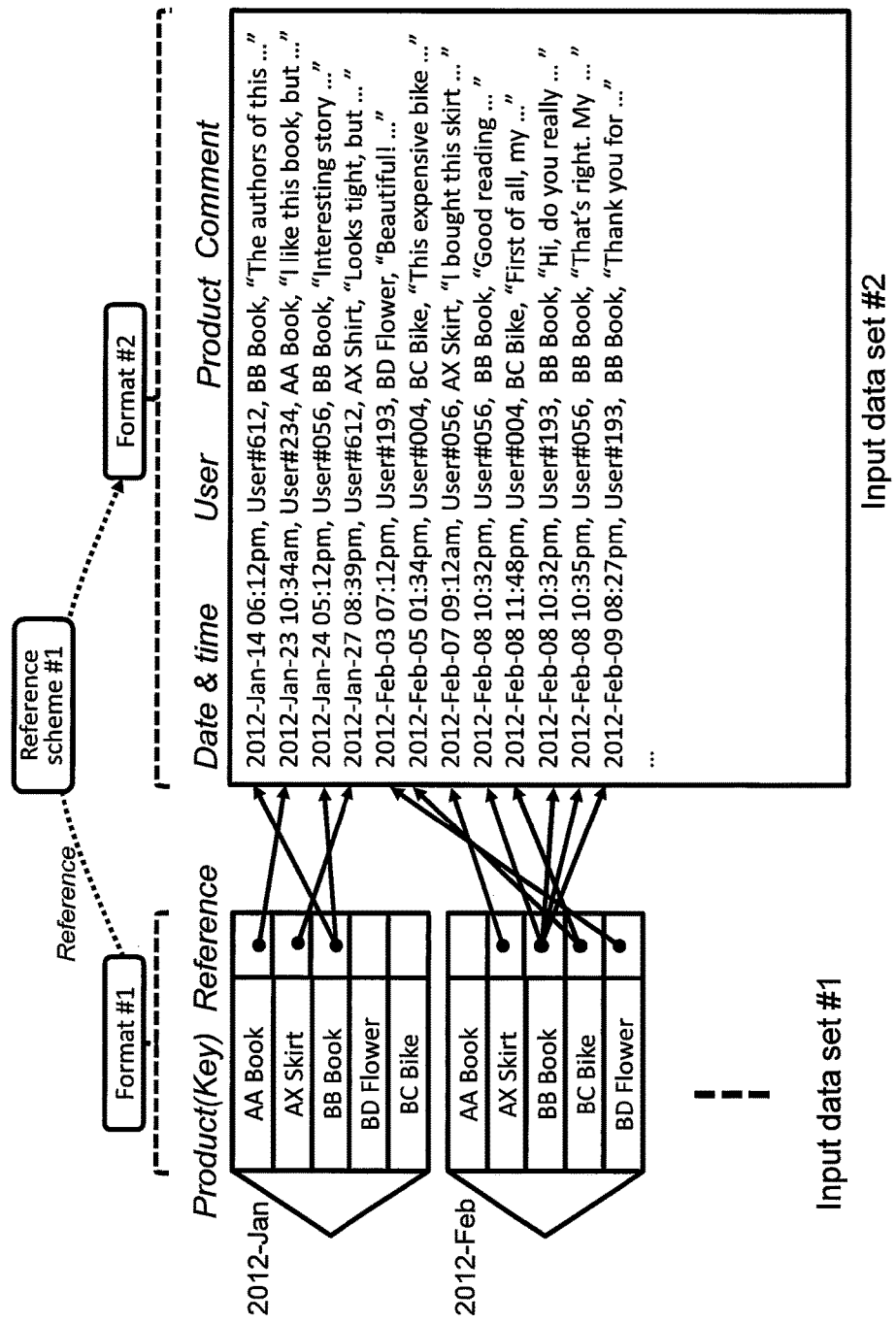
FIG. 5A is a diagram for explaining input data and processing on the input data, according to Embodiment 1.

FIG. 5A is a diagram for explaining input data and processing on the input data, according to Embodiment 1.

The input data set #2 stores one or more records including "Date & time", "User", "Product", and "Comment".

In the input data set #1, one or more records including items of "Product" and "Reference" is managed while being sorted into months and years. In other words, the input data set #1 is divided by months and years. For example, the supervisor process allocates a map task and the like to each of the sorted unit (partitioned portion) to execute the parallel data processing. Here, a single map task may be provided for a plurality of partitioned portions.

A value of an item ("Product") as a key for searching a record in the input data set #2 is stored in "Product". A reference indicating a physical storage position of a record (referenced record) which is associated with a month and a year corresponding to the record in the input data set #2, and which stores a value that is the same as the value of "Product" in the record, is stored in "Reference". When the input data set #2 includes a plurality of referenced records, references to a plurality of referenced records are stored in "Reference". The input record #2 may have a structure (for example, B-tree) enabling a record to be searched with a certain key, and a value of the key may be the reference stored in "Reference". A certain single reference may correspond to a plurality of records.

A format of a record in the input data set #1 is described in the format #1.

A format of a record in the input data set #2 is described in the format #2. A scheme for referring to a record in the input data set #2 by using "Reference" in the input data set #1 is described in the reference scheme #1.

In the map process in the job execution model shown in FIG. 1A, the processor 101 executes the map function 121 to read a record in the input data set #1, and checks Product and Reference in the record with the format #1. The map function 121 determines whether a predetermined condition is satisfied based on the value of Product, and identifies Reference in the record satisfying the condition. The processor 101 executes the map function 121 to acquire a record in the input data set #2 based on the reference scheme #1 and Reference.

FIG. 5B is a diagram for explaining a format and a reference according to Embodiment 1.

The format #1 is information related to a format of a record in the input data set #1. In this example, a procedure for interpreting a record in the input data set #1 is described in the format #1. The following is described in the format #1. Specifically, an input record (that is, a record in the input data set #1) is interpreted in a binary format, columns of the input record are respectively interpreted as Text type, Long type, Int type, and Int type, and a first (0) column serves as a search key. Here, the type of the column is described by using a type declaration in a Java (registered trademark) language, but the present invention is not limited to this.

The format #2 is information related to a format of a record in the input data set #2. In this example, a procedure for interpreting the record of the input data set #2 is described in the format #2. The following is described in the format #2. Specifically, an input record (that is, a record in the input data set #2) is interpreted with a text format (string format). Comma is used as a delimiter between the columns in the record. The first (0) column, which is DateTime type, is named as "Date & Time". The second (1) column, which is Text type, is named as "User". The third (2) column, which is Text type, is named as "Product". The fourth (3) column, which is Text type, is named as "Comment". An input column is interpreted based on the above information pieces.

The reference scheme #1 is a procedure in a scheme for referencing a record in the input data set #2 by using "Reference" in the input data set #1. It is described in the reference scheme #1 that the record is acquired by reference through physical reference with the second column of the input record (a record corresponding to the format #1) being an offset, the third column being a length, and the fourth column being a node ID. Here, the physical reference indicates that a referenced record corresponds to a byte sequence for a designated length from a designated offset (address) of a storage managed by a designated node ID as a start point.

Figure 5C:
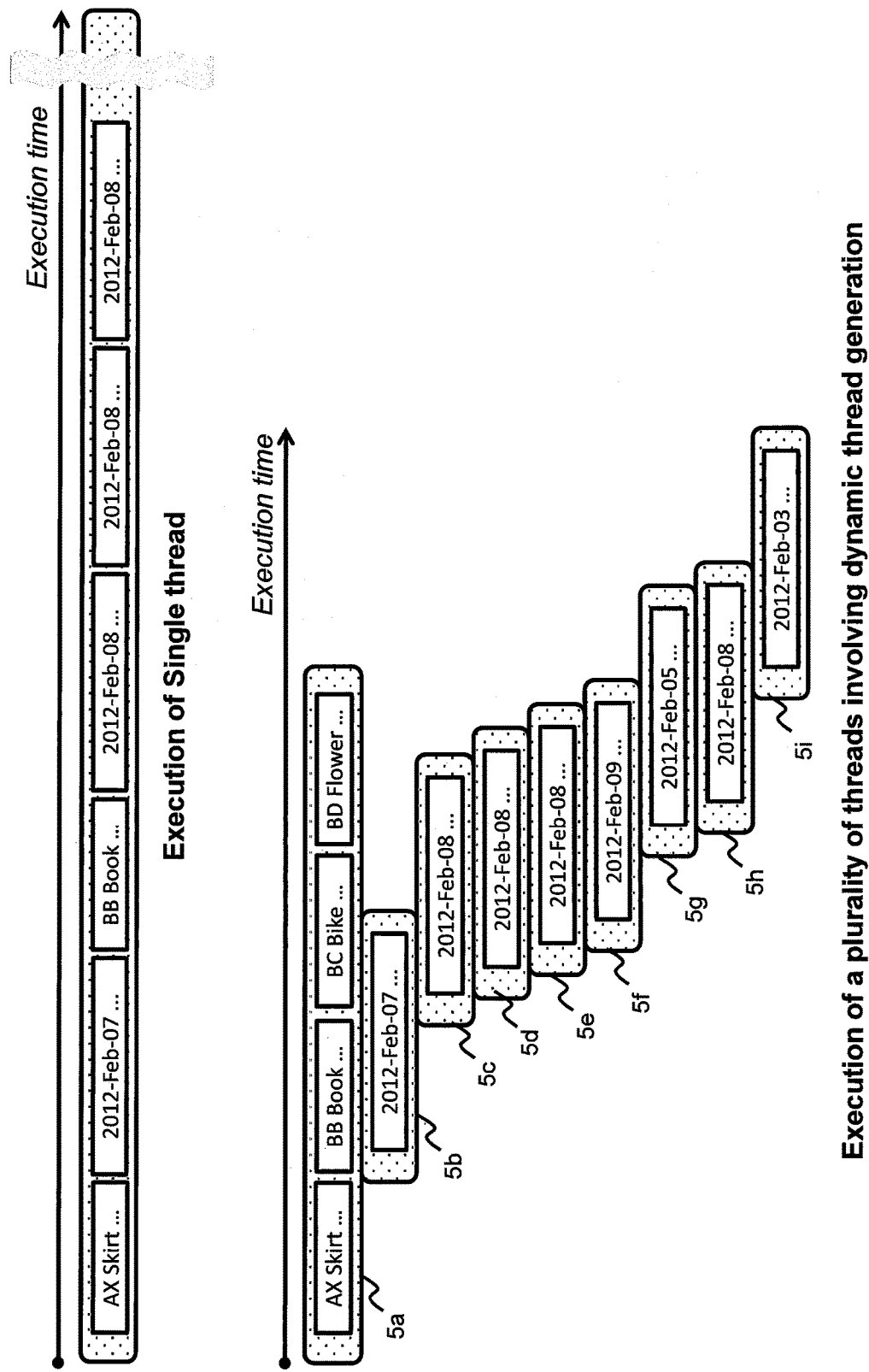
FIG. 5C is an example of a schematic diagram for explaining how threads are generated and executed.

FIG. 5C is an example of a schematic diagram for explaining how threads are generated and executed. On an upper side of FIG. 5C, an example where a process is executed with a single thread is shown. On a lower side of FIG. 5C, an example according to Embodiment 1 where a thread is dynamically generated, and a plurality of threads are executed in parallel. FIG. 5C is illustrated under the following rules.

The horizontal axis represents time.

A rounded rectangle extending in the horizontal direction in the figure represents a series of processing in a single thread. The left and right ends of the rounded rectangle respectively indicate the start and end times of the processing in the thread.

A value in the rounded rectangle represents information (a value of a top column of a record for example) indicating a record read in accordance with the processing corresponding to the thread.

Here, FIG. 5C shows an example where each record in the input data set #1 corresponding to February 2012(2012-Feb) shown in FIG. 5A is acquired, and the processing is executed.

As shown in the upper side of FIG. 5C, when the processing is executed with a single thread, the processing proceeds in the following manner. Specifically, the processor reads the second record (with "AX Skirt as the value of "Product") from the top corresponding to February 2012 (2012-Feb) in the input data set #1. The processor refers to the seventh record ("2012-Feb-07 . . . ") in the input data set #2 based on the value of "Reference" in the record. The processor reads a third record (with "BB Book" as the value of "Product") from the top in the input data set #1. The processor refers to the eighth record ("2012-Feb-08 . . . ") in the input data set #2 based on the value of "Reference" in the record. Then, the processor refers to the tenth record ("2012-Feb-08 . . . ") in the input data set #2 based on the value of "Reference" in the record. Then, the processor refers to the eleventh record ("2012-Feb-08 . . . ") in the input data set #2 based on the value of "Reference" in the record. Thus, the reading of record from the storage and the processing thereon are sequentially performed.

In this example, as shown in the lower side in FIG. 5C, the map function 121 first reads, with a thread 5a, the second record (with "AX Skirt as the value of "Product") from the top corresponding to February 2012 (2012-Feb) in the input data set #1, and then generates and executes a thread 5b for referring to the seventh record (2012-Feb-07 . . . ) in the input data set #2 based on the value of "Reference" in the record.

Then, with the thread 5a, the map function 121 reads the third record ("Ax Skirt as the value of "Product") from the top in the input data set #1 corresponding to 2012-Feb, and based on four values of "Reference" of the record, sequentially generates and executes threads 5c, 5d, 5e, and 5f for respectively referring to the eighth record (2012-Feb-08 . . . ), the tenth record (2012-Feb-08 . . . ), the eleventh record (2012-Feb-08 . . . ), and the twelfth record (2012-Feb-09 . . . ) in the input data set #2.

Then, with the thread 5a, the map function 121 reads the fourth record ("BC Bike as the value of "Product") from the top in the input data set #1 corresponding to 2012-Feb, and based on the two values of "Reference" of the record, sequentially generates and executes threads 5g and 5h for respectively referring to the sixth record and the ninth record in the input data set #2.

Then, with the thread 5a, the map function 121 reads the fifth record ("BD Flower as the value of "Product") from the top in the input data set #1 corresponding to 2012-Feb, and based on a single value of "Reference" in the record, generates and executes a thread 5i for referring to the fifth record (2012-Feb-03. . . ) in the input data set #2.

Figure 5E:
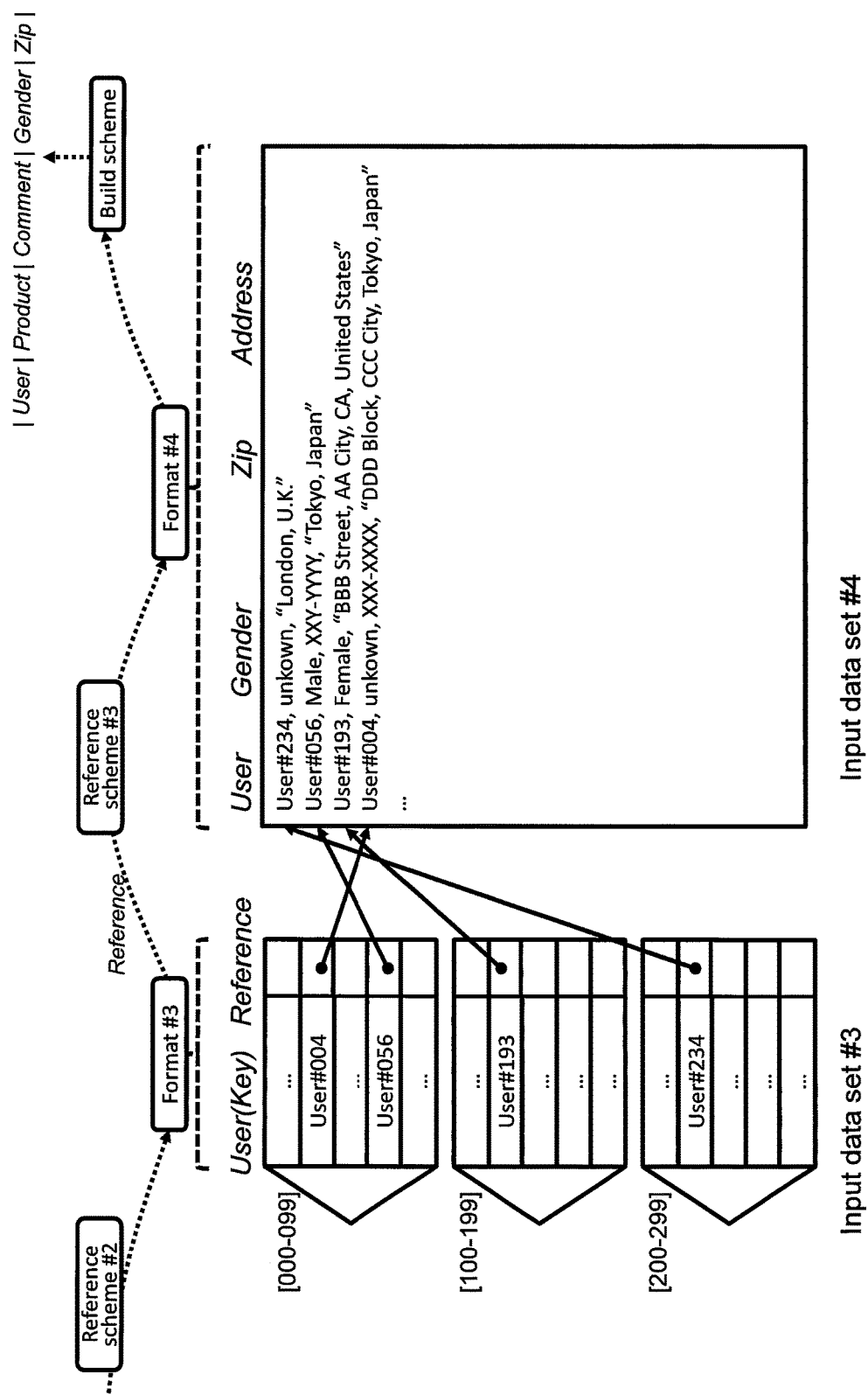
FIG. 5E is a second diagram for explaining input data and processing on the input data, according to Embodiment 2.

By dynamically generating a thread, reading a record in the thread and executing the processing, and executing a plurality of threads in parallel as shown in the lower side of FIG. 5C, the execution time of the processing can be shortened from that in the case of executing the processing with a single thread. FIG. 5D is a first diagram for explaining input data and processing on the input data according to Embodiment 2. FIG. 5E is a second diagram for explaining input data and processing on the input data according to Embodiment 2.

In a job execution plan according to Embodiment 2, a record in the input data set #3 is further referred to by using a value of the record in the input data set #2. Thus, as shown in FIG. 5D, the application 110 is further provided with a reference scheme #2 for referring to the input data set #3 based on a value (value of "User") of a record in the input data set #2. Here, the value of "User" is not a reference indicating a physical position of the record of the input data set #, corresponding to the value, but is a reference indicating a logical position (value enabling the search).

FIG. 5E shows the input data set #3 and the input data set #4.

The input data set #4 stores one or more records including "User", "Gender", "Zip", and "Address".

In the input data set #3, one or more records with including "User" and "Reference" is managed comprehensively in a predetermined range.

In "User", a value of an item serving as a key for searching a record in the input data set #4 is stored. In "Reference", a reference is stored that indicates a physical storage position of a record (referenced record) storing a value that is the same as the value of "Product" in the record in the input data set #4. When the input data set #3 includes a plurality of records, references to the plurality of referenced records are stored. The input record #3 may have a structure (for example, B-tree) in which a record is searchable with a certain key, and a value of the key may be the reference stored in "User". A certain single reference may correspond to a plurality of records.

A format of a record in the input data set #3 is described in the format #3. A format of a record in the input data set #4 is described in the format #4. A scheme for referencing a record in the input data set #4 by using "Reference" in the input data set #3 is described in the reference scheme #3. A procedure for generating, based on an acquired record, a record to be subsequently output is described in the build scheme.

In the stage #1 process in the job execution model shown in FIG. 1B, the processor 101 executes the generalization stage function 124 to read a record in the input data set #1, and check "Product" and "Reference" in the record with the format #1. The generalization stage function 124 determines whether a predetermined condition is satisfied based on the value of "Product" to identify "Reference" in the record satisfying the condition. Then, the generalization stage function 124 acquires a record in the input data set #2 based on the reference scheme #1 and "Reference".

Then, the processor 101 executes the generalization stage function 124 to check "User", "Product" and "Comment" in the read record in the input data set #2 with the format #2. Then, the generalization stage function 124 acquires a record in the input data set #3 based on a value of "User" and the reference scheme #2.

Then, the processor 101 executes the generalization stage function 124 to check "Reference" in the acquired record in the input data set #3 with the format #3. Then, the generalization stage function 124 acquires a record in the input data set #4 based on a value of "Reference" and the reference scheme #3.

Then, the processor 101 executes the generalization stage function 124 to check "User", "Gender", "Zip", and "Address" in the read record in the input data set #4 with the format #4. Then, the processor 101 executes the generalization stage function 124 to build a record including "User", "Product", "Comment", "Gender", and "Zip" based on the build scheme, and output the record.

FIG. 5F is a diagram for explaining a format according to Embodiment 2.

The format #3 is information related to a format of a record in the input data set #3. In this example, a procedure for interpreting a record in the input data set #3 is described in the format #3. The following is described in the format #3. Specifically, an input record (that is, a record in the input data set #3) is interpreted in a binary format, columns of the input record are respectively interpreted as Text type, Long type, Int type, and Int type, and a first (0) column serves as a search key.

The format #4 is information related to a format of a record in the input data set #4. In this example, a procedure for interpreting the record of the input data set #4 is described in the format #4. The following is described in the format #4. Specifically, an input record (that is, a record in the input data set #4 ) is interpreted with a text format (string format). Comma is used as the delimiter between the columns in the record. The first (0) column, which is Text type, is named as "User". The second (1) column, which is Text type, is named as "Gender". The third (2) column, which is Text type, is named as "Zip". The fourth (3) column, which is Text type, is named as "Address". An input column is interpreted based on the above information pieces.

FIG. 5G is a diagram for explaining a reference scheme according to Embodiment 2.

The reference scheme #2 is a procedure for referencing a record in the input data set #3 by using a value of a record in the input data set #2. Specifically, the record is acquired by reference through logical reference with a second column of the input record (record corresponding to the format #2) serving as a reference key. Here, the logical reference indicates that the referenced data set is searched with a value of a designated key to identify the referenced record.

The reference scheme #3 is a procedure in a scheme for referencing a record in the input data set #6,by using "Reference" in the input data set #4. Specifically, the record is acquired by reference through physical reference with the second, the third, and the fourth columns of the input record (record corresponding to the format #5 ) respectively being the offset, the length, and the node ID. Here, the physical reference indicates that a referenced record corresponds to a byte sequence for a designated length from a designated offset (address) of a storage managed by a designated node ID as a start point.

Figure 5H:
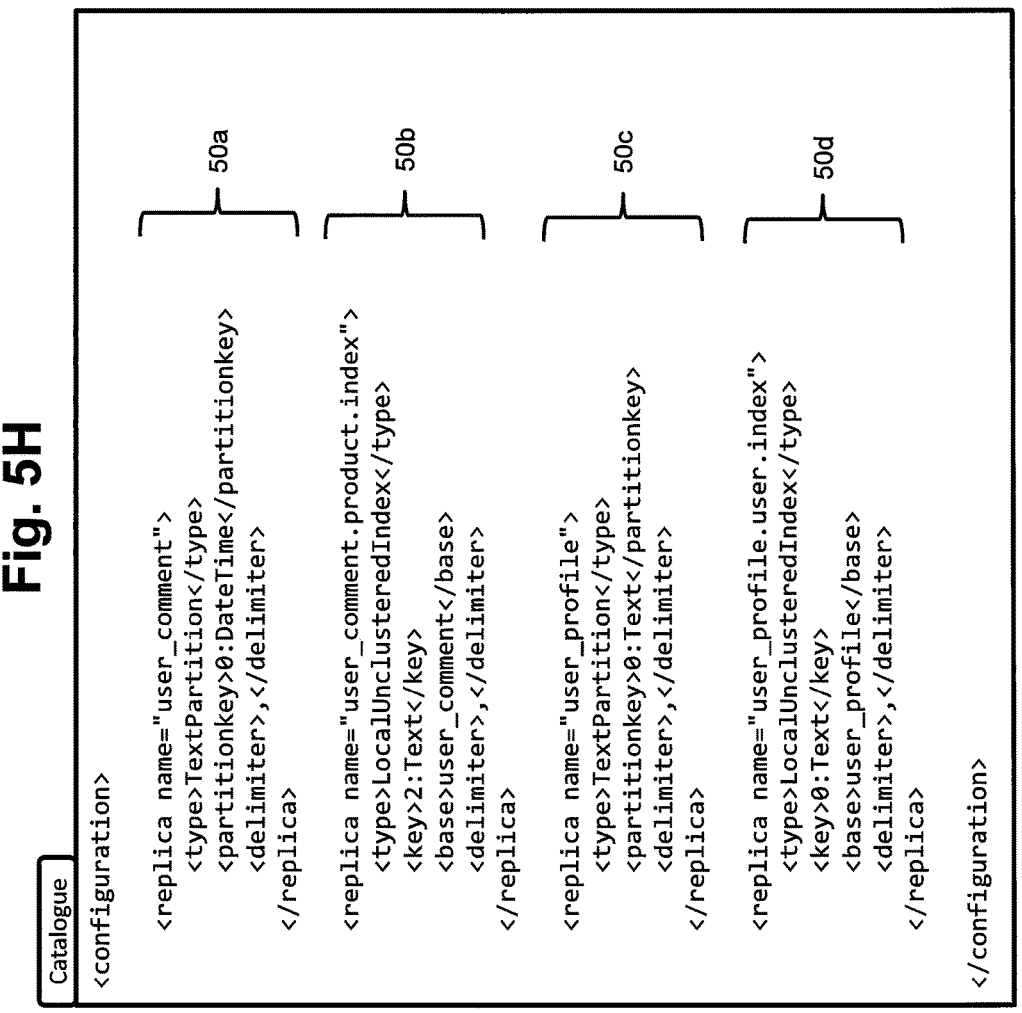
FIG. 5H shows an example of a catalogue according to Embodiment 2.

FIG. 5H shows an example of, a catalogue according to Embodiment 2.

In this example, the format and the reference scheme are written in a program code for example. Thus, when the format and the reference scheme are to be prepared by a user, the user himself or herself needs to be capable of creating a program code. However, not all the users are necessarily capable of creating a program code. Thus, in this example, the user can define a part of job information such as the format and the reference scheme by writing a catalogue that is easier than the program code, in the application. Thus, the parallel data processing system can execute a data processing job based on the catalogue. Here, the parallel data processing system may first convert the catalogue into the format and the reference scheme and then execute the job, or may directly execute the job with the catalogue.

A catalogue shown in FIG. 5H is written in XML (Extensible Markup Language) for example, and includes description units 50a to 50d related to four data structures.

The following is described in the description unit 50a. Specifically, a data set of "user_comment" corresponding to the input data set #2 is in a format obtained by dividing the text into columns, the first (0) column is interpreted with DateTime type to obtain a partition key, and a comma is used as the delimiter between the columns.

The following is described in the description unit 50b. Specifically, a data set of "user_comment.product.index" corresponding to the input data set #1 has a form of a local secondary index corresponding to "user_comment" and, based on "user_comment", the third (2) column in a case where a comma is used as the delimiter between columns is interpreted with Text type, to obtain an index key. The description units 50c and 50d have the similar description as the description units described above. A part of the job information required for the catalogue may not be entirely clearly defined. A system module and the like may perform the parallel data processing with those that are not clearly defined handled in accordance with a predetermined definition. For example, in the example described above, a partition key is not clearly defined for "user_comment.product-.index". However, "user_comment.product.index" is defined as the local secondary index, and thus is divided in the same manner as "user_comment" on which "user_comment.product.index" is based. Thus, "user_comment.product.index" as the secondary index may be provided for each partitioned portion of the "user_comment".

FIG. 6A is an example of a schematic diagram for explaining record acquisition according to Embodiment 1. The description, which is given below by referring to FIG. 6A to FIG. 9C, is for Embodiment 1, but is not limited to Embodiment 1 and can be applied to Embodiment 2.

When the processor 101 of the computation node 100 executes a thread and acquires a record with the thread, if the record is the record stored in the storage 104 of the own computation node 100, the processor 101 acquires the record from the storage 104. When the record is stored in the storage 104 of another computation node 100, a record acquisition request for acquiring the record is transmitted from the computation node 100 to the other computation node 100 through the local area network 200 for example.

The computation node 100 acquires the record as the other computation node 100 acquires the record from the own storage 104 in response to the record acquisition request. Here, a session is established between the computation node 100 and the other computation node 100. When a plurality of threads are executed, a session is established for each record acquisition request issued for each thread. In this case, the number of established sessions increases as the number of threads increases, thereby increasing processing for managing and controlling the session. This leads to a lower efficiency.

To address this, the session may be established for each block obtained by grouping a plurality of record acquisition requests.

Figure 6B:
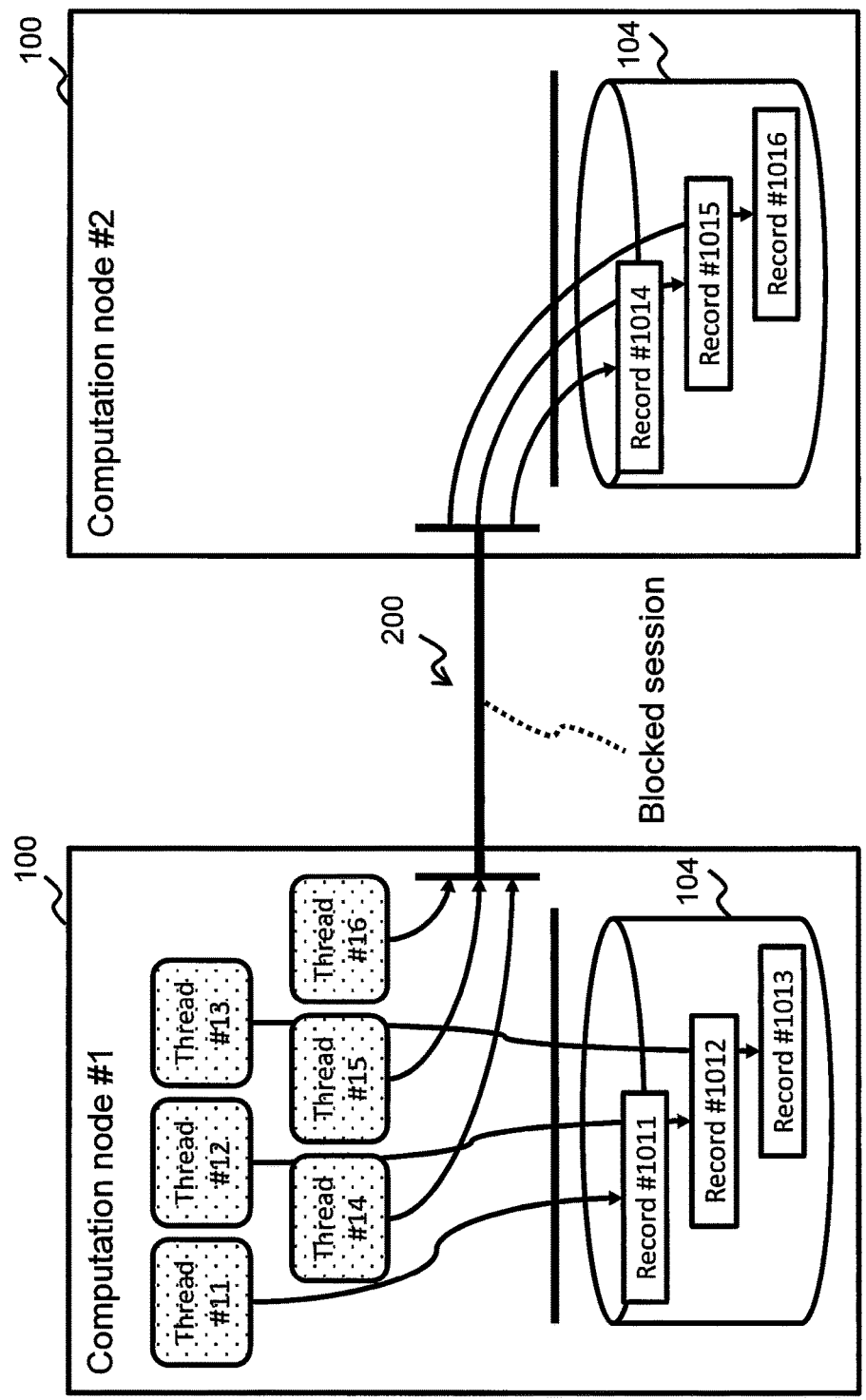
FIG. 6B is an example of a schematic diagram for explaining a blocked session at a time of data acquisition, according to a modification.

FIG. 6B is an example of a schematic diagram for explaining how the block is obtained at the time of data acquisition according to Embodiment 2.

The processor 101 of the computation node 100 groups a plurality of record acquisition requests generated by a plurality of threads into a single block (blocked record acquisition request). The processor 101 establishes a session between the computation node 100 and the other computation node 100 for each block. Thus, the number of sessions established between the computation nodes 100 can be reduced, and thus the processing efficiency can be prevented from degrading.

Figure 7A:
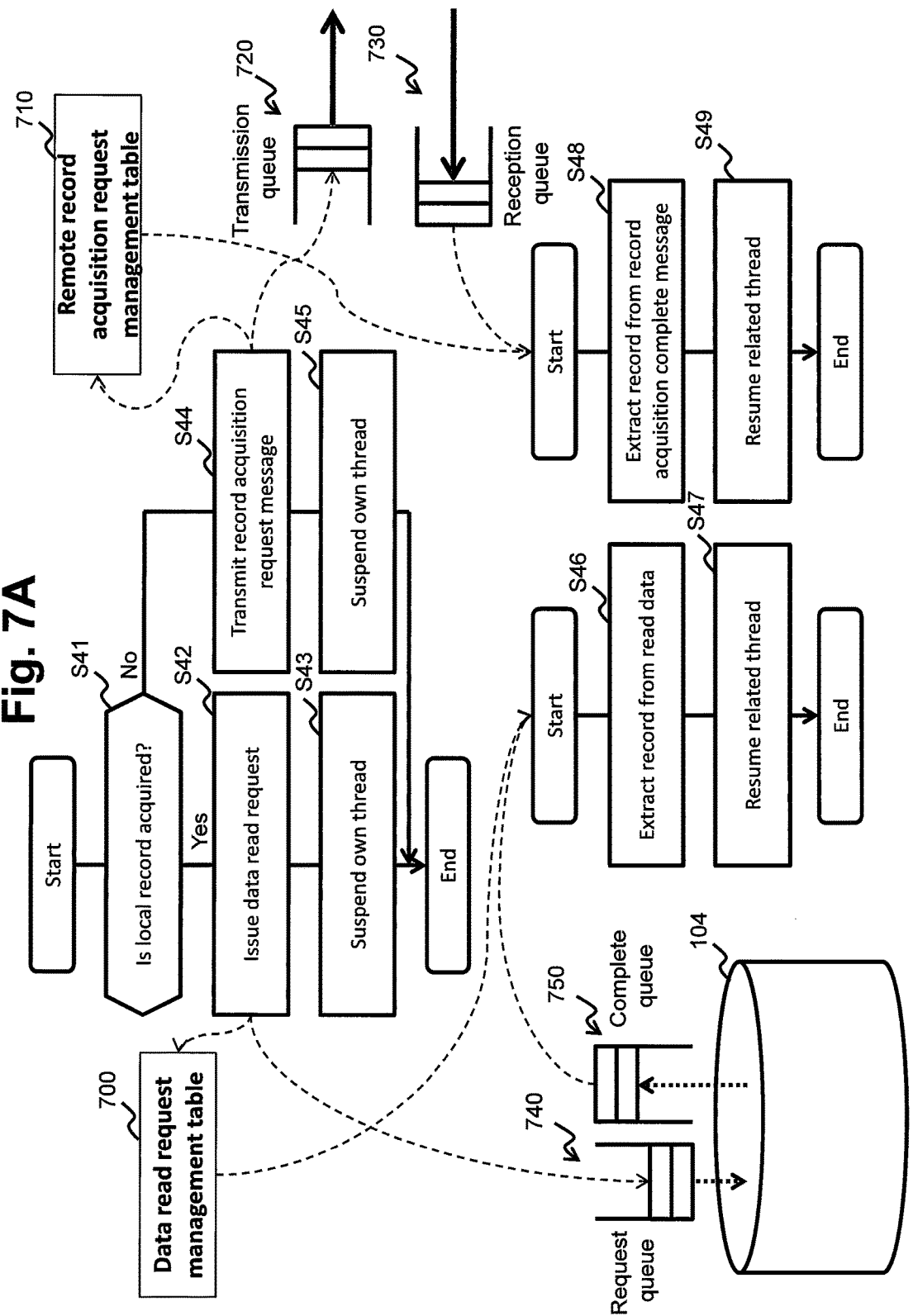
FIG. 7A shows a flow of record acquisition processing in a computation node that acquires a record, according to Embodiment 1.

FIG. 7A shows a flow of record acquisition processing in the computation node that acquires a record, according to Embodiment 1.

The record acquisition processing corresponds to processing in S10 and S16 in FIG. 4A as well as in S21 and S27 in FIG. 4B.

In S41 the data reader/writer 140 determines whether read (acquisition) of the record instructed from the system module 120 corresponds to acquisition of record from the storage 104 of the own computation node 100, that is, acquisition of a local record. When the result of the determination is true, S42 is executed, and when the result of the determination is false, S44 is executed.

In S42, the data reader/writer 140 causes the storage manager 160 to issue a data read request for reading data required for acquiring a record to the storage 104, through the OS 170 and the HBA 103. Specifically, the storage manager 160 stores information on the data read request in a data read request management table 700 (see FIG. 7C), and adds the data read request to a request queue 740 of the main storage 105 of the computation node 100. The OS 170 acquires the data read request from the request queue 740, and issue the data read request to the storage 104 through the HBA 103.

In S43, the data reader/writer 140 puts the own thread in a suspended state, and terminates the processing.

In S44, the data reader/writer 140 causes the network manager 150 to transmit a record acquisition request message to the other computation node 100 through the OS 170 and the NIC 102. Specifically, the network manager 150 stores information of the record acquisition request message in a remote record acquisition request management table 710 (see FIG. 7C), and adds the record acquisition request message to a transmission queue 720 of the main storage 105 of the computation node 100.

In S45, the data reader/writer 140 puts the own thread in the suspended state, and terminates the processing.

The storage 104 of the computation node 100 receives the issued data read request from the request queue 740, reads the data corresponding to the data read request, and transmits the data to the HBA 103. The OS 170 adds the read data to a completion queue 750 of the main storage 105 through the HBA 103.

Then, in S46, the data reader/writer 140 acquires data corresponding to the data read request from the completion queue 750 and extracts a record from the data. Record In S47, the data reader/writer 140 identifies the thread that uses the received record based on the data read request management table 700, resumes the thread, and terminates the record acquisition processing.

The NIC 102 transmits the record acquisition request message, stored in the transmission queue 720, to the computation node 100 as a destination. The NIC 102 stores in the reception queue 730, an acquisition complete message for the record acquisition request message transmitted from the other computation node 100.

In S48, the network manager 150 extracts a record from the acquisition complete message in the reception queue 730, and hands over the record to the system module 120.

In S49, the data reader/writer 140 identifies the thread that uses the received record based on the remote record acquisition request management table 710, resumes the thread, and terminates the record acquisition processing.

FIG. 7B shows a flow of record acquisition processing in a computation node that manages a record, according to Embodiment 1.

In the computation node 100 as the destination of the record acquisition request message, the record acquisition request message is acquired by the NIC 102 and stored in a reception queue 760 of the main storage 105 by the OS 170.

In S50, the network manager 150 of the computation node 100 as the destination acquires the record acquisition request message from the reception queue 760, and hands over the record acquisition request message to the data reader/writer 140.

In S51, based on the record acquisition request message, the data reader/writer 140 causes the storage manager 160 to issue a data read request for reading data required for acquiring a record, to the storage 104 through the OS 170 and the HBA 103, and terminates the processing. Specifically, the storage manager 160 adds the data read request to a request queue 780 of the main storage 105 of the computation node 100. The OS 170 causes the HBA 103 to acquire the data read request from the request queue 740, and issues the data read request to the storage 104.

The storage 104 receives the issued data read request from the request queue 780, reads the record corresponding to the data read request, and transmits the record to the HBA 103. The OS 170 causes the HBA 103 to add the read record to a completion queue 790 of the main storage 105.

Then, in S52, the data reader/writer 140 extracts a record from data corresponding to the data read request from the completion queue 790.

In S53, the data reader/writer 140 provides the received record in an acquisition complete message, transmits the acquisition complete message to the computation node 100 as the source of the record acquisition request message through the network manager 150, and terminates the processing. Specifically, the network manager 150 adds the acquisition complete message to the transmission queue 760 of the main storage 105 of the computation node 100.

The NIC 102 transmits the acquisition completion message stored in the transmission queue 760 to the computation node 100 as the source of the record acquisition request message. In the computation node 100 as the source, the NIC 102 stores the acquisition completion message in the reception queue 730.

The processing shown in FIG. 7A may be executed in a thread (SL1, SL2, SLd$_1$, SLd$_2$, SLd$_k$, SLd$_{k+1}$, or the like) that executes the processing in S10 or S16 in FIG. 4A, or in S21 or S27 in FIG. 4B. For example, the CPU 101 may execute the data acquisition processing in S10 in the thread SL1, and thus the CPU 101 may execute a procedure corresponding to S41 to S45 in the same thread SL1. The processing shown in FIG. 7A may be executed in a thread other than the thread (SL1, SL2, SLd$_1$, SLd$_2$, SLd$_k$, SLd$_{k+1}$, or the like) that executes the processing in S10 or S16 in FIG. 4A, or in S21 or S27 in FIG. 4B. For example, the CPU 101 may execute the data acquisition processing in S10 in the thread SL1, and may execute a procedure corresponding to S41 to S45 in another thread. Here, different threads may be provided respectively for the procedure corresponding to S41 to S45, a procedure corresponding to S46 and S47, and a procedure corresponding to S48 and S49, or the procedures may be executed in the same thread. A plurality of threads may be provided for each procedure. Another thread may be further provided for driving the procedure corresponding to S46 and S47 and the procedure corresponding to S48 and S49. The procedures may be driven by means such as preempting, a signal, or the like, as a result of adding pieces to the completion queue 750 and the reception queue 730 by the HBA 103 and the NIC 102.

For the processing shown in FIG. 7B, different threads may be provided respectively for a procedure corresponding to S50 and S51 and a procedure corresponding to S52 and S53, or the procedures may be executed in the same thread. A plurality of threads may be provided for each procedure. Another thread may be further provided for driving the procedure corresponding to S52 and S53. The procedure may be driven by means such as preempting, a signal or the like as a result of adding a piece to the completion queue 790 by the HBA 103.

FIG. 7C shows configurations of a data read request management table and a remote record acquisition request management table according to Embodiment 1.

The data read request management table 700 includes, as information pieces for each data read request, a thread ID 701, a request issue time 702, and a data read request 703. The data read request 703 includes a device ID 704, an offset address 705, a read length 706, and a buffer address 707. The information pieces are as follows.

The thread ID 701 indicates an ID for identifying a thread that has issued a data read request.

The request issue time 702 indicates time at which the data read request is issued.

The data read request 703 indicates the content of the data read request.

The device ID 704 indicates a device ID of the storage 104 as the destination of the data read request.

The offset address 705 indicates an address (offset address) in the storage 104 storing the record as a target of the data read request.

The read length 706 indicates a data length (byte length) of a record to be read.

The buffer address 707 indicates an address of an area (buffer) on the main storage 105 storing the record as the target of the data read request.

The remote record acquisition request management table 710 includes, as information pieces for each record acquisition request, a thread ID 711, a request issue time 712, and a record acquisition request 713. The record acquisition request 713 includes a computation node ID 714, a record reference 715, and a buffer address 716. The information pieces as follows.

The thread ID 711 indicates an ID for identifying a thread that has issued a record acquisition request.

The request issue time 712 indicates time at which the record acquisition request is issued.

The record acquisition request 713 indicates the content of the record acquisition request.

The computation node ID 714 indicates an ID (computation node ID) of a computation node as the source of the record acquisition request.

The record reference 715 indicates reference information to a record as a target of the record acquisition request.

The buffer address 716 indicates an address of an area (buffer) on the main storage 105 in which the record as the target of the data read request.

Next, record acquisition processing according to a modification of Embodiment 1 will be described.

Figure 7D:
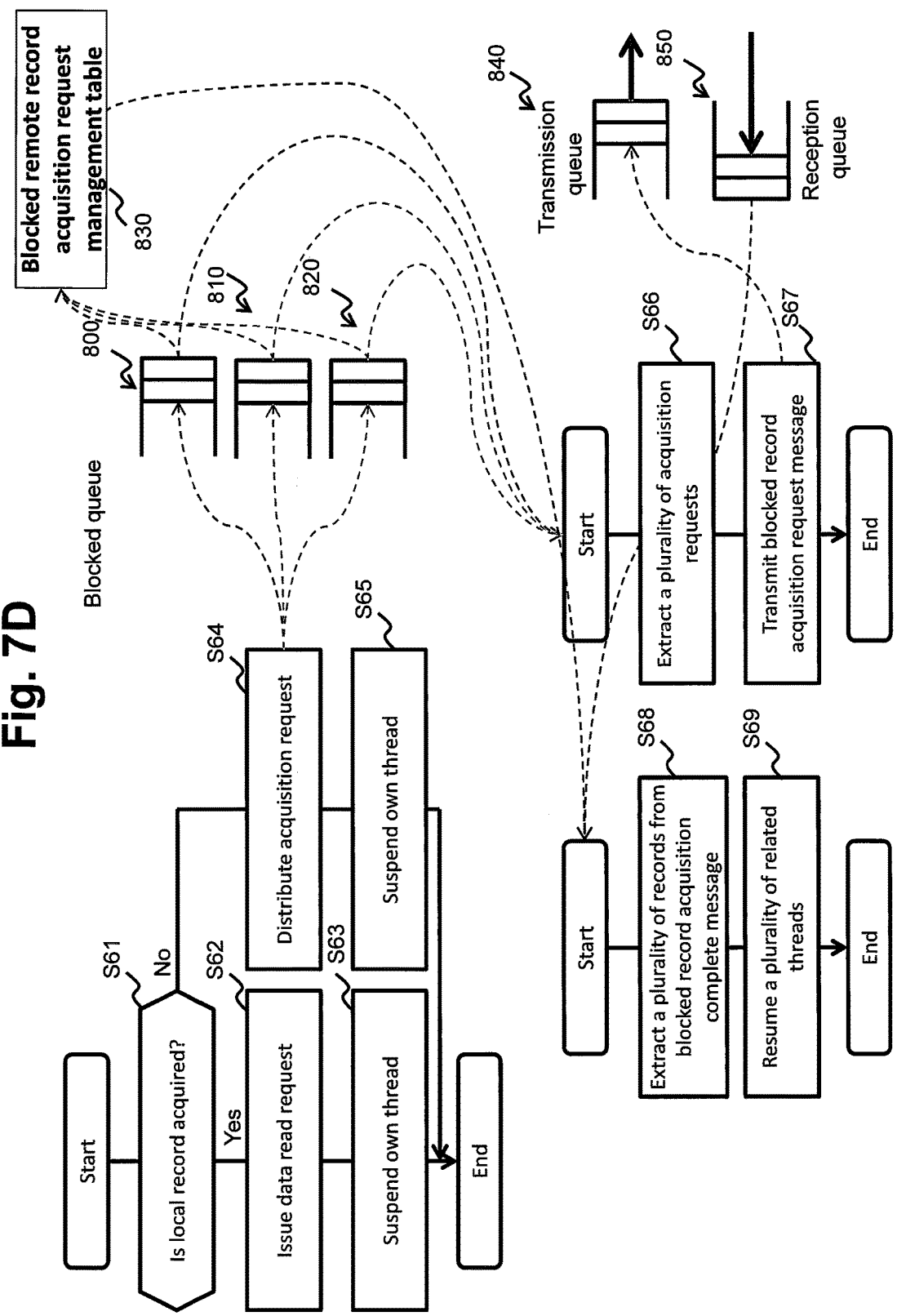
FIG. 7D shows a flow of record acquisition processing in the computation node that acquires a record, according to a modification of Embodiment 1.

FIG. 7D shows a flow of record acquisition processing in a computation node that acquires a record, according to the modification of Embodiment 1.

The record acquisition processing corresponds to the processing in S10 and S16 in FIG. 4A as well as in S21 and S27 in FIG. 4B.

In S61, the data reader/writer 140 determines whether record acquisition (acquisition) instructed from the system module 120 corresponds to acquisition of a record from the storage 104 of the own computation node 100, that is, acquisition of a local record. When the result of the determination is true, S62 is executed, and when the result of the determination is false, S64 is executed.

In S62, the data reader/writer 140 causes the storage manager 160 to issue a data read request to the storage 140. The detail of this processing is the same as that in S42 in FIG. 7A.

In S63, the data reader/writer 140 puts the own thread in the suspended state, and terminates the processing.

In S64, the data reader/writer 140 adds the record acquisition request messages to a blocked queue, corresponding to the computation node 100 as the destination of the record acquisition request message, among blocked queues 800, 810, and 820 respectively provided to the computation nodes 100, in the main storage 105. Thus, the data reader/writer 140 adds the record acquisition request message to a blocked remote record acquisition request management table 830. Here, in the blocked remote record acquisition request management table 830, a plurality of record acquisition request messages with same computation node 100 as the destination are grouped into a single request (blocked remote record acquisition request).

In S65, the data reader/writer 140 puts the own thread in the suspended state, and terminates the processing.

In S66, the network manager 150 extracts the blocked remote record acquisition request including a plurality of record acquisition request messages from each of the blocked queues 800, 810, and 820.

In S67, the network manager 150 transmits the blocked remote record acquisition request message through the OS 170 and the NIC 102, and terminates the processing. Specifically, the network manager 150 stores the blocked remote record acquisition request message in a transmission queue 840 of the main storage 105, and the NIC 102 transmits the blocked remote record acquisition request message from the transmission queue 840 to the computation node 100 as the destination of the blocked remote record acquisition request message. As described above, a plurality of record acquisition requests are grouped into a single blocked remote record acquisition request message, whereby the number of sessions established for the communications can be reduced.

Then, with the NIC 102, the OS 170 receives a blocked remote record completion request message transmitted from the other computation node 100 and stores the blocked remote record completion request message in a reception queue 850.

In S68, the network manager 150 acquires the blocked record acquisition completion message from the reception queue 850, extracts a plurality of records from the blocked record acquisition completion message, and hands over the records to the system module 120.

In S69, based on the blocked remote record acquisition request management table 830, the data reader/writer 140 identifies a thread that uses the received record, resumes the thread, and terminates the record acquisition processing.

FIG. 7E shows a flow of record acquisition processing in a computation node that manages a record, according to a modification of Embodiment 1.

In the computation node 100 as the destination of the blocked remote record acquisition request message, the blocked remote record acquisition request message is acquired and stored in the reception queue 860 of the main storage 105 by the NIC 102.

In S70, the network manager 150 of the computation node 100 as the destination acquires the blocked remote record acquisition request message from the reception queue 860, extracts a plurality of record acquisition requests from the blocked remote record acquisition request message, and hands over the record acquisition requests to the data reader/writer 140.

In S71, based on the plurality of record acquisition request messages, the data reader/writer 140 causes the storage manager 160 to issue a plurality of data read requests for reading data required for acquiring a plurality of records, to the storage 104 through the HBA 103, and terminates the processing. Specifically, the storage manager 160 adds the plurality of data read request to a request queue 880 of the main storage 105 of the computation node 100. The HBA 104 acquires the data read requests from the request queue 780, and issues the data read requests to the storage 104.

The storage 104 receives the issued data read requests from the request queue 880, reads the records corresponding to the data read requests, and transmits the records to the HBA 103. The HBA 103 adds the read records to a completion queue 890 of the main storage 105.

Then, in S72, the storage manager 160 extracts a plurality of records corresponding to the data read requests from the completion queue 890, extracts records from the data, and hands over the records to the system module 120.

In S73, the data reader/writer 140 provides the plurality of received records in a blocked acquisition complete message, causes the network manager 150 to transmit the blocked acquisition complete message to the computation node 100 as the source of the blocked remote record acquisition request message, and terminates the processing. Specifically, the network manager 150 adds the blocked acquisition complete message to a transmission queue 870 of the main storage 105 of the computation node 100. The NIC 102 transmits the acquisition completion message stored in the transmission queue 870 to the computation node 100 as the source of the blocked remote record acquisition request message. In the computation node 100 as the source, the NIC 102 stores the blocked acquisition completion message in the reception queue 850.

The processing shown in FIG. 7D may be executed in a thread (SL1, SL2, SLd$_1$, SLd$_2$, SLd$_k$, SLd$_{k+1}$, or the like) that executes the processing in S10 or S16 in FIG. 4A, or in S21 or S27 in FIG. 4B. For example, the CPU 101 may execute the data acquisition processing in S10 in the thread SL1, and may execute a procedure corresponding to S61 to S65 in the same thread SL1. The processing shown in FIG. 7D may be executed in a thread other than the thread (SL1, SL2, SLd$_1$, SLd$_2$, SLd$_k$, SLd$_{k+1}$, or the like) that executes the processing in S10 or S16 in FIG. 4A, or in S21 or S27 in FIG. 4B. For example, the CPU 101 may execute the data acquisition processing in S10 in the thread SL1, and may execute a procedure corresponding to S61 to S65 in the other thread. Here, different threads may be provided respectively for the procedure corresponding to S61 to S65, a procedure corresponding to S66 and S67, and a procedure corresponding to S68 and S69, or the procedures may be executed in the same thread. A plurality of threads may be provided for each procedure. Another thread may be further provided for driving the procedure corresponding to S66 and S67 and the procedure corresponding to S68 and S69. The procedures may be driven by means such as preempting, a signal, or the like as a result of adding pieces to the completion queue 750 and the reception queue 730 by the HBA 103 and the NIC 102.

For the processing shown in FIG. 7E, different threads may be provided respectively for the procedure corresponding to S70 and S71 and a procedure corresponding to S72 and S73, or the procedures may be executed in the same thread. A plurality of threads may be provided for each procedure. For example, a plurality of threads may be generated in accordance with the blocked record acquisition request message acquired in S70, and S71 may be executed in each thread to execute the data read request. Here, the number of the threads to be generated may be the same as the number of the record acquisition requests in the message, or may be a predetermined number. Another thread may be further provided for driving the procedure corresponding to S72 and S73. The procedure may be driven by means such as preempting, a signal or the like, as a result of adding a piece to the completion queue 790 by the HBA 103.

FIG. 7F shows a configuration of a blocked remote record acquisition request management table according to a modification.

The blocked remote record acquisition request management table 830 includes, as information pieces for each blocked remote record acquisition request, a request issue time 832, the number of requests 833, and one or more record acquisition requests 834. The record acquisition request 834 includes a thread ID 831, a computation node ID 835, a record reference 836, a buffer address 837, and a completion flag 838. The information pieces are as follows.

The request issue time 832 indicates time at which the blocked remote record acquisition request is issued.

The number of requests 833 indicates the number of record acquisition requests in the bricked remote record acquisition request.

The record acquisition request 834 indicates the content of the record acquisition request.

The thread ID 831 indicates an ID for identifying a thread that has issued the record acquisition request.

The computation node ID 835 indicates an ID (computation node ID) of the computation node as the destination of the record acquisition request.

The record reference 836 indicates reference information to a record as a target of the record acquisition request.

The buffer address 837 indicates an address of an area (buffer) on the main storage 105 storing the record as the target of the record acquisition request.

The completion flag 838 is a flag indicating whether the record corresponding to the record acquisition request has been acquired.

In the description above, the procedure for acquiring a record in a job where the parallel data processing is executed is described, by focusing on the features of the present invention. The procedure may be embodied in various ways.

To extract a record from a data set, information indicating how the record is arranged in the data set is required. For example, when the data set is a text file, and a single line therein is handled as a record, records are delimited by a newline code. Thus, information indicating that the records are delimited by the newline code is required for extracting a record from the text file. As another example, when the data set has a structure such as B-tree, several records might be crammed into a page, as a unit of an access on the storage, with a certain data structure. To extract a record from the structure, information on the structure (such as a length of the page, a header/footer structure of the page, a header/footer structure of a record in the page, and the like) is required. When a data set is compressed or encoded, procedure information for decoding is required for acquiring a record from the data set. Thus, the information, related to the structure of the data set for acquiring the record, may be defined by the application as a part of the job, as in the case of the format and the like. Alternatively, the information related to the structure of the data set may not entirely be clearly defined by the application. The system module may execute a job under an assumption that a predetermined structure is defined for a structure of the data set undefined by the application. Here, the system module and the like may determine the structure of a data set based on information related to the data set and the data set. For example, when the data set is determined as a text file even though the application does not clearly define the structure of the data set, a job may be executed under an assumption that the records are delimited by the newline code. Here, the information related to the structure defined by the application may be notified to the data reader/writer through the system module.

When extracting a record from a data set, the system module and the like may cache a part of data in the data set in the main storage and the like to reduce the number of accesses to the storage. For example, when a record is acquired by scanning a text file, an access may not be made to the storage for each record. Instead, data in the unit of one megabyte may be read from the text file at once, and the record may be extracted from the data.

FIG. 8A shows a configuration of a resource constraint management table at a node level, according to Embodiment 1.

A resource constraint management table 900 at a node level on an upper side of FIG. 8A is managed by the administer supervisor process that administers the computation nodes 100.

The resource constraint management table 900 at a node level includes, as information pieces for each computation node, a computation node ID 901 and a resource constraint 902. The resource constraint 902 includes the number of threads 903 and a main storage allocation 904. The information pieces are as follows.

The computation node ID 901 indicates an ID of a computation node.
The resource constraint 902 indicates resource constraint in the computation node corresponding to the computation node ID 901.
The number of threads 903 indicates the maximum number of threads that can be generated in the computation node corresponding to the computation node ID 901.
The main storage allocation 904 indicates the maximum storage amount that can be allocated in the computation node corresponding to the computation node ID 901.

The resource constraint management table 910 at a node level on the lower side of FIG. 8A is managed by the supervisor process in each computation node 100.

The resource constraint management table 910 at a node level includes, as information pieces of the own computation node, a computation node ID 911, a resource constraint 912, and a resource use 913. The resource constraint 912 includes the number of threads 914 and a main storage allocation 915. The resource use 913 includes the number of threads 916 and a main storage allocation 917. The information pieces are as follows.

The computation node ID 911 indicates an ID (computation node ID) of the own computation node.
The resource constraint 912 indicates resource constraint in the own computation node.
The resource use 913 indicates the resource used in the own computation node.
The number of threads 914 indicates the maximum number of threads that can be generated in the own computation node.
The main storage allocation 915 indicates the maximum storage amount that can be allocated in the own computation node.
The number of threads 916 indicates the number of threads actually generated in the own computation node.
The main storage allocation 917 indicates the storage amount actually allocated in the own computation node.

FIG. 8B shows a configuration of a resource constraint management table at a job level, according to Embodiment 1.

A resource constraint management table 920 at a job level on an upper side of FIG. 8B is managed by the administer supervisor process.

The resource constraint management table 920 at a job level includes, as information pieces for each job, a job ID 921, a computation node ID 922, and a resource constraint 923. The resource constraint 923 includes the number of threads 924 and a main storage allocation 925. The information pieces are as follows.

The job ID 921 indicates an ID (job ID) of a job.
The computation node ID 922 indicates an ID (computation node ID) of a computation node that executes the job corresponding to the job ID 921.
The resource constraint 923 indicates resource constraint for the job corresponding to the job ID 921, in the computation node corresponding to the computation node ID 922.
The number of threads 924 indicates the maximum number of threads that can be generated for the job corresponding to the job ID 921, in the computation node corresponding to the computation node ID 922.
The main storage allocation 925 indicates the maximum storage amount that can be allocated to the job corresponding to the job ID 921, in the computation node corresponding to the computation node ID 922.

The resource constraint management table 930 at a node level on the lower side of FIG. 8B is managed by the supervisor process in each computation node 100.

The resource constraint management table 930 at a node level includes, as information pieces for each job in the own computation node, a job ID 931, a computation node ID 932, a resource constraint 933, and a resource use 934. The resource constraint 933 includes the number of threads 935 and a main storage allocation 936. The resource use 934 includes the number of threads 937 and a main storage allocation 938. The information pieces are as follows.

The job ID 931 indicates an ID (job ID) of a job.
The computation node ID 932 indicates an ID (computation node ID) of the own computation node.
The resource constraint 933 indicates resource constraint for the job corresponding to the job ID 931, in the own computation node 100.
The resource use 934 indicates a resource used for the job corresponding to the job ID 931, in the own computation node 100.
The number of threads 935 indicates the maximum number of threads that can be generated for the job corresponding to the job ID 931, in the own computation node 100.
The main storage allocation 936 indicates the maximum storage amount that can be allocated to the job corresponding to the job ID 931, in the own computation node 100.
The number of threads 937 indicates the number of threads actually generated for the job corresponding to the job ID 931, in the own computation node 100.
The main storage allocation 938 indicates the storage amount actually allocated to the job corresponding to the job ID 931, in the own computation node 100.

FIG. 8C shows a configuration of a resource constraint management table at a process level in the administer supervisor process, according to Embodiment 1.

A resource constraint management table 940 at a process level is managed by the administer supervisor process.

The resource constraint management table 940 at a process level includes, as information pieces for each process, a process ID 941, a job ID 942, a computation node ID 943, and a resource constraint 944. The resource constraint 944 includes the number of threads 945 and a main storage allocation 946. The information pieces are as follows.

The process ID 941 indicates an ID (process ID) of a process.
The job ID 942 indicates a job ID.
The computation node ID 943 indicates an ID (computation node ID) of a computation node that executes the process corresponding to the process ID 941 in the job corresponding to the job ID 921.
The resource constraint 944 indicates resource constraint for the process corresponding to the process ID 941 in the job corresponding to the job ID 942, in the computation node corresponding to the computation node ID 943.
The number of threads 945 indicates the maximum number of threads that can be generated for the process corresponding to the process ID 941 in the job corresponding to the job ID 942, in the computation node corresponding to the computation node ID 943.
The main storage allocation 946 indicates the maximum storage amount that can be allocated to the process corresponding to the process ID 941 in the job corresponding to the job ID 942, in the computation node corresponding to the computation node ID 943.

FIG. 8D shows a configuration of a resource constraint management table at a process level in the supervisor process of each node, according to Embodiment 1.

The resource constraint management table 950 at a process level is managed by the supervisor process in each computation node 100.

The resource constraint management table 950 at a process level includes, as information pieces for each process in each job in the own computation node, a process ID 951, a job ID 952, a computation node ID 953, a resource constraint 954, and a resource use 955. The resource constraint 954 includes the number of threads 956 and a main storage allocation 957. The resource use 955 includes the number of threads 958 and a main storage allocation 959. The information pieces are as follows.

The process ID 951 indicates an ID of a process.
The job ID 952 indicates an ID of a job.
The computation node ID 953 indicates an ID (computation node ID) of the own computation node 100.
The resource constraint 954 indicates resource constraint for a process corresponding to the process ID 951 in the job corresponding to the job ID 952, in the own computation node 100.
The resource use 955 indicates a resource used for the process corresponding to the process ID 951 in the job corresponding to the job ID 952, in the own computation node 100.
The number of threads 956 indicates the maximum number of threads that can be generated for the process corresponding to the process ID 951 in the job corresponding to the job ID 952, in the own computation node 100.
The main storage allocation 957 indicates the maximum storage amount that can be allocated to the process corresponding to the process ID 951 in the job corresponding to the job ID 952, in the own computation node 100.
The number of threads 958 indicates the number of threads actually generated for the process corresponding to the process ID 951 in the job corresponding to the job ID 952, in the own computation node 100.
The main storage allocation 959 indicates the storage amount actually allocated to the process corresponding to the process ID 951 in the job corresponding to the job ID 952, in the own computation node 100.

FIG. 8E shows a configuration of a resource constraint management table at a task level in the administer supervisor process, according to Embodiment 1.

A resource constraint management table 960 at a task level is managed by the administer supervisor process.

The resource constraint management table 960 at a task level includes, as information pieces for each task, a task ID 961, a process ID 962, a job ID 963, a computation node ID 964, and a resource constraint 965. The resource constraint 944 includes the number of threads 945 and a main storage allocation 946. The information pieces are as follows.

The task ID 961 indicates an ID (process ID) of a task.
The process ID 962 indicates an ID (process ID) of a process.
The job ID 963 indicates a job ID.
The computation node ID 964 indicates an ID (computation node ID) of a computation node that executes the task corresponding to the task ID 961 in the process corresponding to the process ID 962 in the job corresponding to the job ID 963.
The resource constraint 965 indicates resource constraint for the task corresponding to the task ID 961 in the process corresponding to the process ID 962 in the job corresponding to the job ID 963, in the computation node corresponding to the computation node ID 964.

The number of threads 966 indicates the maximum number of threads that can be generated for the task corresponding to the task ID 961 in the process corresponding to the process ID 962 in the job corresponding to the job ID 963, in the computation node corresponding to the computation node ID 964.

The main storage allocation 967 indicates the maximum storage amount that can be allocated to the task corresponding to the task ID 961 in the process corresponding to the process ID 962 in the job corresponding to the job ID 963, in the computation node corresponding to the computation node ID 964.

FIG. 8F shows a configuration of a resource constraint management table at a task level in the supervisor process of each node, according to Embodiment 1.

The resource constraint management table 970 at a task level is managed by the supervisor process in each computation node 100.

The resource constraint management table 970 at a task level includes, as information pieces for each task in each process in each job in the own computation node, a task ID 971, a process ID 972, a job ID 973, a computation node ID 974, a resource constraint 975, and a resource use 976. The resource constraint 975 includes the number of threads 977 and a main storage allocation 978. The resource use 976 includes the number of threads 979 and a main storage allocation 980. The information pieces are as follows.

The task ID 971 indicates an ID of a task.
The process ID 972 indicates an ID of a process.
The job ID 973 indicates an ID of a job.
The computation node ID 974 indicates an ID (computation node ID) of the own computation node 100.
The resource constraint 975 indicates resource constraint for a task corresponding to the task ID 971 in the process corresponding to the process ID 972 in the job corresponding to the job ID 973, in the own computation node 100.
The resource use 976 indicates a resource used for the task corresponding to the task ID 971 in the process corresponding to the process ID 972 in the job corresponding to the job ID 973, in the own computation node 100.
The number of threads 977 indicates the maximum number of threads that can be generated for the task corresponding to the task ID 971 in the process corresponding to the process ID 972 in the job corresponding to the job ID 973, in the own computation node 100.
The main storage allocation 978 indicates the maximum storage amount that can be allocated to the task corresponding to the task ID 971 in the process corresponding to the process ID 972 in the job corresponding to the job ID 973, in the own computation node 100.
The number of threads 979 indicates the number of threads actually generated for the task corresponding to the task ID 971 in the process corresponding to the process ID 972 in the job corresponding to the job ID 973, in the own computation node 100.
The main storage allocation 980 indicates the storage amount actually allocated to the task corresponding to the task ID 971 in the process corresponding to the process ID 972 in the job corresponding to the job ID 973, in the own computation node 100.

Figure 8G:
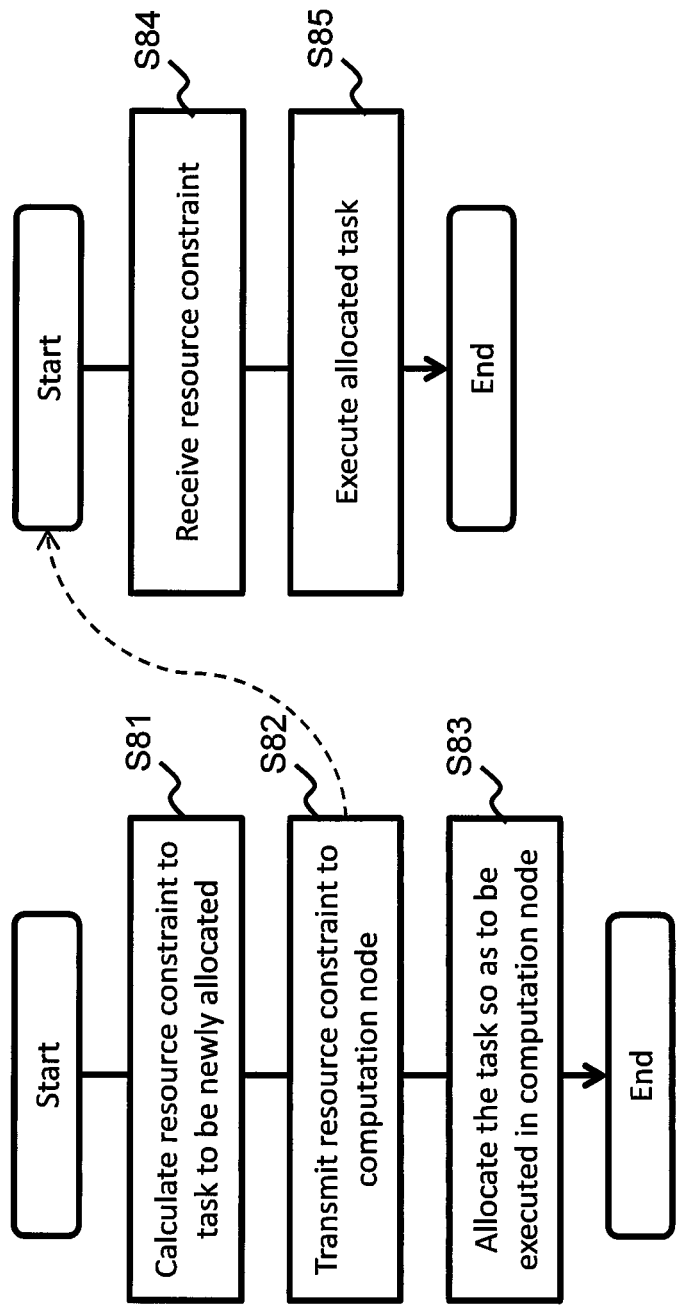
FIG. 8G shows a flow of administrative resource constraint management processing according to Embodiment 1.

FIG. 8G shows a flow of administrative resource constraint management processing according to Embodiment 1.

In S81, when allocating a new task, the administer supervisor process in the computation node 100 that administers the supervisor process of each computation node 100 calculates the resource constraint for the new task. Here, the resource constraint designated by the user may be used, or the resource constraint may be calculated based on a policy (for example, prorate) designated by the user.

In S82, the administer supervisor process adds a record for the new task in the resource constraint management table 960 at a task level shown in FIG. 8E, and stores the resource constraint calculated for the resource constraint of the record. The administer supervisor process selects a computation node 100 that can execute the task within the range defined by the resource constraint, and transmits the resource constraint related to a computation node to the computation node 100.

In S83, the administer supervisor process allocates the task to the selected computation node 100, and terminates the processing.

In S84, the supervisor process of the computation node 100 to which the task is allocated receives the resource constraint transmitted in Step S82, and registers the resource constraint in the resource constraint management table 970 at a task level shown in FIG. 8F.

In S85, the system module 120 of the computation node 100 to which the task is allocated executes the allocated task.

Figure 8H:
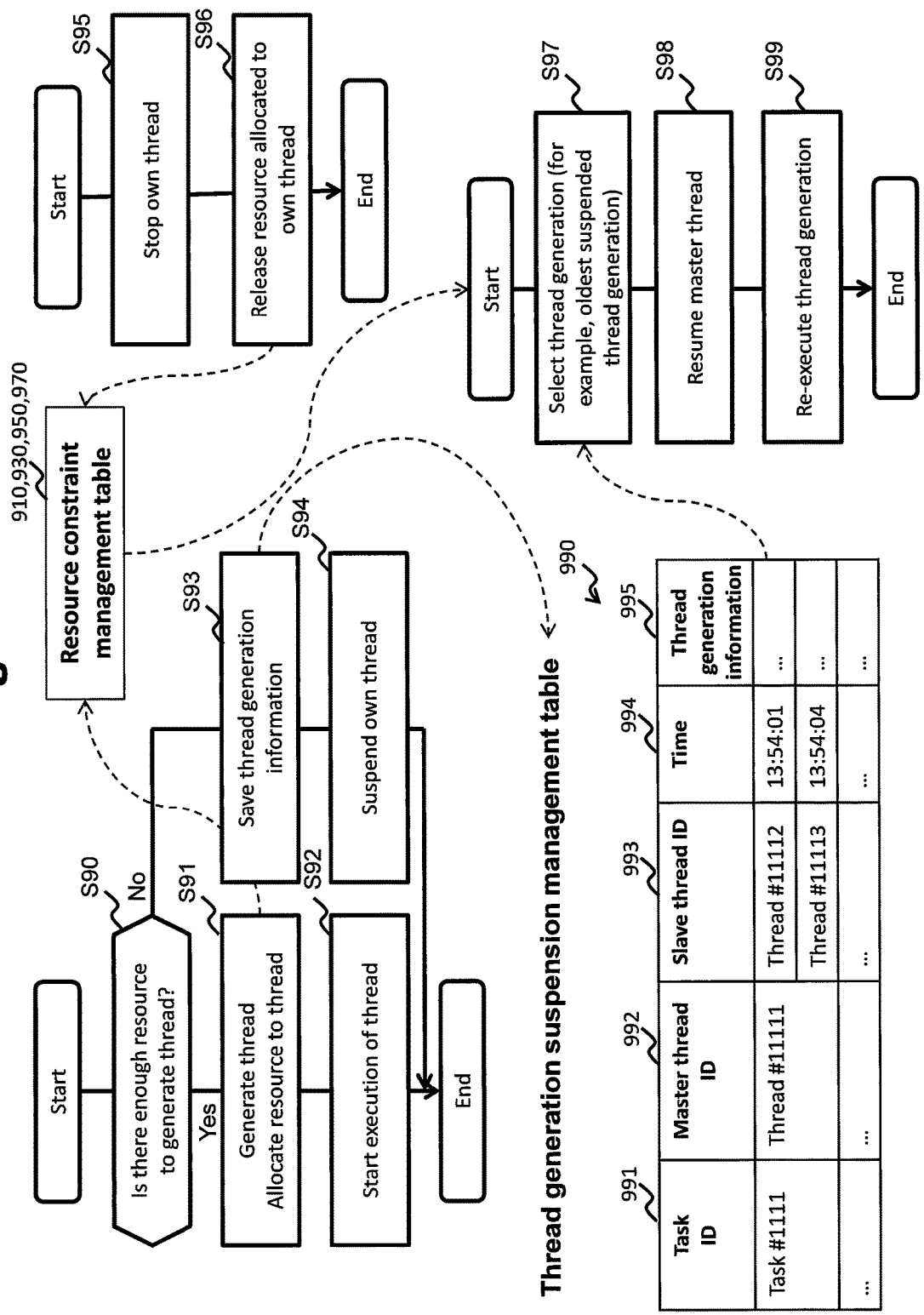
FIG. 8H shows a flow of resource constraint management processing in each node, according to Embodiment 1.

FIG. 8H shows a flow of resource constraint management processing in each computation node, according to Embodiment 1.

The resource constraint management processing is implemented when the system module 120 executes a task, for example. Processing (Steps S90 to S94), in the upper left in FIG. 8H, is executed when a thread is to be generated in the task. This is the processing executed in S13 in FIG. 4A, as well as, S24 and S31 in FIG. 4B.

In S90, the system module 120 (specifically, the map function 121) determines whether there is an enough resource to generate the thread. Whether there is an enough resource to generate the thread can be determined by referring to each of the resource constraint management table 970 at a task level, the resource constraint management table 950 at a process level, the resource constraint management table 930 at a job level, and the resource constraint management table 910 at a node level to check whether a resource available within the range defined by the resource constraint is enough to generate the thread or more, at each level.

When the result of the determination is true, S91 is executed, and when the result of the determination is false, S93 is executed.

In S91, the system module 120 causes the thread manager 133 to generate the thread, allocate the resource to the thread, and reflect the allocation result in the restore use in each of the resource constraint management tables (910, 930, 950, and 970).

In S92, the system module 120 starts the execution of the thread, and terminates the resource constraint management processing.

In S93, the system module 120 saves thread generation information, to which a reference is made for generating a thread, in a thread generation suspension management table 990.

In S94, the system module 120 puts the own thread in the suspended state where the generation of the thread is suspended, and terminates the processing.

The thread generation suspension management table 990 includes, as information pieces of a thread of which the generation is suspended, a task ID 991, a master thread ID 992, a slave thread ID 993, time 994, and thread generation information 995. The information pieces are as follows.

The task ID 991 indicates an ID of a task.

The master thread ID 992 indicates an ID of a thread (master thread) serving as a master that generates another thread.

The slave thread ID 993 indicates an ID of a thread (slave thread) serving as a slave generated from another thread.

The time 994 indicates time at which the generation of a thread is suspended.

The thread generation information 995 is information (for example, information including a reference indicating a record referred to in the slave thread) required for generating a thread.

Processing (Steps S95 and S96), in the upper right in FIG. 8H, is executed to stop a thread when processing executed with the thread is terminated.

In S95, the system module 120 stops the own thread that is being executed.

In S96, the system module 120 releases a resource allocated to the own thread. Specifically, the system module 120 deletes the amount of resource allocated to the own thread from the resource amount (the number of threads and the main storage allocation amount) managed in the resource use in the resource constraint management table 910 and the like. Thus, the resource that has been allocated to the own thread can be allocated to another thread.

Processing (Steps S97 to S99), in the lower right in FIG. 8H, is executed when it is determined that there is an enough resource for generating a thread, based on the resource constraint management table 910 and the like, for example. This procedure may be driven by the means such as the preempting, the signal, and the like, in response to the releasing of the resource in S96, for example.

In S97, the system module 120 selects thread generation information managed in the thread generation suspension management table 990. The selected thread generation information may be the oldest suspended thread generation information, for example.

In S98, the system module 120 resumes a master thread for generating a thread by the selected thread generation information.

In S99, the system module 120 re-executes the generation of the slave thread based on the thread generation information. Through the processing, a thread, of which the generation has been suspended, can be generated when there is an enough resource for generating the thread.

FIG. 9A shows a first example of a task according to Embodiment 1.

FIG. 9A shows a map task #1111 in a map process #111 in a map/reduce job #1 (corresponding to a job execution plan in FIG. 1A). Here, it is assumed that a record #1001 in the input data set #1 includes references to 10 records #2001 to #2010 in the input data set #2. The map task #1111 acquires the record #1001 in the input data set #1 and acquires the records in the input data set #2.

When the computation node 100 executes the map task #1111, a reference is made to the record #1001 in the input data set #1. When the record satisfies a predetermined condition, the records #2001 to #2010 in the input data set #2 are acquired by using the references in the record.

FIG. 9B shows an example of how a thread is generated in the task shown in the first example. FIG. 9B shows how threads are generated in a case where the resource constraint management processing shown in FIG. 8H is not executed when the task #1111 shown in FIG. 9A is executed. FIG. 9B is illustrated under the following rules.

The horizontal axis represents time.

A rounded rectangle extending in the horizontal direction in the figure represents a series of processing in a single thread. The left and right ends of the rounded rectangle respectively indicate the start and end times of the processing in the thread.

A value in the rounded rectangle represents information (record ID, for example) indicating a record read in accordance with the processing corresponding to the thread.

The number of record acquiring threads that can be executed simultaneously is "8".

In the case where the resource constraint management processing shown in FIG. 8H is not executed, when a thread 10a for acquiring the record #1001 in the input data set #1 in order to implement the processing is executed in the computation node 100, with the thread 10a, the record #1001 is acquired, a thread 10b for acquiring the record #2001 in the input data set #2 is generated and executed based on the reference in the record #1001, a thread 10c for acquiring the record #2002 in the input data set #2 is generated and executed, and similarly, a thread 10d, a thread 10e, a thread 10f, a thread 10g, and a thread 10h are generated and executed. Thus, at this point, the number of the executed thread is "8", which is the same as the number of threads that can be executed simultaneously.

Then, with the thread 10a, a thread 10i for acquiring the record #2008 in the input data set #2 and executing the processing, a thread 10j for acquiring the record #2009 in the input data set #2 and executing the processing, and a thread 10k for acquiring the record #2010 in the input data set #2 and executing the processing are generated and executed. Thus, the main storage is allocated in an amount exceeding the available amount of the main storage, and thus thrashing occurs. This results in a longer execution time for the threads.

Figure 9C:
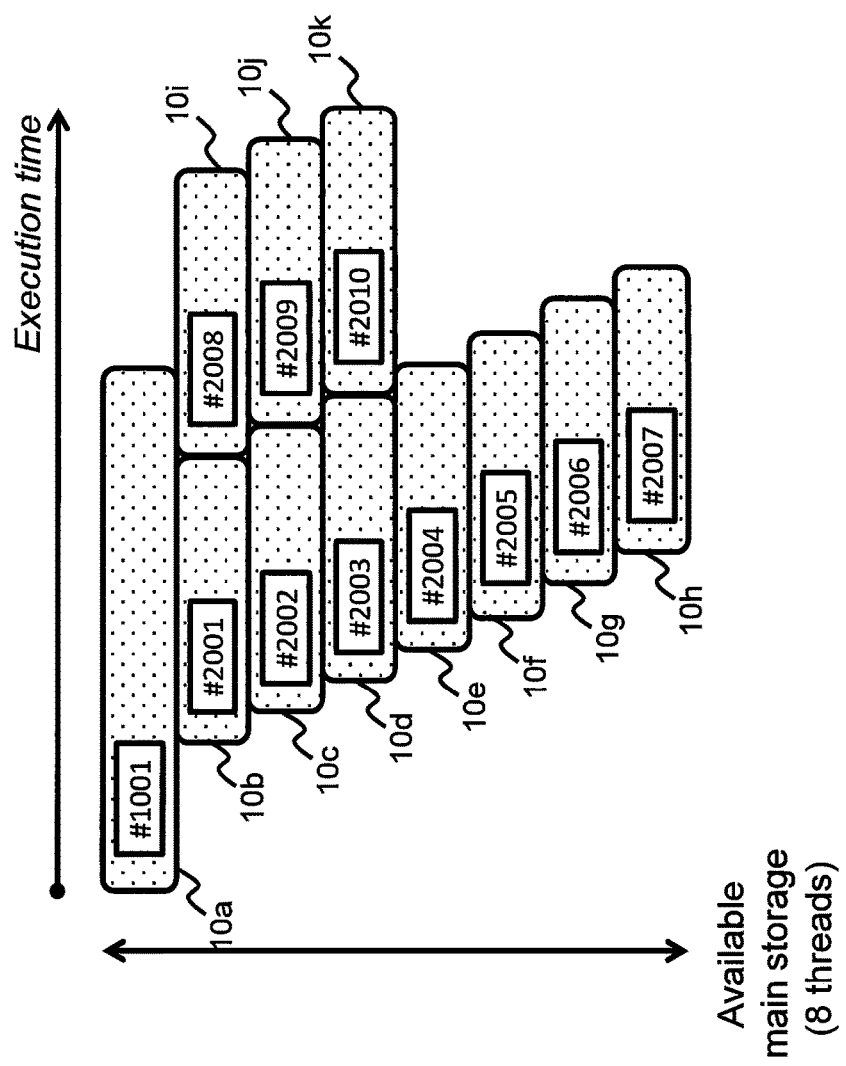
FIG. 9C shows an example of how threads are generated in the task shown in the first example, according to Embodiment 1.

FIG. 9C shows an example of how threads are generated in the task described in the first example, according to Embodiment 1. FIG. 9C shows how threads are generated in a case where the resource constraint management processing shown in FIG. 8H is executed, when the task #1111 shown in FIG. 9A is executed. FIG. 9C is illustrated under the same rules as FIG. 9B.

When the thread 10a for acquiring the record #1001 in the input data set #1 and executing the processing is executed in the computation node 100, with the thread 10a, the record #1001 is acquired, the thread 10b for acquiring the record #2001 in the input data set #2 is generated and executed based on the reference in the record #1001, the thread 10c for acquiring the record #2002 in the input data set #2 is generated and executed, and similarly, the thread 10d, the thread 10e, the thread 10f, the thread 10g, and the thread 10h are generated and executed. Thus, at this point, the number of the executed thread is "8", which is the same as the number of threads that can be executed simultaneously.

Then, it is determined that there is not an enough resource in S90 in the resource constraint management processing. Thus, the thread 10a is put to the suspended state without generating a new thread. When the execution of the thread 10b is terminated, a single thread becomes newly executable. Thus, in S98, the execution of the thread 10a is resumed, whereby in S99, the thread 10i for acquiring the record #2008 in the input data set #2 and executing the processing is generated. Similarly, when the execution of the thread 10c is terminated, the execution of the thread 10a is resumed, whereby the thread 10j for acquiring the record #2009 in the input data set #2 and executing the processing is generated and executed. When the execution of the thread 10d is terminated, the execution of the thread 10a is resumed, whereby the thread 10k for acquiring the record #2010 in the input data set #2 and executing the processing is generated and executed.

As a result, the main storage can be allocated within the range of the available main storage amount when a plurality of threads are executed, whereby occurrence of the thrashing can be prevented, and the execution time of the task as a whole can be shortened compared with that in the case shown in FIG. 9B.

Next, how threads are generated in a case where a plurality of tasks are executed in parallel will be described.

Figure 9D:
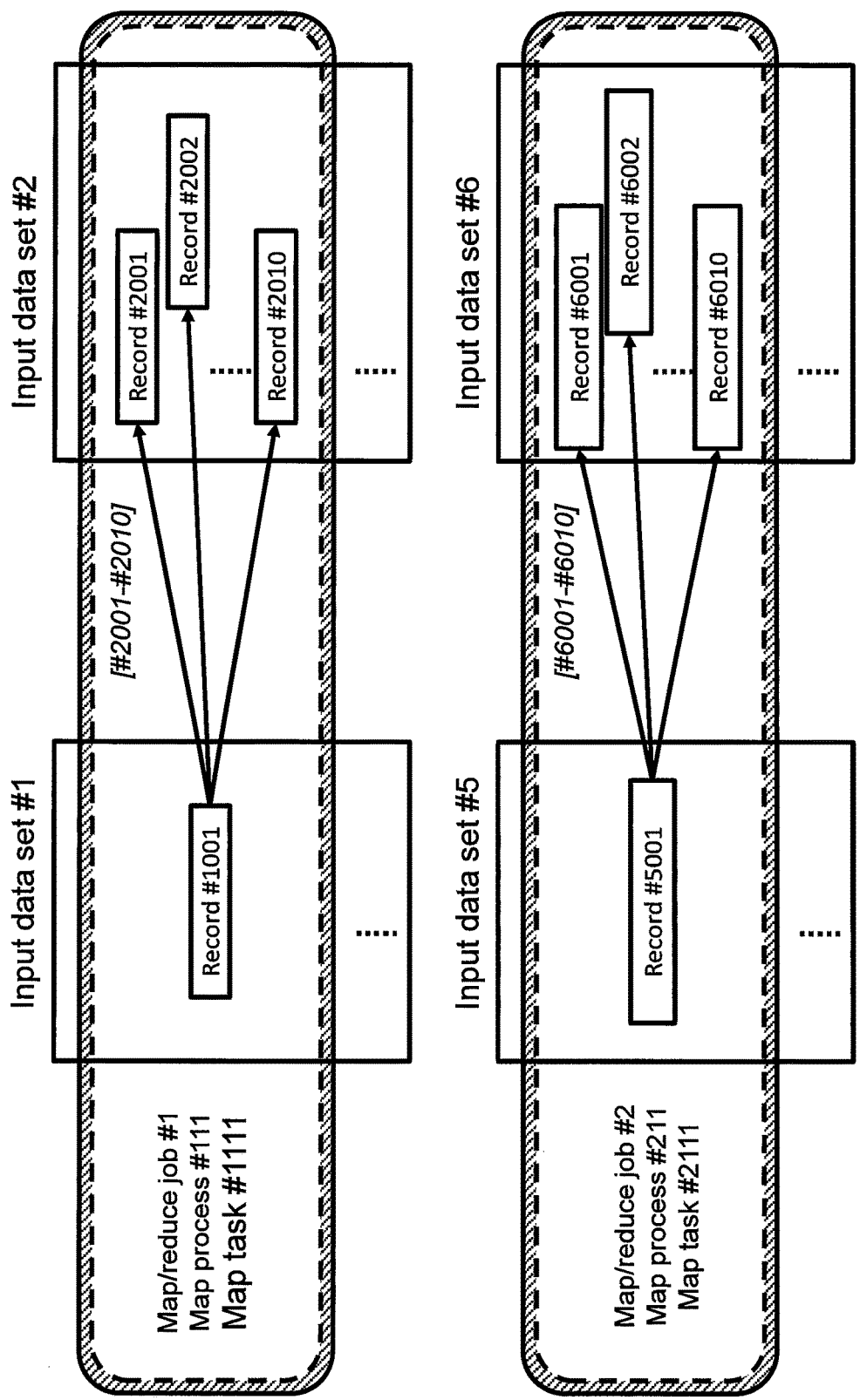
FIG. 9D shows a second example of a task according to Embodiment 1.

FIG. 9D shows a second example of tasks according to Embodiment 2.

FIG. 9D shows the map task #1111 in the map process #111 in the map/reduce job #1 and a map task #2111 in a map process #211 in a map/reduce job #2. It is assumed that the map task #1111 and the map task #2111 are simultaneously executed.

Here, it is assumed that the record #1001 in the input data set #1 includes the references to 10 records #2001 to #2010 in the input data set #2, and that the map task #1111 acquires the record #1001 in the input data set #1 and acquires the records in the input data set #2 corresponding to the record.

When the system module 120 executes the map task #1111, a reference is made to the record #1001 in the input data set #1. When the record satisfies a predetermined condition, the records #2001 to #2010 in the input data set #2 are acquired by using the references in the record.

Furthermore, it is assumed that a record #5001 in the input data set #5 includes references to 10 records #6001 to #6010 in the input data set #6, and that the map task #2111 acquires the record #5001 in the input data set #5 and acquires the records in the input data set #6 corresponding to the record.

When the system module 120 executes the map task #2111, a reference is made to the record #5001 in the input data set #5. When the record satisfies a predetermined condition, the records #6001 to #6010 in the input data set #6 are acquired by using the references in the record.

FIG. 9E shows an example of how threads are generated in the tasks described in the second example according to Embodiment 1. FIG. 9E shows how threads are generated in a case where the resource constraint management processing shown in FIG. 8H is executed, when the task #1111 and the task #2111 shown in FIG. 9D are executed in parallel. In the task #1111, the available areas of the main memory corresponds to five threads, and in the task #2111, the available areas of the main memory corresponds to three threads. FIG. 9E is illustrated under the same rules as FIG. 9B.

When a thread 11a for acquiring the record #1001 in the input data set #1 and executing the processing is executed in the computation node 100, with the thread 11a, the record #1001 is acquired, a thread 11b for acquiring the record #2001 in the input data set #2 is generated and executed based on the reference in the record #1001, a thread 11c for acquiring the record #2002 in the input data set #2 is generated and executed, and similarly, a thread 10d and a thread 10e are generated and executed. Thus, at this point, the used area corresponds to the five threads as the available area of the main storage in the task #1111.

Then, it is determined that there is not an enough resource in S90 in the resource constraint management processing. Thus, the thread 11a is put to the suspended state without generating a new thread. When the execution of the thread 11b is terminated, a single thread becomes newly executable. Thus, in S98, the execution of the thread 11a is resumed, whereby in S99, a thread 11f for acquiring the record #2005 in the input data set #2 and executing the processing is generated. Similarly, when the execution of the thread 11c is terminated, the execution of the thread 11a is resumed, whereby a thread 11g for acquiring the record #2006 in the input data set #2 and executing the processing is generated and executed. When the execution of the thread 11d is terminated, the execution of the thread 11a is resumed, whereby a thread 11h for acquiring the record #2007 in the input data set #2 and executing the processing is generated and executed. When the execution of the thread 11d is terminated, the execution of the thread 11a is resumed, whereby a thread 11i for acquiring the record #2008 in the input data set #2 and executing the processing is generated and executed. When the execution of the thread 11f is terminated, the execution of the thread 11a is resumed, whereby a thread 11j for acquiring the record #2009 in the input data set #2 and executing the processing is generated and executed. When the execution of the thread 11g is terminated, the execution of the thread 11a is resumed, whereby a thread 11k for acquiring the record #2010 in the input data set #2 and executing the processing is generated and executed.

When a thread 12a for acquiring the record #5001 in the input data set #5 and executing the processing is executed at the same time, with the thread 12a, the record #5001 is acquired, a thread 12b for acquiring the record #6001 in the input data set #6 is generated and executed based on the reference in the record #5001, and a thread 12c for acquiring the record #6002 in the input data set #6 is generated and executed. Thus, at this point, the used area of the main memory corresponds to the three threads as the available main storage in the task #2111.

Then, it is determined that there is not an enough resource in S90 in the resource constraint management processing. Thus, the thread 12a is put to the suspended state without generating a new thread. When the execution of the thread 12b is terminated, a single thread becomes newly executable. Thus, in S98, the execution of the thread 12a is resumed, whereby in S99, a thread 12d for acquiring the record #6003 in the input data set #6 and executing the processing is generated. Similarly, when the execution of the thread 12c is terminated, a thread 12e for acquiring the record #6004 in the input data set #6 and executing the processing is generated and executed. When the execution of the thread 12d is terminated, a thread 12f for acquiring the record #6005 in the input data set #6 and executing the processing is generated and executed. When the execution of the thread 12e is terminated, a thread 12g for acquiring the record #6006 in the input data set #6 and executing the processing is generated and executed. When the execution of the thread 12f is terminated, a thread 12h for acquiring the record #6007 in the input data set #6 and executing the processing is generated and executed. When the execution of the thread 12g is terminated, a thread 12i for acquiring the record #6008 in the input data set #6 and executing the processing is generated and executed. When the execution of the thread 12h is terminated, a thread 12j for acquiring the record #6009 in the input data set #6 and executing the processing is generated and executed. When the execution of the thread 12i is terminated, a thread 12k for acquiring the record #6010 in the input data set #6 and executing the processing is generated and executed. Thus, a plurality of tasks can be executed in parallel.

As a result, the main storage can be allocated within the range of the available main storage amount when a plurality of threads are executed in a plurality of tasks, whereby occurrence of the thrashing can be prevented, and the execution time of the tasks as a whole can be prevented from being long due to the thrashing.

Although the example is described above where the resource constraint is for the number of threads and the main memory, the present invention is not limited to this example. For example, a similar effect can be expected to be obtained also in a case where the resource constraint is similarly performed for processor execution time, throughput of input/output to/from the storage, transmission throughput in a network, for example.

The several examples are described above. It is a matter of course that the present invention is not limited to the examples, and can be modified in various ways without departing from the gist of the invention.

A thread that is dynamically generated when parallel data processing is executed can be in various forms. For example, the thread may be a process, a thread at a kernel level (thread managed by a kernel in an operating system such as a native POSIX thread, a light weight process, or the like), a thread at a user level (thread such as a fiber managed by a user program or a library), a set of predetermined procedures (where a function pointer is managed with an appropriate structure, for example) managed in such a manner as to be executable in parallel with another procedure, or a combination of these.

In this specification, a record is the unit of data used in the parallel data processing. Alternatively the data may be any data. For example, the data may be a set of fixed number of columns, a set of variable number of columns, a simple text, a byte sequence, a multimedia content such as an image or a sound, or a combination of these.

REFERENCE SIGNS LIST

100 Computation node
110 Application
120 System module

The invention claimed is:

1. A parallel data processing system to execute parallel data processing, the parallel data processing system comprising:
a plurality of computers connected over a network, each of the computers including a processor connected to a memory; and
one or more data storage media connected to the network and which store a first data set that includes a plurality of first data, a second data set that includes a plurality of second data, and a third data set that includes a plurality of third data, where at least one of the first data corresponds to one or more of the second data and includes first reference information that represents a reference to the one or more of the second data of the second data set corresponding to the first data, and at least one of the second data corresponds to one or more of the third data and includes second reference information that represents a reference to the one or more third data of the third data set corresponding to the second data,
wherein the memory of at least one of the computers stores instructions that, when executed by the processor connected therewith, cause the processor connected therewith to:
execute an application which has first format information, second format information, third format information, a first reference scheme, and a second reference scheme, where the first format information, the second format information and the third format information represent respective methods for interpreting data in the first data set, the second data set, and the third data set, and the application causes a process to read the first data set, the second data set, and the third data set,
wherein the first reference scheme represents a respective method for acquiring data in the second data set in accordance with the first reference information in the first data set and the second reference scheme represents a respective method for acquiring data in the third data set in accordance with the second reference information in the second data set,
wherein the memory of the at least one of the computers stores instructions that, when executed by the processor connected therewith, cause the processor connected therewith to:
(A) read the first data from the first data set, and acquire a first value from the first data based on the first format information acquired from the application,
(B) determine whether or not the first value includes the first reference information,
(C) specify, when the first value includes the first reference information, one or more second data corresponding to the first data based on the first reference information,
(D) generate one or more threads for the specified one or more of the second data, and read the second data based on the first reference scheme acquired from the application,
(E) acquire a second value from the second data based on the second format information acquired from the application,
(F) determine whether or not the second value includes the second reference information,
(G) specify, when the second value includes the second reference information, one or more of the third data corresponding to the second data based on the second reference information,
(H) generate one or more threads for the specified one or more of the third data, and read the third data based on the second reference scheme acquired from the application,
(I) acquire a third value from the third data based on the third format information acquired from the application,
(J) execute (A), (B), (C), (D), (E), (F), (G), (H) and (I) on one or more of the first data in the first data set so that a plurality of threads corresponding to the one or more of the first data are generated, and
(K) execute the plurality of the threads corresponding to the one or more first data in parallel,
wherein the first format information is a program code, and
wherein the memory of at least one of the computers further stores instructions that, when executed by the processor connected therewith, cause the processor connected therewith to:
receive catalogue information required for generating the first format information written in a predetermined markup language from a user, and
generate the first format information based on the catalogue information.

2. The parallel data processing system according to claim 1,
   wherein output data is generated from the second value acquired from one or more of the second data.

3. The parallel data processing system according to claim 1,
   wherein the first reference information includes information for identifying a physical position at which the second data is stored in the second data set.

4. The parallel data processing system according to claim 1,
   wherein the first reference information includes information for searching the second data in the second data set.

5. The parallel data processing system according to claim 1,
   wherein at least part of the second data set is distributed among the storage media, and
   wherein the second data is acquired from the storage media before acquiring the second value in (E).

6. The parallel data processing system according to claim 1, wherein the memory of the at least one of the computers stores instructions that, when executed by the processor connected therewith, cause the processor connected therewith to:
   issue an instruction of processing from the application which defines a procedure, and
   execute the processing of (A) to (K) upon receiving the instruction, so as to execute the processing in an order different from that specified in the procedure.

7. A computer in a computer system in which a plurality of computers are connected by a network and the computer system stores a first data set that includes a plurality of first data, a second data set that includes a plurality of second data, and a third data set that includes a plurality of third data, where at least one of the first data corresponds to one or more of the second data and includes first reference information that represents a reference to the one or more of the second data of the second data set corresponding to the first data, and at least one of the second data corresponds to one or more of the third data and includes second reference information that represents a reference to the one or more third data of the third data set corresponding to the second data,
   where the computer system executes an application which has first format information, second format information, third format information, a first reference scheme, and a second reference scheme,
   where the first format information, the second format information and the third format information represent respective methods for interpreting data in the first data set, the second data set, and the third data set, and the application causes a process to read the first data set, the second data set, and the third data set,
   where the first reference scheme represents a respective method for acquiring data in the second data set in accordance with the first reference information in the first data set and the second reference scheme represents a respective method for acquiring data in the third data set in accordance with the second reference information in the second data set,
   where the application specifying a process to be executed on the first data set, the second data set, and the third data set, the computer comprising:
   a communication interface device connected to the computer system over the network;
   a processor that is connected to the communication interface; and
   a memory that stores instructions that, when executed by the processor, cause the processor to:
   (A) read the first data from the first data set, and acquire a first value from the first data based on the first format information acquired from the application,
   (B) determine whether or not the first value includes the first reference information,
   (C) specify, when the first value includes the first reference information, one or more second data corresponding to the first data based on the first reference information,
   (D) generate one or more threads for the specified one or more of the second data, and read the second data based on the first reference scheme acquired from the application,
   (E) acquire a second value from the second data based on the second format information acquired from the application,
   (F) determine whether or not the second value includes the second reference information,
   (G) specify, when the second value includes the second reference information, one or more of the third data corresponding to the second data based on the second reference information,
   (H) generate one or more threads for the specified one or more of the third data, and read the third data based on the second reference scheme acquired from the application,
   (I) acquire a third value from the third data based on the third format information acquired from the application,
   (J) execute (A), (B), (C), (D), (E), (F), (G), (H) and (I) on one or more of the first data in the first data set so that a plurality of threads corresponding to the one or more of the first data are generated, and
   (K) execute the plurality of the threads corresponding to the one or more first data in parallel,
   where the first format information is a program code, and
   where the memory further stores instructions that, when executed by the processor, cause the processor to:
   receive catalogue information required for generating the first format information written in a predetermined markup language from a user, and
   generate the first format information based on the catalogue information.

8. A parallel data processing method in a computer system in which a plurality of computers execute parallel data processing, where a first data set that includes a plurality of first data, a second data set that includes a plurality of second data, and a third data set that includes a plurality of third data are read in response to a process executed on an application,
   where at least one of the first data corresponds to one or more of the second data and includes first reference information that represents a reference to the one or more of the second data of the second data set corresponding to the first data, and at least one of the second data corresponds to one or more of the third data and includes second reference information that represents a reference to the one or more third data of the third data set corresponding to the second data,
   where the application has first format information, second format information, third format information, a first reference scheme, and a second reference scheme,
   where the first format information, the second format information and the third format information represent respective methods for interpreting data in the first data set, the second data set, and the third data set, where the first reference scheme represents a respective method for acquiring data in the second data set in accordance with the first reference information in the first data set and the second reference scheme represents a respective method for acquiring data in the third data set in accordance with the second reference information in the second data set, the parallel data processing method comprising:

(A) reading the first data from the first data set, and acquiring a first value from the first data based on the first format information acquired from the application, (B) determining whether or not the first value includes the first reference information, (C) specifying, when the first value includes the first reference information, one or more second data corresponding to the first data based on the first reference information, (D) generating one or more threads for the specified one or more of the second data, and reading the second data based on the first reference scheme acquired from the application, (E) acquiring a second value from the second data based on the second format information acquired from the application, (F) determining whether or not the second value includes the second reference information, (G) specifying, when the second value includes the second reference information, one or more of the third data corresponding to the second data based on the second reference information, (H) generating one or more threads for the specified one or more of the third data, and reading the third data based on the second reference scheme acquired from the application, (I) acquiring a third value from the third data based on the third format information acquired from the application, (J) executing (A), (B), (C), (D), (E), (F), (G), (H) and (I) on one or more of the first data in the first data set so that a plurality of threads corresponding to the one or more of the first data are generated, and (K) executing the plurality of the threads corresponding to the one or more first data in parallel, where the first format information is a program code, and where the first format information is generated based on catalogue information required for generating the first format information written in a predetermined markup language and received from a user.

9. A computer system comprising:

a plurality of computers, each of the computers respectively including an interface connected to a network, a processor connected to the interface, a memory connected to the processor, and one or more storage media, wherein the computers store, on the one or more storage media, a first data set that includes a plurality of first data, a second data set that includes a plurality of second data, and a third data set that includes a plurality of third data, where at least one of the first data corresponds to one or more of the second data and includes first reference information that represents a reference to the one or more of the second data of the second data set corresponding to the first data, and at least one of the second data corresponds to one or more of the third data and includes second reference information that represents a reference to the one or more third data of the third data set corresponding to the second data, wherein, in each of the computers, the memory stores instructions that, when executed by the processor, cause the processor to:

execute an application which has first format information, second format information, third format information, a first reference scheme, and a second reference scheme, where the first format information, the second format information and the third format information represent respective methods for interpreting data in the first data set, the second data set, and the third data set, and the application causes a process to read the first data set, the second data set, and the third data set, and where the first reference scheme represents a respective method for acquiring data in the second data set in accordance with the first reference information in the first data set and the second reference scheme represents a respective method for acquiring data in the third data set in accordance with the second reference information in the second data set, wherein, in each of the computers, the memory stores instructions that, when executed by the processor, cause the processor to:

(A) read the first data from the first data set, and acquire a first value from the first data based on the first format information acquired from the application, (B) determine whether or not the first value includes the first reference information, (C) specify, when the first value includes the first reference information, one or more second data corresponding to the first data based on the first reference information, (D) generate one or more threads for the specified one or more of the second data, and read the second data based on the first reference scheme acquired from the application, (E) acquire a second value from the second data based on the second format information acquired from the application, (F) determine whether or not the second value includes the second reference information, (G) specify, when the second value includes the second reference information, one or more of the third data corresponding to the second data based on the second reference information, (H) generate one or more threads for the specified one or more of the third data, and read the third data based on the second reference scheme acquired from the application, (I) acquire a third value from the third data based on the third format information acquired from the application, (J) execute (A), (B), (C), (D), (E), (F), (G), (H) and (I) on one or more of the first data in the first data set so that a plurality of threads corresponding to the one or more of the first data are generated, and (K) execute the plurality of the threads corresponding to the one or more first data in parallel, wherein the first format information is a program code, and wherein the memory further stores instructions that, when executed by the processor, cause the processor to:

receive catalogue information required for generating the first format information written in a predetermined markup language from a user, and generate the first format information based on the catalogue information.

10. One or more non-transitory, computer-readable storage media that store instructions that, when executed on one or more processors, instruct the one or more processors to perform acts for processing a first data set that includes a plurality of first data, a second data set that includes a plurality of second data, and a third data set that includes a plurality of third data, where at least one of the first data corresponds to one or more of the second data and includes first reference information that represents a reference to the one or more of the second data of the second data set corresponding to the first data, and at least one of the second data corresponds to one or more of the third data and includes second reference information that represents a reference to the one or more third data of the third data set corresponding to the second data, and the acts comprising:

executing an application which has first format information, second format information, third format information, a first reference scheme, and a second reference scheme, where the first format information, the second format information and the third format information represent respective methods for interpreting data in the first data set, the second data set, and the third data set, where the first reference scheme represents a respective method for acquiring data in the second data set in accordance with the first reference information in the first data set and the second reference scheme represents a respective method for acquiring data in the third data set in accordance with the second reference information in the second data set; and executing parallel data processing which includes:

(A) reading the first data from the first data set, and acquiring a first value from the first data based on the first format information acquired from the application, (B) determining whether or not the first value includes the first reference information, (C) specifying, when the first value includes the first reference information, one or more second data corresponding to the first data based on the first reference information, (D) generating one or more threads for the specified one or more of the second data, and reading the second data based on the first reference scheme acquired from the application, (E) acquiring a second value from the second data based on the second format information acquired from the application, (F) determining whether or not the second value includes the second reference information, (G) specifying, when the second value includes the second reference information, one or more of the third data corresponding to the second data based on the second reference information, (H) generating one or more threads for the specified one or more of the third data, and reading the third data based on the second reference scheme acquired from the application, (I) acquiring a third value from the third data based on the third format information acquired from the application, (J) executing (A), (B), (C), (D), (E), (F), (G), (H) and (I) on one or more of the first data in the first data set so that a plurality of threads corresponding to the one or more of the first data are generated, and (K) executing the plurality of the threads corresponding to the one or more first data in parallel, where the first format information is a program code, and where the first format information is generated based on catalogue information required for generating the first format information written in a predetermined markup language and received from a user.

* * * * *